US012585215B2

(12) United States Patent
Minoshima

(10) Patent No.: US 12,585,215 B2
(45) Date of Patent: Mar. 24, 2026

(54) IMAGE-FORMING APPARATUS INCLUDING LINK CONNECTED TO SHUTTER OF FIXING DEVICE AND POSITIONED BETWEEN FAN AND CIRCUIT BOARD

(71) Applicant: BROTHER KOGYO KABUSHIKI KAISHA, Nagoya (JP)

(72) Inventor: Saya Minoshima, Gifu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/953,494

(22) Filed: Nov. 20, 2024

(65) Prior Publication Data

US 2025/0172891 A1 May 29, 2025

(30) Foreign Application Priority Data

Nov. 24, 2023 (JP) ................................ 2023-199342

(51) Int. Cl.
*G03G 15/20* (2006.01)
*G03G 15/00* (2006.01)
(Continued)

(52) U.S. Cl.
CPC ..... *G03G 15/2017* (2013.01); *G03G 15/2028* (2013.01); *G03G 15/657* (2013.01);
(Continued)

(58) Field of Classification Search
CPC ........... G03G 15/2017; G03G 15/2028; G03G 15/657; G03G 15/80; G03G 15/5004; G03G 21/206; G03G 21/1853; G03G 21/1842; G03G 2215/00413; G03G 2215/00978; G03G 2221/1645
(Continued)

(56) References Cited

U.S. PATENT DOCUMENTS 5,621,451 A * 4/1997 Sugiura .................... B41J 13/00 347/112
6,754,458 B2 * 6/2004 Makihira ........... G03G 15/2003 399/92

(Continued)

FOREIGN PATENT DOCUMENTS

JP 2012-093700 A 5/2012
JP 2012230297 A * 11/2012
JP 2019-095643 A 6/2019

*Primary Examiner* — Robert B Beatty
(74) *Attorney, Agent, or Firm* — Merchant & Gould P.C.

(57) ABSTRACT

An image-forming apparatus includes a housing, a fixing device, a shutter, a link, a circuit board, and a fan. The fixing device includes a heating unit and is configured to thermally fix a toner image to a sheet conveyed in a conveying direction. The shutter is movable relative to the fixing device between a closing position for closing an upstream end of the heating unit in the conveying direction and an opening position for exposing the upstream end of the heating unit. The link is connected to the shutter, and is configured to abut on a cartridge, which is detachably attachable to the housing, to move the shutter between the closing position and the opening position. The circuit board and the fan are spaced apart from each other to provide an airflow path through which air flows. The link is positioned between the circuit board and the fan.

16 Claims, 33 Drawing Sheets

(51) Int. Cl.
*G03G 21/18* (2006.01)
*G03G 21/20* (2006.01)

(52) U.S. Cl.
CPC ......... *G03G 15/80* (2013.01); *G03G 21/1853* (2013.01); *G03G 21/206* (2013.01); *G03G 2221/1645* (2013.01)

(58) Field of Classification Search
USPC ............................. 399/88, 92, 111, 122, 400
See application file for complete search history.

(56) References Cited

U.S. PATENT DOCUMENTS

| | | | | |
|---|---|---|---|---|
| 8,478,176 | B2 * | 7/2013 | Tagami | G03G 15/2003 399/322 |
| 10,509,361 | B2 * | 12/2019 | Wada | G03G 21/1853 |
| 12,044,992 | B2 * | 7/2024 | Minoshima | G03G 15/2028 |
| 2012/0082478 | A1 | 4/2012 | Wang | |
| 2019/0107806 | A1 * | 4/2019 | Johnson, Jr. | G03G 21/1842 |
| 2019/0163103 | A1 * | 5/2019 | Iizuka | G03G 21/1671 |
| 2019/0286023 | A1 * | 9/2019 | Cho | G03G 15/2017 |
| 2021/0389692 | A1 * | 12/2021 | Oguni | G03G 15/70 |
| 2022/0015219 | A1 * | 1/2022 | Hamasaki | G03G 21/1619 |
| 2023/0082752 | A1 * | 3/2023 | Toyota | G03G 21/1633 399/328 |
| 2024/0319662 | A1 * | 9/2024 | Minoshima | G03G 21/1842 |
| 2025/0044735 | A1 * | 2/2025 | Minoshima | G03G 15/2017 |
| 2025/0172903 | A1 * | 5/2025 | Minoshima | G03G 21/1633 |
| 2025/0181015 | A1 * | 6/2025 | Ohira | G03G 15/2017 |
| 2025/0181021 | A1 * | 6/2025 | Ohira | G03G 15/6573 |

* cited by examiner

IMAGE-FORMING APPARATUS INCLUDING LINK CONNECTED TO SHUTTER OF FIXING DEVICE AND POSITIONED BETWEEN FAN AND CIRCUIT BOARD

REFERENCE TO RELATED APPLICATIONS

This application claims priority from Japanese Patent Application No. 2023-199342 filed on Nov. 24, 2023. The entire content of the priority application is incorporated herein by reference.

BACKGROUND ART

In a conventional image-forming apparatus using a detachable cartridge, a shutter is provided in front of a fixing device in order to prevent a user's hand from contacting a heater of the fixing device.

For example, in one of such conventional image-forming apparatuses, a link connected to a shutter is provided such that the link can abut on a cartridge. Upon attachment of the cartridge, the link abuts on the cartridge and moves such that the shutter is opened in response to the movement of the link.

SUMMARY

According to the above image-forming apparatus where the shutter is opened and closed by the link configured to abut on the cartridge, the position of the link must be outside of a conveying path of a sheet so that the link does not hinder conveyance of the sheet. However, since a plurality of parts and components are positioned outside the conveying path in the image-forming apparatus, a devised layout is required to arrange the link outside the conveying path in the image-forming apparatus.

In view of the foregoing, it is an object of the present disclosure to provide an image-forming apparatus that provides a novel layout of the link connected to the shutter and abuttable on the cartridge.

In order to attain the above and other objects, the present disclosure provides an image-forming apparatus including a housing, a fixing device, a shutter, a link, a circuit board, and a fan. A cartridge is detachably attachable to the housing. The fixing device is configured to thermally fix a toner image to a sheet conveyed in a sheet conveying direction. The fixing device includes a heating unit that includes a heater. The heating unit has an upstream end in the sheet conveying direction. The shutter is movable relative to the fixing device between a closing position where the shutter covers the upstream end of the heating unit and an opening position where the shutter uncovers the upstream end of the heating unit. The link is connected to the shutter. The link is configured to abut on the cartridge to move the shutter between the closing position and the opening position. On the circuit board, an electronic component is mounted. The fan is configured to move air in the housing. The circuit board and the fan are spaced apart from each other to provide an airflow path through which the air flows. The link is positioned between the circuit board and the fan.

With this structure, an efficient layout of the link can be provided by making use of the airflow path defined between the circuit board and the fan.

DESCRIPTION

Hereinafter, an image-forming apparatus 1 according to one embodiment of the present disclosure will be described with reference to FIGS. 1 through 35.

<Outline of the Image-Forming Apparatus 1>

Figure 1:
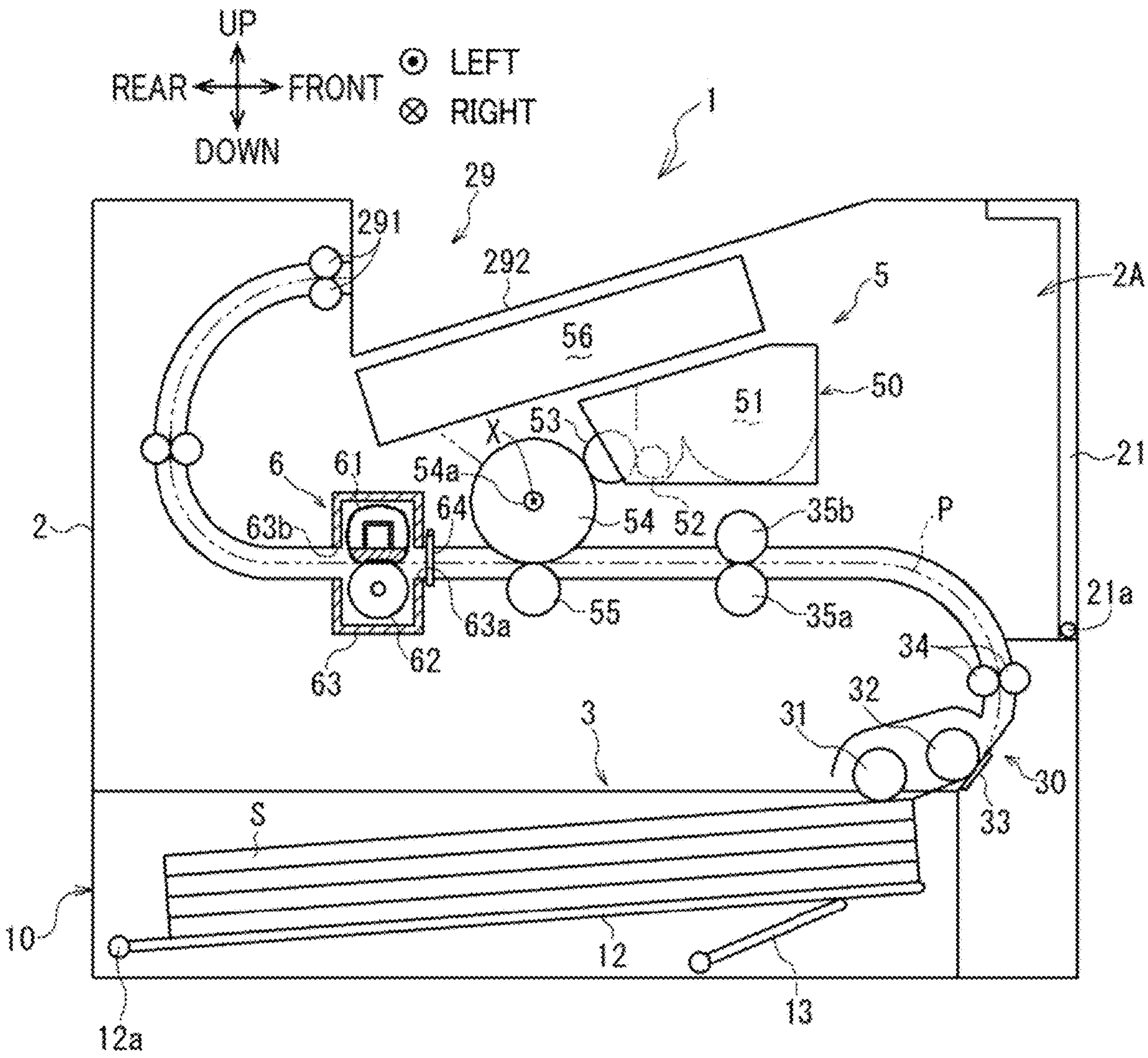
FIG. 1 is a schematic vertical cross-sectional view of an image-forming apparatus according to an embodiment taken along a widthwise center plane thereof.

The image-forming apparatus 1 illustrated in FIG. 1 is an electrophotographic-type laser printer configured to form an image on a sheet S.

In the following description, the right side and the left side of FIG. 1 will be defined as a front side and a rear side of the image-forming apparatus 1, respectively, and the near side and the far side of FIG. 1 will be defined as a left side and a right side of the image-forming apparatus 1, respectively. Further, the upper side and the lower side of FIG. 1 will be defined as an upper side and a lower side of the image-forming apparatus 1, respectively.

The image-forming apparatus 1 includes a housing 2, a sheet supplying unit 3, an image-forming unit 5, a fixing device 6, and a sheet discharge unit 29.

The housing 2 houses therein the sheet supplying unit 3, the image-forming unit 5, the fixing device 6, and the sheet discharge unit 29. The housing 2 has a front surface where an opening 2A is open. The housing 2 has a front cover 21 configured to open and close the opening 2A. The front cover 21 has a lower end defining a pivot axis 21*a*. The front cover 21 is pivotally movable about the pivot axis 21*a* between a closed position where the front cover 21 closes the opening 2A and an open position where the front cover 21 opens the opening 2A. The housing 2 is an example of "housing" of the disclosure.

The sheet supplying unit 3 includes a sheet supply tray 10 configured to support a stack of the sheets S, a sheet pick-up unit 30, a pair of conveyor rollers 34, and a registration roller 35*a*. The sheet supplying unit 3 is positioned at a lower internal portion of the housing 2, and is configured to convey each of the sheets S supported on the sheet supply tray 10 to the image-forming unit 5. The image-forming apparatus 1 defines a sheet conveying passage P extending from the sheet supplying unit 3 to the sheet discharge unit 29 via the image-forming unit 5.

The sheet supply tray 10 includes a lifter plate 12 and a pressure plate 13. The lifter plate 12 is a plate-like member for supporting the sheets S from below. The lifter plate 12 is pivotally movable about a pivot axis 12*a* defined at a rear end portion thereof. The lifter plate 12 is movable upward and downward between an ascent position and a descent position by the pivotal movement about the pivot axis 12*a*. The pressure plate 13 is positioned below the lifter plate 12 and is configured to move the lifter plate 12 up and down between the ascent position and the descent position.

The sheet pick-up unit 30 is a conveying mechanism configured to pick-up one sheet S from the stack of sheets S supported on the sheet supply tray 10 and to convey the sheet S toward the image-forming unit 5. The sheet pick-up unit 30 includes a pick-up roller 31, a separation roller 32, and a separation pad 33.

The pick-up roller 31 is configured to pick-up the sheets S supported on the sheet supply tray 10 and to convey the sheets S toward the separation roller 32. The separation roller 32 is positioned downstream of the pick-up roller 31 in a sheet conveying direction. The separation pad 33 is positioned to face the separation roller 32 and is urged toward the separation roller 32.

The sheets S conveyed by the pick-up roller 31 toward the separation roller 32 are separated one by one at a position between the separation roller 32 and the separation pad 33. Each separated sheet S is then fed into the sheet conveying passage P.

The sheet S fed to the sheet conveying passage P is then conveyed to the image-forming unit 5 by the pair of conveyor rollers 34, the registration roller 35*a*, and a pinch roller 35*b* (described later) facing the registration roller 35*a*. The registration roller 35*a* is configured to regulate a leading end of the sheet S to temporarily stop the same, and then to convey the sheet S toward the image-forming unit 5 at a prescribed timing.

The image-forming unit 5 is positioned downstream of the sheet supplying unit 3 in the sheet conveying direction. The image-forming unit 5 is configured to form an image on the sheet S conveyed from the sheet supplying unit 3. The image-forming unit 5 includes a process cartridge 50, a transfer roller 55, and an exposing device 56.

The process cartridge 50 is configured to transfer an image onto the sheet S conveyed from the sheet supplying unit 3. The process cartridge 50 is positioned above the sheet supplying unit 3 when accommodated in the housing 2. The process cartridge 50 includes a developer accommodation chamber 51, a supply roller 52, a developing roller 53, and a photosensitive drum 54. The pinch roller **35*b* is supported by the process cartridge 50**.

The process cartridge 50 is configured of: a drum cartridge including the photosensitive drum 54; and a developing cartridge including the developing roller 53 and attachable to the drum cartridge. The process cartridge 50 is attachable to and detachable from the housing 2. Specifically, the process cartridge 50 can be attached to the housing 2 by inserting, into the housing 2, the drum cartridge and the developing cartridge attached to the drum cartridge as a unit. The process cartridge 50 can be detached from the housing 2 by removing, from the housing 2, the drum cartridge and the developing cartridge attached thereto altogether as a unit. The process cartridge 50 is an example of "cartridge" of the disclosure.

The process cartridge 50 may be configured as a cartridge including at least one of a photosensitive drum, a developing roller, and a developer storage chamber. Attachment and detachment of the process cartridge 50 to and from the housing 2 can be performed when the front cover 21 is at the open position.

The photosensitive drum 54 defines a rotational axis X. In a state where the process cartridge 50 is attached to the housing 2, the photosensitive drum 54 is arranged such that the rotational axis X extends in a left-right direction. The photosensitive drum 54 includes a drum shaft **54*a* defining the rotational axis X. The drum shaft 54*a* is made of metal. The photosensitive drum 54** is rotatable about the rotational axis X.

In the present embodiment, the process cartridge 50 is configured of: the drum cartridge including the photosensitive drum 54, and the developing cartridge attachable to the drum cartridge and including the developing roller 53. However, the process cartridge 50 may be configured of: a cartridge including the photosensitive drum 54 and the developing roller 53; and a toner box attachable to the cartridge and configured to accommodate toner therein.

Still alternatively, in the image-forming apparatus 1, the drum cartridge including the photosensitive drum 54 and the developing cartridge including the developing roller 53 may be individually attachable to the housing 2. That is, the process cartridge 50 may be configured as a detachable cartridge that includes at least one of a photosensitive drum, a developing roller, and a toner container, the cartridge being detachably attachable to the housing 2.

The exposing device 56 is configured to expose a peripheral surface of the photosensitive drum 54 to light. The exposing device 56 includes a laser diode, a polygon mirror, a lens, and a reflection mirror, and the like. The exposing device 56 is configured to irradiate laser light to the photosensitive drum 54 of the process cartridge 50 attached to the housing 2, based on image data inputted into the image-forming apparatus 1, to form an electrostatic latent image on the peripheral surface of the photosensitive drum 54.

The developer accommodation chamber 51 is configured to accommodate toner as a developer. The toner stored in the developer accommodation chamber 51 is supplied to the supply roller 52 while being agitated by an agitator (not illustrated). The supply roller 52 is configured to supply the toner conveyed from the developer accommodation chamber 51 to the developing roller 53.

The developing roller 53 is arranged in close contact with the supply roller 52. The developing roller 53 is configured to carry the toner that is supplied from the supply roller 52 and that is positively charged by a friction member (not illustrated). Further, the developing roller 53 is applied with a developing bias by a bias application member (not illustrated).

The photosensitive drum 54 is positioned adjacent to the developing roller 53. The peripheral surface of the photosensitive drum 54 is uniformly charged by a charger (not illustrated), and then the peripheral surface is exposed to light by the exposing device 56. The exposed region on the peripheral surface of the photosensitive drum 54 has a potential lower than potential of a non-exposed region thereon, whereby the electrostatic latent image corresponding to the image data is formed on the peripheral surface (exposed region) of the photosensitive drum 54. The positively charged toner is supplied from the developing roller 53 to the exposed region on the peripheral surface of the photosensitive drum 54 where the electrostatic latent image is formed, so that a visible toner image corresponding to the electrostatic latent image is formed on the peripheral surface of the photosensitive drum 54.

The transfer roller 55 is positioned to face the photosensitive drum 54 of the process cartridge 50 attached to the housing 2. The transfer roller 55 is applied with a transfer bias by a bias application member (not illustrated). The toner image formed on the peripheral surface of the photosensitive drum 54 is transferred onto a surface of the sheet S while the sheet S nipped between the transfer roller 55 and the photosensitive drum 54 is conveyed in a state where the transfer bias is applied to the peripheral surface of the transfer roller 55. The sheet S onto which the toner image has been transferred is then conveyed to the fixing device 6.

The fixing device 6 is configured to thermally fix the toner image that has been transferred on the sheet S by the process cartridge 50 to the sheet S. The fixing device 6 includes a heating unit 61 and a pressure roller 62. The heating unit 61 is configured to generate heat when supplied with power from a power source (not illustrated). The pressure roller 62 is positioned to face the heating unit 61. One of the heating unit 61 and the pressure roller 62 is urged toward the other (toward a remaining one of the heating unit 61 and the pressure roller 62) by an urging mechanism (not illustrated), so that the heating unit 61 and the pressure roller 62 are in close contact with each other. The fixing device 6 is an example of "fixing device" of the disclosure.

When the sheet S on which the toner image has been transferred is conveyed to the fixing device 6, the heating unit 61 and the pressure roller 62 convey the sheet S while nipping the sheet S therebetween to apply heat to the sheet S to thermally fix the toner image to the sheet S. In this way, the fixing device 6 thermally fixes the toner image to the sheet S while the sheet S is conveyed through the fixing device 6.

The sheet discharge unit 29 is positioned downstream of the image-forming unit 5 in the sheet conveying direction. The sheet discharge unit 29 is configured to discharge the image-formed sheet S to an outside of the image-forming apparatus 1. The sheet discharge unit 29 includes a pair of discharge rollers 291 and a discharge tray 292. The pair of discharge rollers 291 is configured to discharge the sheet S conveyed from the fixing device 6 along the sheet conveying passage P toward the outside of the housing 2. The discharge tray 292 is defined on an upper surface of the housing 2, and is configured to receive the sheet S discharged to the outside of the housing 2 by the pair of discharge rollers 291.

Figure 2:
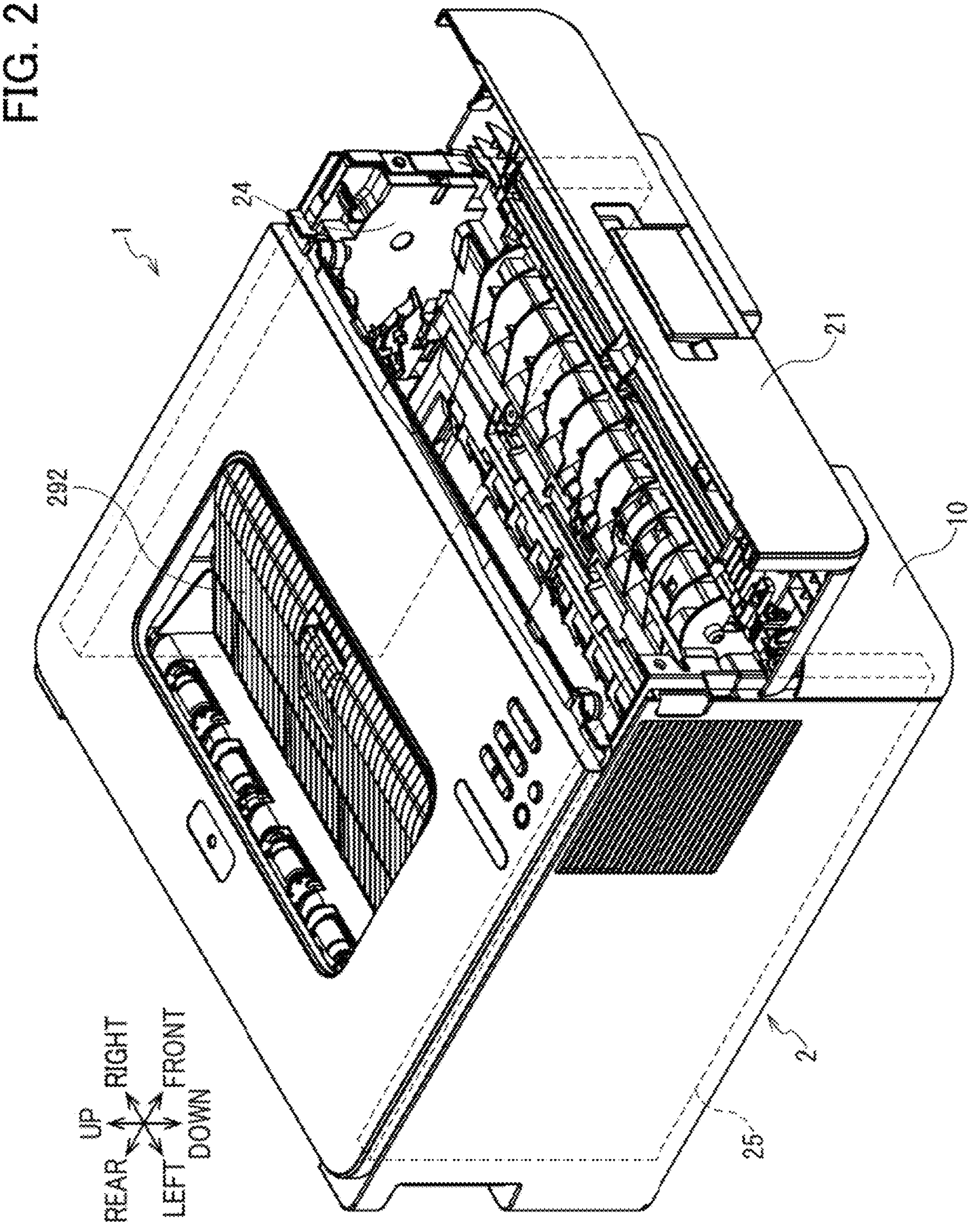
FIG. 2 is a perspective view of the image-forming apparatus in a state where a front cover thereof is at its open position.

As illustrated in FIG. 2, the housing 2 includes a first main frame 24 and a second main frame 25 spaced away from each other in the left-right direction. The first main frame 24 is positioned at a right end portion of the housing 2, and the second main frame 25 is positioned at a left end portion of the housing 2. The first main frame 24 extends in a front-rear direction and an up-down direction, and has a major surface perpendicular to the left-right direction. The second main frame 25 extends in the front-rear direction and up-down direction, and has a major surface perpendicular to the left-right direction.

The first main frame 24 is an example of "first frame" of the disclosure, and the second main frame 25 is an example of "second frame" of the disclosure. The up-down direction is an example of "first direction" of the disclosure. The front-rear direction is an example of "second direction" of the disclosure. The left-right direction is an example of "third direction" of the disclosure.

The process cartridge 50 (attached to the housing 2) and the fixing device 6 are positioned between the first main frame 24 and the second main frame 25. The first main frame 24 is positioned rightward of the process cartridge 50 and the fixing device 6, and the second main frame 25 is positioned leftward of the process cartridge 50 and the fixing device 6. The first main frame 24 and second main frame 25 oppose each other in the left-right direction such that the process cartridge 50 is interposed between the first main frame 24 and second main frame 25. The process cartridge 50 is detachably supported by the first main frame 24 and the second main frame 25.

<Fixing Device 6>

Figure 3:
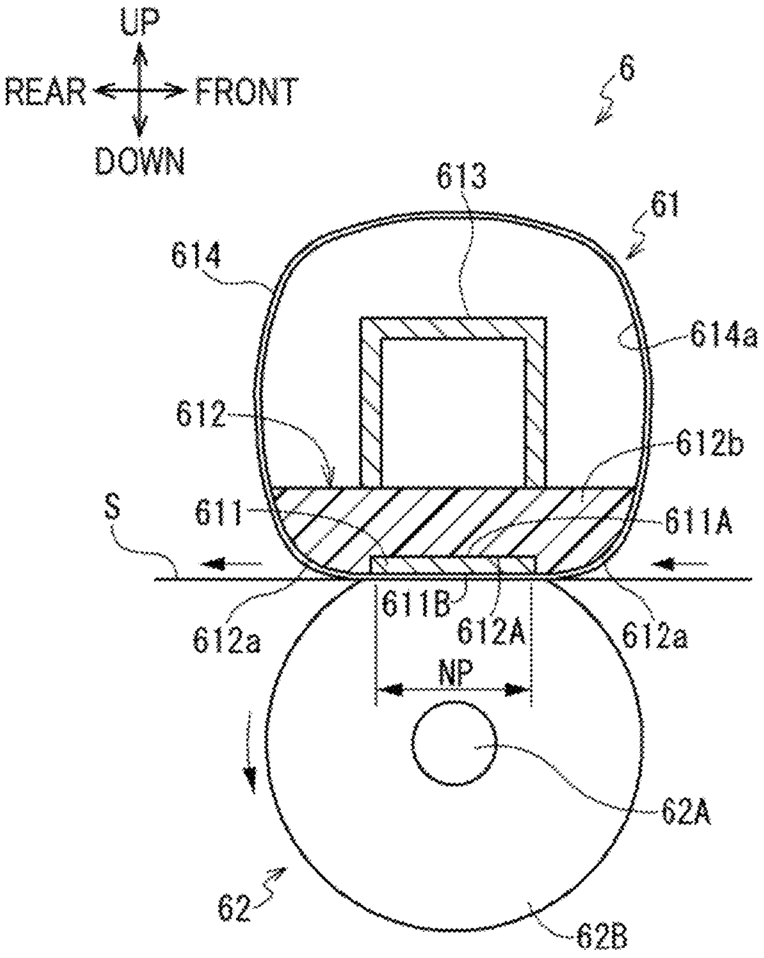
FIG. 3 is a cross-sectional side view of a fixing device in the image-forming apparatus.
Figure 4:
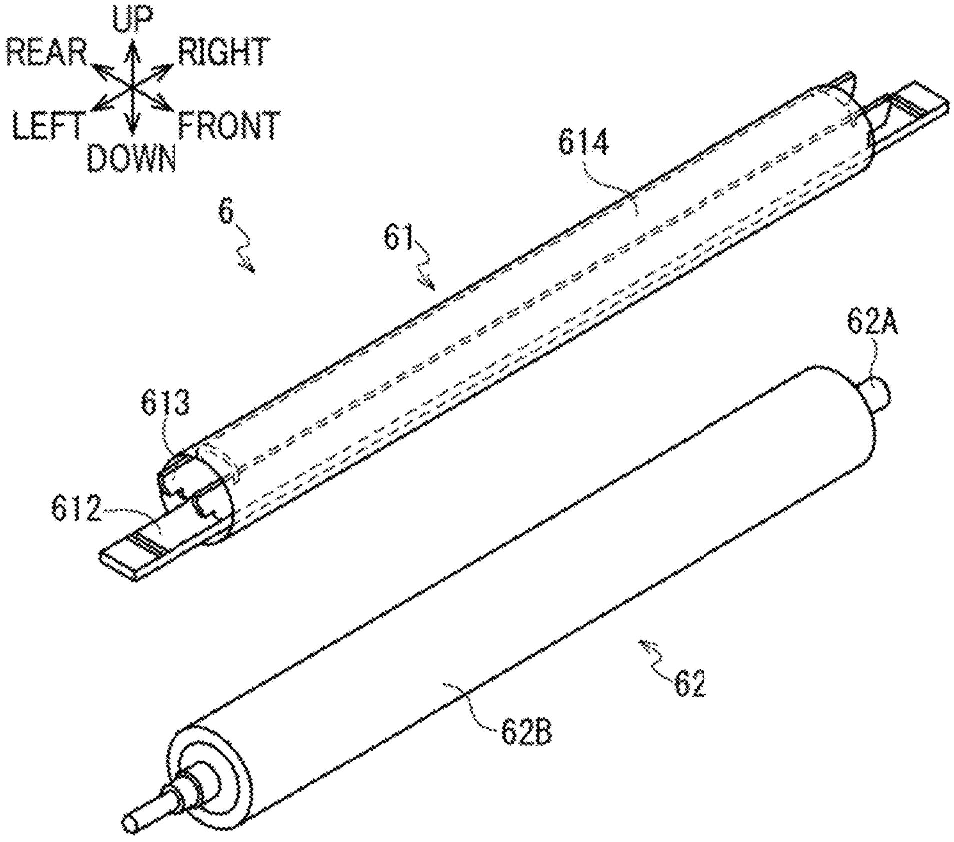
FIG. 4 is a perspective view of a heating unit and a pressure roller of the fixing device.

As illustrated in FIGS. 3 and 4, the heating unit 61 includes a heater 611, a holder 612, a stay 613, and a belt 614. The heater 611 has a flat plate-like shape elongated in the left-right direction. The heater 611 has a first surface 611A and a second surface 611B opposite the first surface 611A. The first surface 611A is supported by the holder 612. The heating unit 61 is an example of "heating unit" of the disclosure. The heater 611 is an example of "heater" of the disclosure.

The holder 612 is made from resin, for example. The holder 612 includes a support wall 612*b*. The support wall 612*b* has a guide surface 612*a* and a supporting surface 612A. The guide surface 612*a* contacts an inner peripheral surface 614*a* of the belt 614 for guiding a circular movement of the belt 614. The supporting surface 612A is in contact with the first surface 611A of the heater 611 for supporting the same. The stay 613 supports the holder 612. The stay 613 has a higher rigidity than the holder 612 made from resin. For example, the stay 613 is manufactured by bending a steel plate (having higher rigidity than the holder 612) to form a U-shape in cross-section.

The belt 614 is an endless belt having heat resistivity and flexibility. The belt 614 is constituted by a metal hollow tubular member made from, for example, stainless steel, and a fluorine resin layer coated over the hollow tubular member. The heater 611, the holder 612, and the stay 613 are positioned in an internal space provided by the endless belt 614. The belt 614 is configured to circularly move around the heater 611, the holder 612, and the stay 613. The inner peripheral surface 614*a* of the belt 614 is in contact with the heater 611.

The pressure roller 62 includes a shaft 62A made from metal and an elastic layer 62B provided over the shaft 62A. The pressure roller 62 is pressed against the heater 611 through the belt 614. The pressure roller 62 and the heater 611 define a nipping region NP therebetween where the belt 614 is nipped therebetween for heating and pressing the sheet S. That is, the pressure roller 62 forms the nipping region NP in cooperation with the heating unit 61, and is configured to apply heat and pressure to the sheet S at the nipping region NP in cooperation with the heating unit 61 (heater 611).

The pressure roller 62 is rotationally driven upon receipt of a driving force from a motor (not illustrated) provided inside the housing 2. The belt 614 is configured to circularly move following the rotation of the pressure roller 62 with the aid of the frictional force generated between the pressure roller 62 and the belt 614 or between the belt 614 and the sheet S nipped at the nipping region NP. Hence, the toner image having transferred on the sheet S is thermally fixed thereto while the sheet S is conveyed between the pressure roller 62 and the belt 614 heated by the heater 611.

As illustrated in FIGS. 1 and 5A through 7B, the fixing device 6 further includes: a fixing frame 63 covering the heating unit 61 and the pressure roller 62; and a shutter 64 supported by the fixing frame 63.

The fixing frame 63 holds the heating unit 61 and the pressure roller 62. The fixing frame 63 covers circumferences of the heating unit 61 and the pressure roller 62. The fixing frame 63 has a first opening 63*a* (see FIGS. 1, 7A and 7B) and a second opening 63*b* (see FIGS. 1, 7A and 7B). The first opening 63*a* is formed at an upstream side of the heating unit 61 and the pressure roller 62 in the sheet conveying direction. The second opening 63*b* is formed at a downstream side of the heating unit 61 and the pressure roller 62 in the sheet conveying direction. The fixing frame 63 covers the heating unit 61 from above.

The shutter 64 is positioned at an upstream side of the first opening 63*a* in the sheet conveying direction. The shutter 64 is an example of "shutter" of the disclosure.

The shutter 64 includes a shutter body 640, a pair of pivot shafts 641, and a connection shaft 642. The shutter body 640 has a generally flat plate-like shape extending in the left-right direction. Each pivot shaft 641 is provided on each end of the shutter body 640 in the left-right direction to extend therefrom outward in the left-right direction. The pivot shafts 641 are both rotatably supported by the fixing frame 63. The connection shaft 642 protrudes rightward from a right end of the shutter body 640. That is, the connection shaft 642 extends in parallel to each pivot shaft 641.

The shutter 64 is pivotally movable about an axis of each pivot shaft 641 between: a closing position (illustrated in FIGS. 5A, 6A and 7A) where the shutter 64 closes the first opening 63*a*; and an opening position (illustrated in FIGS. 5B, 6B and 7B) where the shutter 64 opens the first opening 63*a*. The nipping region NP defined between the heating unit 61 and the pressure roller 62 is covered with the shutter 64 when the shutter 64 is at the closing position, whereas the nipping region NP is exposed to an outside of the fixing frame 63 through the first opening 63*a* when the shutter 64 is at the opening position.

The shutter 64 covers an upstream end of the heating unit 61 in the sheet conveying direction when the shutter 64 is at the closing position, and opens the upstream end of the heating unit 61 in the sheet conveying direction when the shutter 64 is at the opening position. That is, the shutter 64 is movable between the closing position where the shutter 64 closes the upstream end of the heating unit 61 in the sheet conveying direction and the opening position where the shutter 64 opens the upstream end of the heating unit 61 in the sheet conveying direction.

As illustrated in FIGS. 5A, 5B, 7A, 7B and 8A, the shutter 64 has an abutment end part 64*a*. The abutment end part 64*a* is an upper end of the shutter 64 (shutter body 640) when the shutter 64 is at the closing position. When the shutter 64 is at the opening position, the shutter 64 (abutment end part 64*a*) abuts on an abutment surface 631 of the fixing frame 63 (see FIG. 7B). The abutment surface 631 of the fixing frame 63 faces upstream in the sheet conveying direction. The abutment end part 64*a* of the shutter 64 abuts on the abutment surface 631 when the shutter 64 is at the opening position. The abutment of the abutment end part 64*a* on the abutment surface 631 restricts the shutter 64 from pivotally moving further in a direction for opening the shutter 64 (clockwise in FIG. 7B) from the opening position illustrated in FIG. 7B. That is, the abutment surface 631 of the fixing frame 63 functions as a restriction surface for restricting the position of the shutter 64 when being abutted by the shutter 64 at the opening position.

As illustrated in FIGS. 5A, 5B, 8A and 8B, the shutter 64 also has an abutment part 64*b* configured to abut on the fixing frame 63 when the shutter 64 is at the closing position. The abutment part 64*b* is provided at a right end portion of the shutter 64 (shutter body 640). The abutment part 64*b* is configured to abut on an abutment surface 632 of the fixing frame 63 when the shutter 64 is at the closing position (see FIG. 8A).

The abutment surface 632 of the fixing frame 63 faces upstream in the sheet conveying direction. The abutment part 64*b* of the shutter 64 abuts on the abutment surface 632 when the shutter 64 is at the closing position. The abutment of the abutment part 64*b* on the abutment surface 632 restricts the shutter 64 from pivotally moving further in a direction for closing the shutter 64 (counterclockwise in FIG. 7A) from the closing position illustrated in FIG. 7A. That is, the abutment surface 632 of the fixing frame 63 functions as a restriction surface for restricting the position of the shutter 64 when being abutted by the shutter 64 at the closing position.

Incidentally, in the present embodiment, the fixing device 6 includes the pressure roller 62, and the heating unit 61 which includes the heater 611 and the belt 614. As an alternative, the fixing device 6 may be configured of a heat roller incorporating a heater, and a pressure roller configured to be pressed against the heat roller. Still alternatively, the fixing device 6 may be configured of a heat roller incorporating a heater, and a pressure belt urged toward the heat roller by an urging member.

<Drum Shaft 54>

Figure 9:
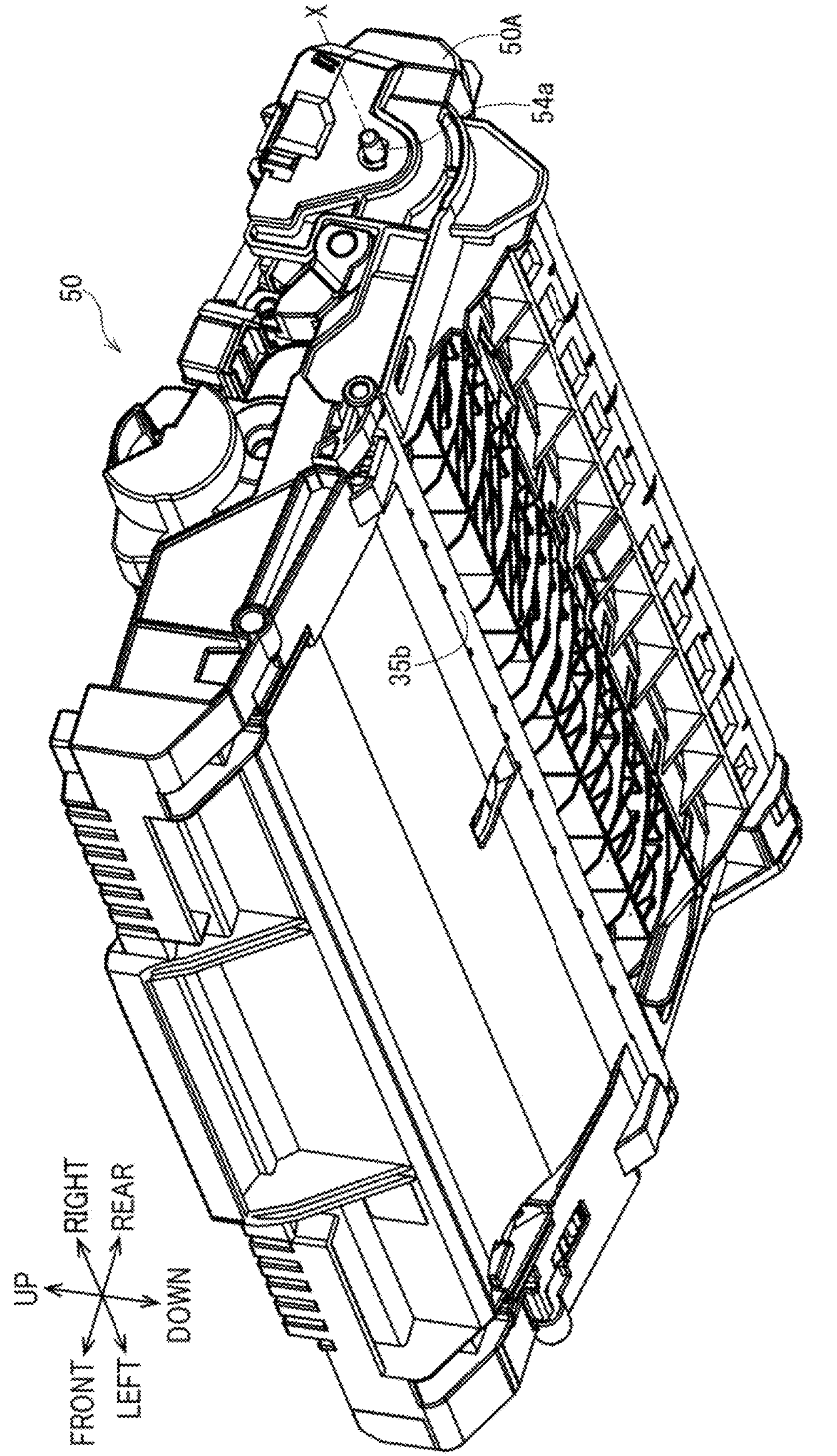
FIG. 9 is a perspective view of a process cartridge for the image-forming apparatus.
Figure 10:
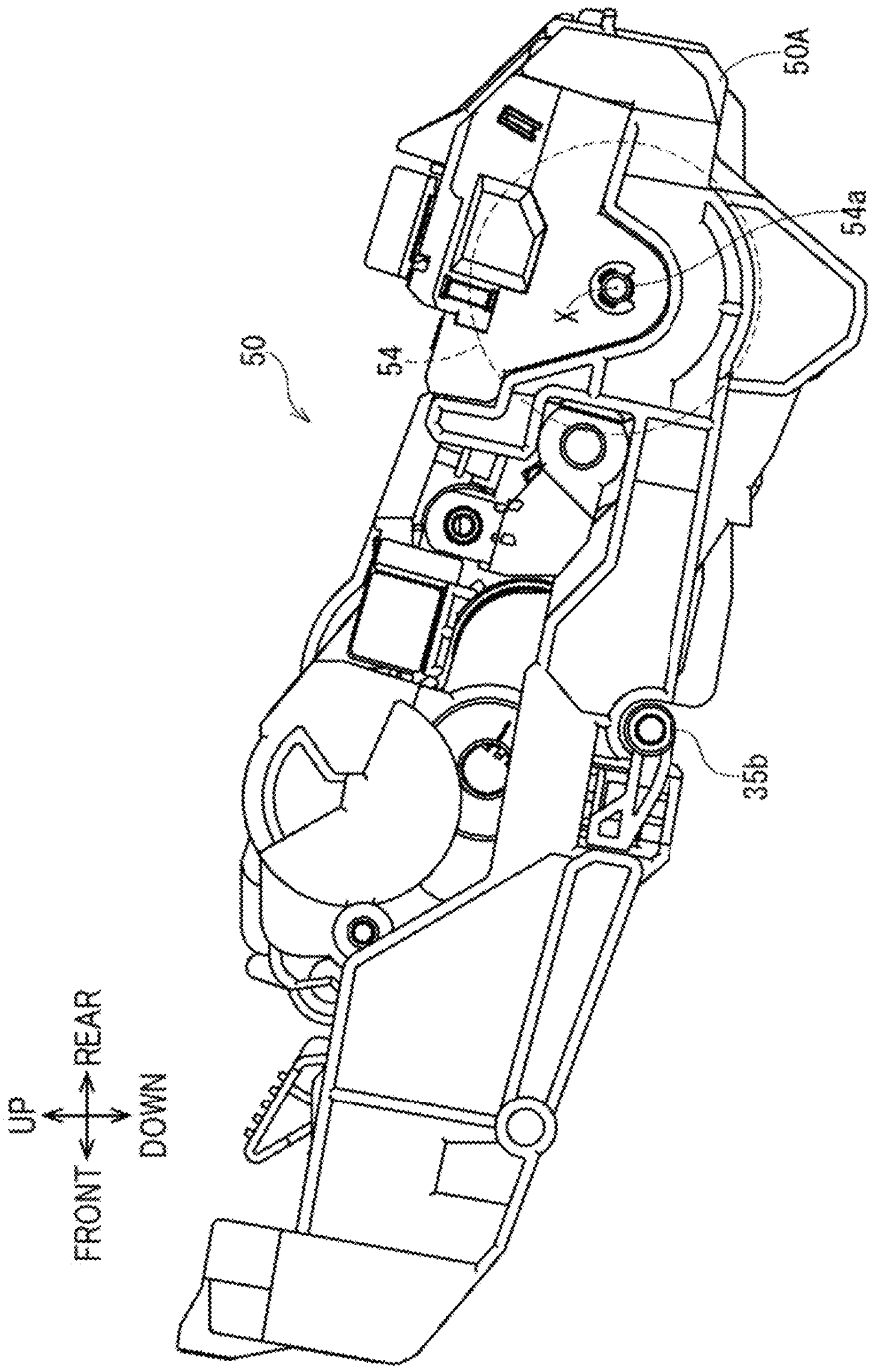
FIG. 10 is a side view of the process cartridge.

As illustrated in FIGS. 9 and 10, the drum shaft 54*a* of the photosensitive drum 54 protrudes rightward from the right end of the process cartridge 50. The drum shaft 54*a* defines the rotational axis X extending in an axial direction. That is, the drum shaft 54*a* protrudes out in the axial direction toward the first main frame 24 along the rotational axis X.

<First Main Frame 24>

Figure 11:
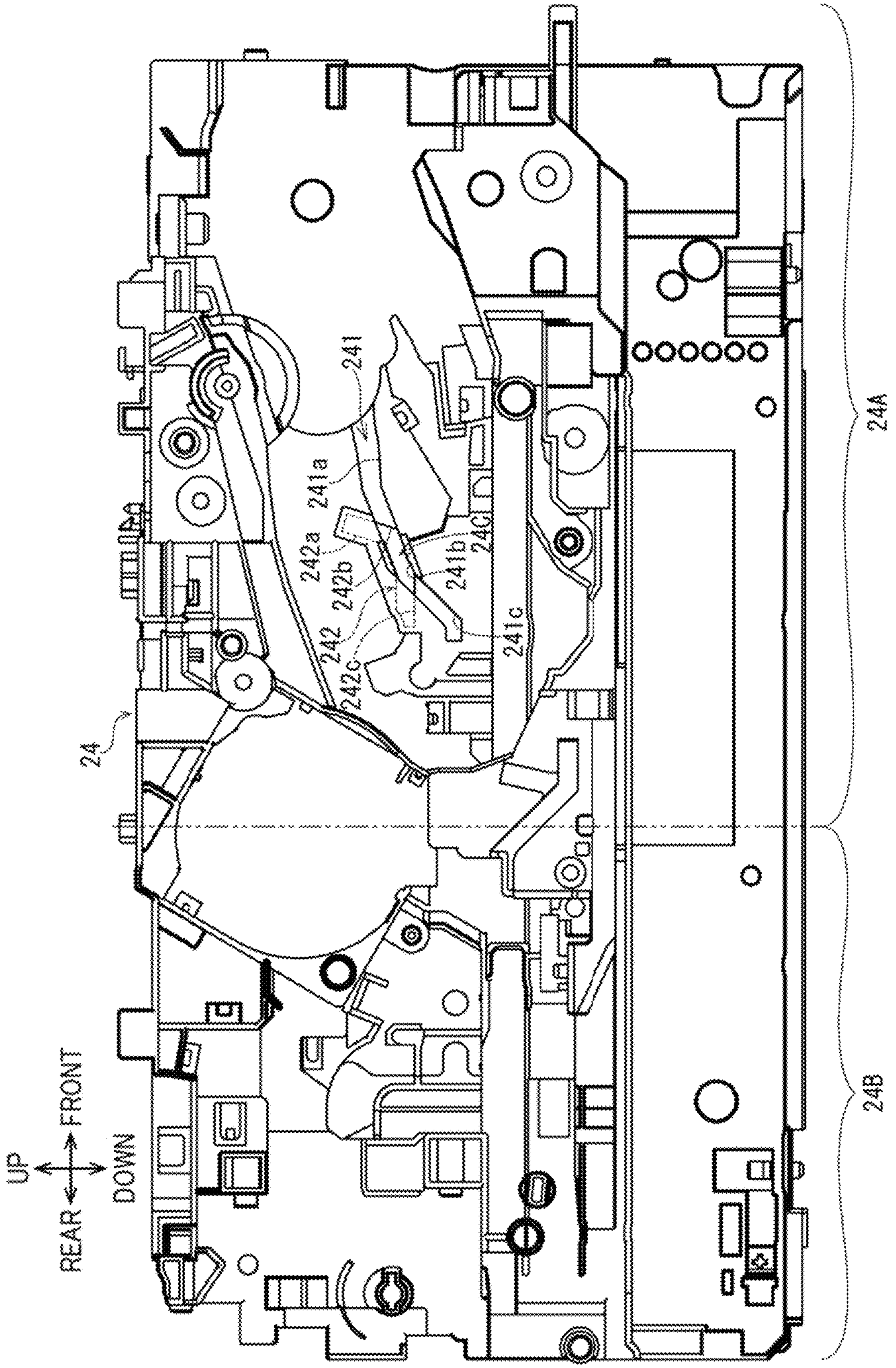
FIG. 11 is a left side view of a first main frame of the image-forming apparatus.
Figure 12:
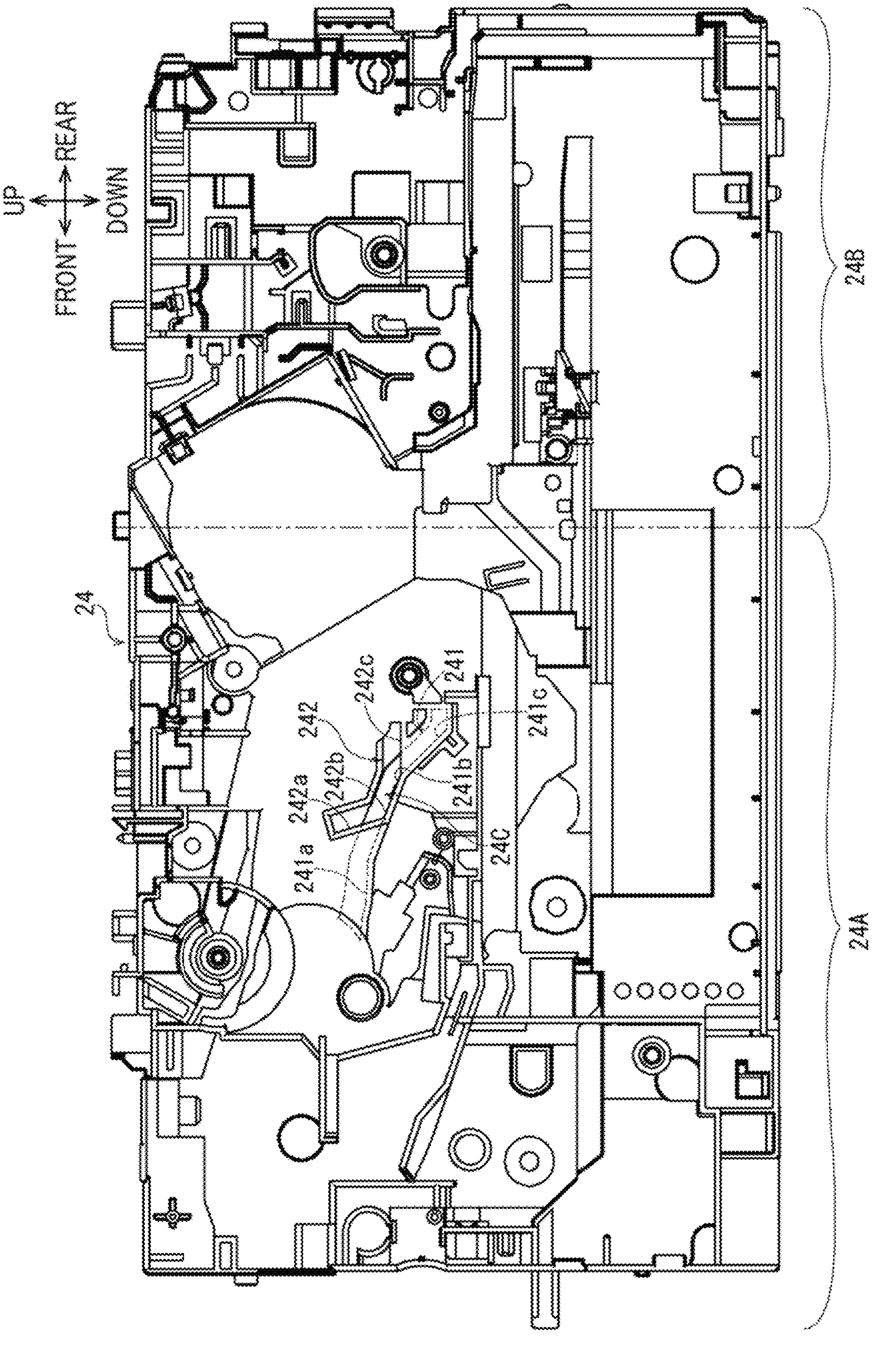
FIG. 12 is a right side view of the first main frame.

As illustrated in FIGS. 11 and 12, the first main frame 24 includes a front frame 24A constituting a frontward portion of the first main frame 24, and a rear frame 24B constituting a rearward portion of the first main frame 24 and positioned rearward of the front frame 24A. The front frame 24A and the rear frame 24B are integral with each other in the front-rear direction.

The front frame 24A of the first main frame 24 has a cartridge rail 241 and an abutment piece rail 242. The cartridge rail 241 has a groove-like shape that is open leftward. The cartridge rail 241 slopes diagonally downward toward the rear, while extending generally in the front-rear direction.

The cartridge rail 241 is configured to receive the drum shaft 54*a* of the photosensitive drum 54 therein. The cartridge rail 241 functions to guide the drum shaft 54*a* during attachment and detachment of the process cartridge 50 to and from the housing 2. The drum shaft 54*a* is inserted in the cartridge rail 241 from its left side. Incidentally, the process cartridge 50 is attachable to the housing 2 toward the rear in the front-rear direction, and the process cartridge 50 is detachable from the housing 2 toward the front in the front-rear direction.

In this way, the cartridge rail 241 of the front frame 24A is configured to guide the movement of the drum shaft 54*a* during the attachment and detachment of the process cartridge 50 to and from the housing 2.

The abutment piece rail 242 has a groove-like shape that is open rightward. The abutment piece rail 242 slopes diagonally downward toward the rear, while extending generally in the front-rear direction. The abutment piece rail 242 is positioned rightward of the cartridge rail 241 in the left-right direction. That is, the abutment piece rail 242 is positioned outward of the cartridge rail 241 in the left-right direction.

The cartridge rail 241 includes a front portion 241*a* constituting a front part of the cartridge rail 241, a rear portion 241*c* constituting a rear part of the cartridge rail 241, and an intermediate portion 241*b* positioned between the front portion 241*a* and the rear portion 241*c*. The abutment piece rail 242 includes a front portion 242*a* constituting a front part of the abutment piece rail 242, a rear portion 242*c* constituting a rear part of the abutment piece rail 242, and an intermediate portion 242*b* positioned between the front portion 242*a* and the rear portion 242*c*.

The intermediate portion 241*b* of the cartridge rail 241 and the intermediate portion 242*b* of the abutment piece rail 242 are overlapped with each other and are in communication with each other. Hence, the intermediate portion 241*b* and the intermediate portion 242*b* provide in combination a through-hole 24C extending throughout a thickness of the front frame 24A in the left-right direction.

That is, the intermediate portion 241*b* (which is a part of the cartridge rail 241) and the intermediate portion 242*b* (which is a part of the abutment piece rail 242) are overlapped with each other, so that the overlapping portion between the cartridge rail 241 and the abutment piece rail 242 forms the through-hole 24C. This overlapping arrangement between the parts of the cartridge rail 241 and the abutment piece rail 242 can realize parts sharing between the cartridge rail 241 and the abutment piece rail 242.

The drum shaft 54*a* enters the through-hole 24C while the process cartridge 50 is being attached to the housing 2 as well as while the process cartridge 50 is being detached from the housing 2.

The front portion 242*a* of the abutment piece rail 242 is positioned above the front portion 241*a* of the cartridge rail 241. The rear portion 242*c* of the abutment piece rail 242 is positioned above the rear portion 241*c* of the cartridge rail 241.

<Link 8>

As illustrated in FIGS. 6A, 6B, 13A, 13B, and 14, a link 8 is provided in the housing 2. The link 8 is configured to abut on the process cartridge 50 to move the shutter 64 between the opening position and the closing position. The link 8 is connected to the shutter 64. The link 8 is an example of "link" of the disclosure.

Specifically, the link 8 is configured to move the shutter 64 from the closing position to the open position in conjunction with the attachment of the process cartridge 50 to the housing 2 due to abutment of the attached process cartridge 50 with the link 8, and move the shutter 64 from the opening position to the closing position in conjunction with the detachment of the process cartridge 50 from the housing 2 due to abutment of the process cartridge 50 with the link 8. In this way, the link 8 can move the shutter 64 between the closing position and the opening position in accordance with the attachment/detachment of the process cartridge 50 relative to the housing 2.

That is, the link 8 is configured to open and close the shutter 64 in accordance with the attachment/detachment of the process cartridge 50 relative to the housing 2. Specifically, the shutter 64 has moved to the opening position in a state where the process cartridge 50 is attached to the housing 2, whereas the shutter 64 has moved to the closing position in a state where the process cartridge 50 is detached from the housing 2. The link 8 is positioned opposite the process cartridge 50 attached to the housing 2 with respect to the front frame 24A in the left-right direction.

The link 8 is configured to shift between a first state and a second state. Specifically, the link 8 is in the first state prior to attachment of the process cartridge 50 to the housing 2. When the link 8 is in the first state, the shutter 64 is placed at the closing position. The link 8 has shifted to the second state, from the first state, in a state where the process cartridge 50 is attached to the housing 2. When the link 8 is in the second state, the shutter 64 is placed at the opening position.

That is, the link 8 can shift between: the first state where the link 8 renders the shutter 64 at the closing position; and the second state where the link 8 renders the shutter 64 at the opening position. The link 8 shifts from the first state to the second state to move the shutter 64 from the closing position to the opening position. The link 8 shifts from the second state to the first state to move the shutter 64 from the opening position to the closing position.

The link 8 includes an abutment piece 80, a first pivot link 81, a linear motion link 82, a second pivot link 83, a third pivot link 84, a shutter link 85, and a coil spring 86.

The abutment piece 80 is configured to abut on the drum shaft 54*a* of the photosensitive drum 54. The abutment piece 80 is caused to move by the abutment on the drum shaft 54*a* of the photosensitive drum 54. That is, the link 8 is configured to abut on the drum shaft 54*a* of the photosensitive drum 54. The abutment piece 80 is slidably fitted in the abutment piece rail 242. The abutment piece rail 242 is configured to guide the movement of the abutment piece 80 that is movable in response to the abutment with the drum shaft 54*a*.

Figure 15A:
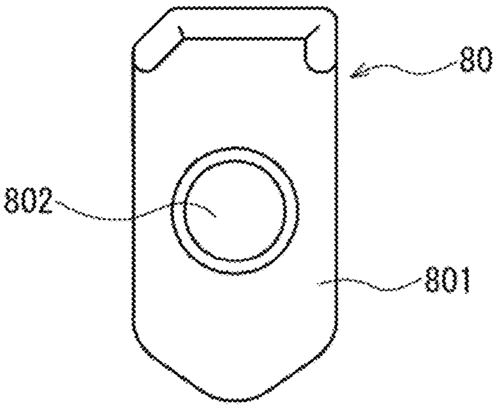
FIG. 15A is a right side view of the abutment piece.
Figure 15B:
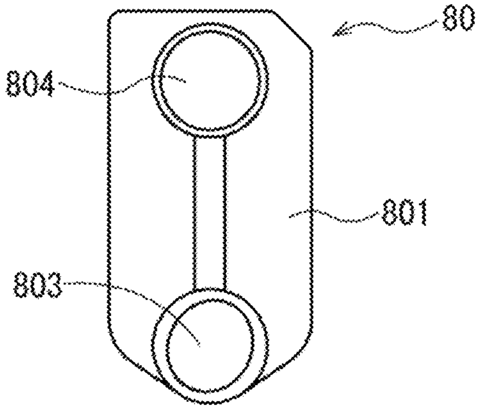
FIG. 15B is a left side view of the abutment piece.
Figure 15C:
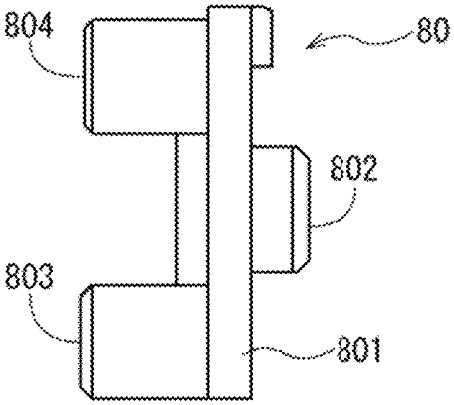
FIG. 15C is a front view of the abutment piece.

As illustrated in FIGS. 15A through 15C, the abutment piece 80 includes a base part 801, a connection part 802, a first boss 803, and a second boss 804. The base part 801 has a plate-like shape having a right surface facing rightward and a left surface facing leftward. The connection part 802 is a boss protruding rightward from the right surface of the base part 801.

The first boss 803 and the second boss 804 are protrusions protruding leftward from the left surface of the base part 801. The first boss 803 and the second boss 804 are inserted in the abutment piece rail 242 of the first main frame 24 from its right side, and are guided by the abutment piece rail 242.

In a state where the first boss 803 and the second boss 804 are received in the abutment piece rail 242, the second boss 804 is positioned upstream of the first boss 803 in an attachment direction of the process cartridge 50 to the housing 2. Here, the attachment direction is a direction in which the process cartridge 50 inserted in the housing 2 is moved toward an attachment position thereof relative to the housing 2 for the attachment of the process cartridge 50 to the housing 2.

The abutment piece 80 is positioned opposite the process cartridge 50 attached to the housing 2 with respect to the front frame 24A of the first main frame 24 in the left-right direction. In the state where the first boss 803 and the second boss 804 are received in the abutment piece rail 242, the first boss 803 and the second boss 804 do not protrude further toward the process cartridge 50 (further toward the left) from the front frame 24A.

The first boss 803 is configured to abut on the drum shaft 54*a* during the attachment of the process cartridge 50 to the housing 2, and the second boss 804 is configured to abut on the drum shaft 54*a* during the detachment of the process cartridge 50 from the housing 2. That is, the first boss 803 is configured to abut on the drum shaft 54*a* of the process cartridge 50 that is being attached to the housing 2, and the second boss 804 is configured to abut on the drum shaft 54*a* of the process cartridge 50 that is being detached from the housing 2.

In this case, the first boss 803 abuts on the drum shaft 54*a* of the process cartridge 50 that is being attached to the housing 2 through the intermediate portion 242*b* (through-hole 24C) of the abutment piece rail 242 when the first boss 803 is positioned at the intermediate portion 242*b* (through-hole 24C) of the abutment piece rail 242. Further, the second boss 804 abuts on the drum shaft 54*a* of the process cartridge 50 that is being detached from the housing 2 through the intermediate portion 242*b* (through-hole 24C) when the second protrusion 804 is positioned at the intermediate portion 242*b* (through-hole 24C) of the abutment piece rail 242.

The drum shaft 54*a* may abut on the first boss 803 and the second boss 804, respectively, through the through-hole 24C at a position within the through-hole 24C, or rightward of the through-hole 24C.

Incidentally, in the present embodiment, the abutment piece 80 is configured to be moved by the abutment with the drum shaft 54*a*. As an alternative, the abutment piece 80 may be configured to be moved by the abutment with a cartridge protrusion of the process cartridge 50 (rather than with the drum shaft 54*a*), the cartridge protrusion being a protrusion provided separately from the drum shaft 54*a* and protruding toward the first main frame 24.

The first pivot link 81 extends generally linearly and is pivotally movably connected to the abutment piece 80. The first pivot link 81 is positioned rightward of the front frame 24A of the first main frame 24. The first pivot link 81 has a front end portion provided with a fitting portion 811, and a rear end portion provided with a boss 812 protruding leftward. The connection part 802 of the abutment piece 80 is pivotally movably fitted in the fitting portion 811 at the front end portion of the first pivot link 81. The first pivot link 81 is in such an inclined posture that the fitting portion 811 is positioned above and frontward of the boss 812. The first pivot link 81 is connected to the abutment piece 80 by the fitting engagement of the fitting portion 811 with the connection part 802, and the first pivot link 81 is pivotally movable about an axis of the boss 812 in accordance with the movement of the abutment piece 80.

The linear motion link 82 extends generally linearly in the front-rear direction. The linear motion link 82 is pivotally movably connected to the first pivot link 81. The linear motion link 82 is supported by the first main frame 24 such that the linear motion link 82 is movable in the front-rear direction relative to the first main frame 24. The linear motion link 82 is positioned rightward of the front frame 24A of the first main frame 24 in the left-right direction. The linear motion link 82 has a front end portion provided with a fitting portion 821 in which the boss 812 of the first pivot link 81 is pivotably fitted. The linear motion link 82 has a rear end portion formed with a connection hole 822. The linear motion link 82 is connected to the first pivot link 81 by the fitting engagement between the boss 812 and the fitting portion 821, and is linearly movable in the front-rear direction in accordance with the pivotal movement of the first pivot link 81. That is, the linear motion link 82 is linearly movable in the second direction of the disclosure.

The linear motion link 82 moves rearward to move the shutter 64 from the closing position to the opening position, whereas the linear motion link 82 moves frontward to move the shutter 64 from the opening position to the closing position. In the first state of the link 8, the linear motion link 82 places the shutter 64 at the closing position. In the second state of the link 8, the linear motion link 82 places the shutter 64 at the opening position. The linear motion link 82 is at a first position when the link 8 is in the first state, and the linear motion link 82 is at a second position when the link 8 is in the second state.

The second pivot link 83 is connected to the linear motion link 82, and is supported by the first main frame 24. The second pivot link 83 includes: a base support portion 831 rotatably supported by the first main frame 24; a first arm 832 extending generally downward from the base support portion 831; and a second arm 833 extending generally upward from the base support portion 831. The first arm 832 has a tip end portion provided with an engagement pin 832*a* protruding leftward. The second arm 833 has a tip end portion formed with a connection hole 833*a*.

The engagement pin 832*a* of the first arm 832 is inserted in the connection hole 822 of the linear motion link 82 from its right side, and is configured to engage with the connection hole 822 in accordance with the movement of the linear motion link 82 in the front-rear direction. The second pivot link 83 is connected to the linear motion link 82 by the engagement between the engagement pin 832*a* and the connection hole 822, and is pivotally movable about an axis of the base support portion 831 in accordance with the movement of the linear motion link 82.

The third pivot link 84 is connected to the second pivot link 83, and is pivotally movably supported by a support shaft 65 of the fixing device 6. The support shaft 65 protrudes rightward from a right end portion of the fixing frame 63 (also see FIGS. 6A and 6B).

The third pivot link 84 includes: a base portion 841 pivotally movably supported by the support shaft 65 of the fixing device 6; an engagement pin 842 protruding rightward from the base portion 841; and an operation cam 843 provided at a different position from the engagement pin 842 in a circumferential direction of the base portion 841. The operation cam 843 is formed with an engagement hole 844. The engagement hole 844 penetrates through the operation cam 843 in the left-right direction. The engagement hole 844 is an arcuate slot centered on the axis of the support shaft 65. The engagement hole 844 has a radially inner surface and a radially outer surface.

The engagement pin 842 of the third pivot link 84 is inserted in the connection hole 833*a* of the second pivot link 83 from its left side. The engagement pin 842 is configured to be engaged with the connection hole 833*a* in accordance with the pivotal movement of the second pivot link 83. The third pivot link 84 is configured to be connected to the second pivot link 83 by the engagement between the engagement pin 842 and the connection hole 833*a*, and is pivotally movable about an axis of the support shaft 65 in accordance with the pivotal movement of the second pivot link 83.

As illustrated in FIGS. 5A through 6B, the shutter link 85 is connected to the third pivot link 84, and is pivotally movably supported by the support shaft 65 of the fixing device 6. The shutter link 85 is movable in response to the movement of the third pivot link 84 to move the shutter 64 of the fixing device 6 between the closing position and the opening position. The shutter link 85 is positioned at the right end of the fixing device 6.

The shutter link 85 includes a base portion 851, an arm portion 852, an engagement portion 853, and an engagement pin 854.

The base portion 851 is pivotally movably supported by the support shaft 65 that protrudes rightward from the right end of the fixing device 6. The arm portion 852 extends generally frontward from the base portion 851. The arm portion 852 has a front end where the engagement portion 853 is positioned. The engagement portion 853 is formed with an engagement hole 853*a* which has an oblong shape elongated generally in the front-rear direction. The connection shaft 642 of the shutter 64 (see FIGS. 5A, 5B) is engaged with the engagement hole 853*a*. Thus, the shutter link 85 is connected to the shutter 64 through the engagement between the engagement hole 853*a* and the connection shaft 642.

Figure 5A:
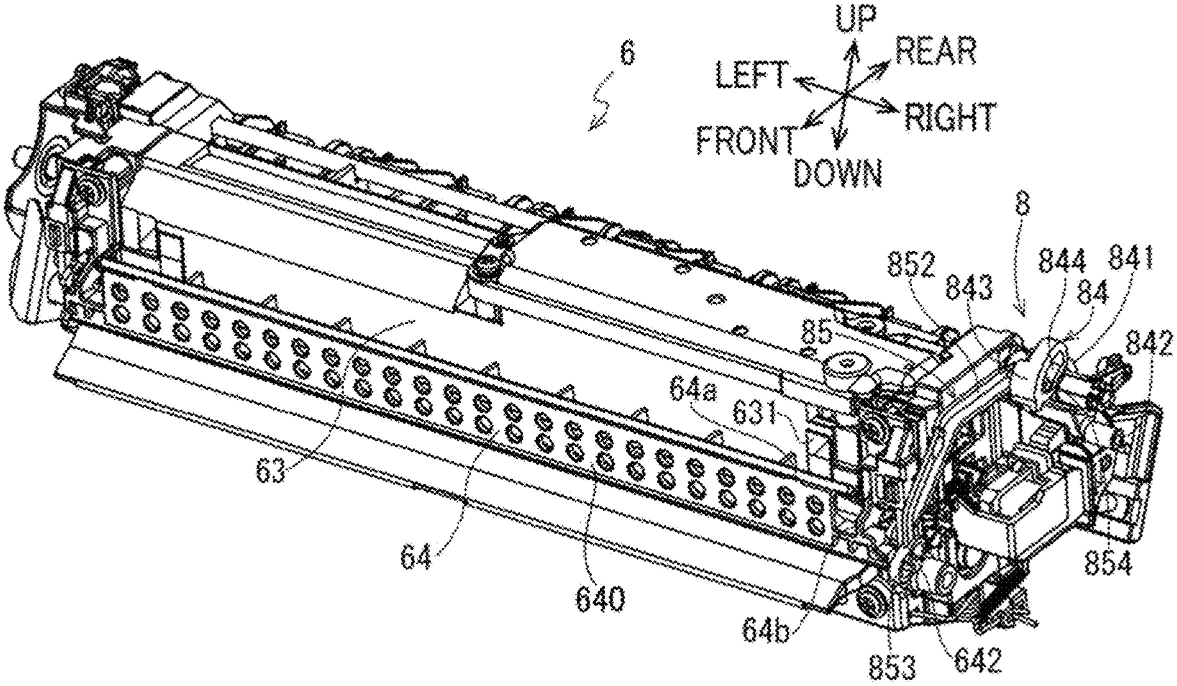
FIG. 5A is a perspective view of the fixing device in a state where a shutter thereof is at its closing position.
Figure 5B:
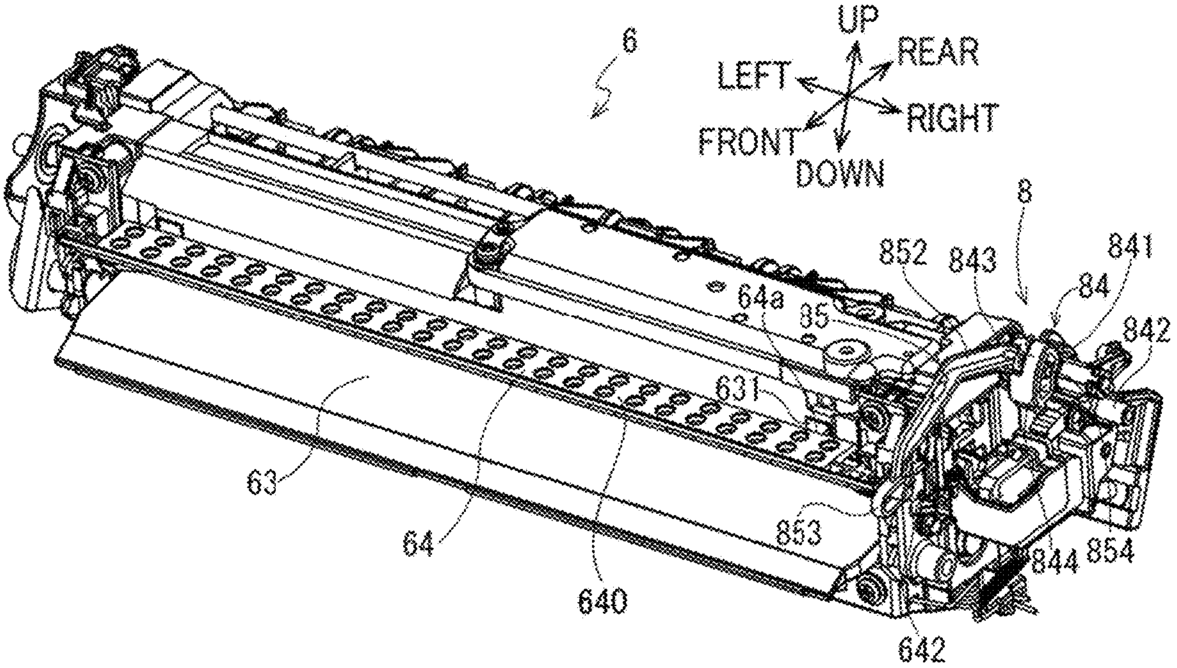
FIG. 5B is a perspective view of the fixing device in a state where the shutter is at its opening position.
Figure 6A:
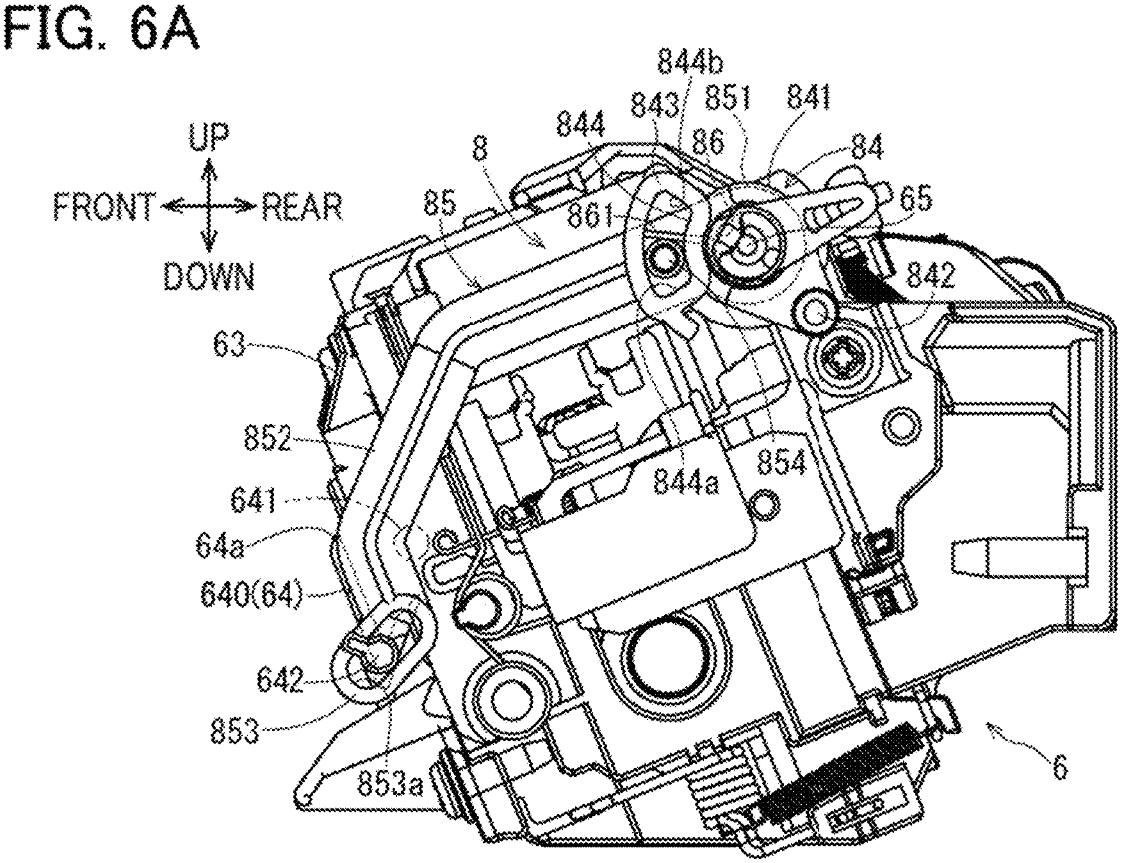
FIG. 6A is a side view of the fixing device in the state where the shutter is at the closing position.
Figure 6B:
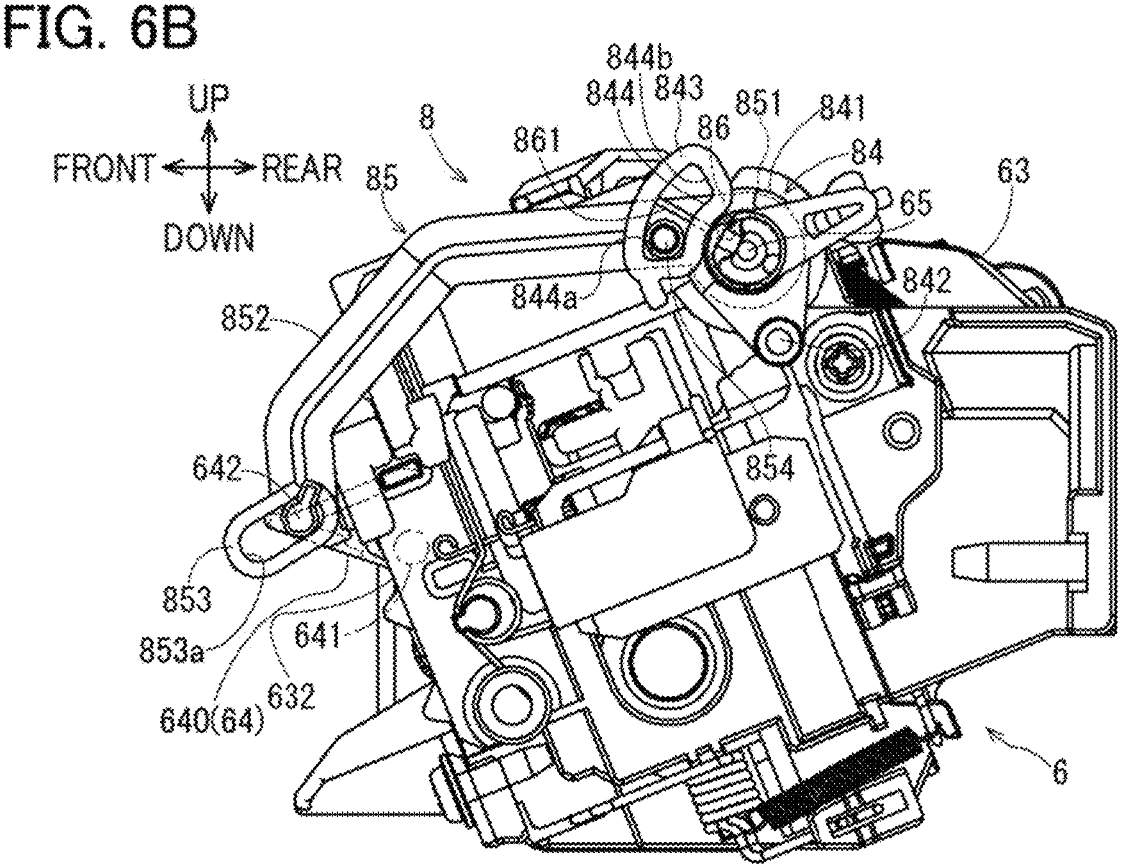
FIG. 6B is a side view of the fixing device in the state where the shutter is at the opening position.
Figure 7A:
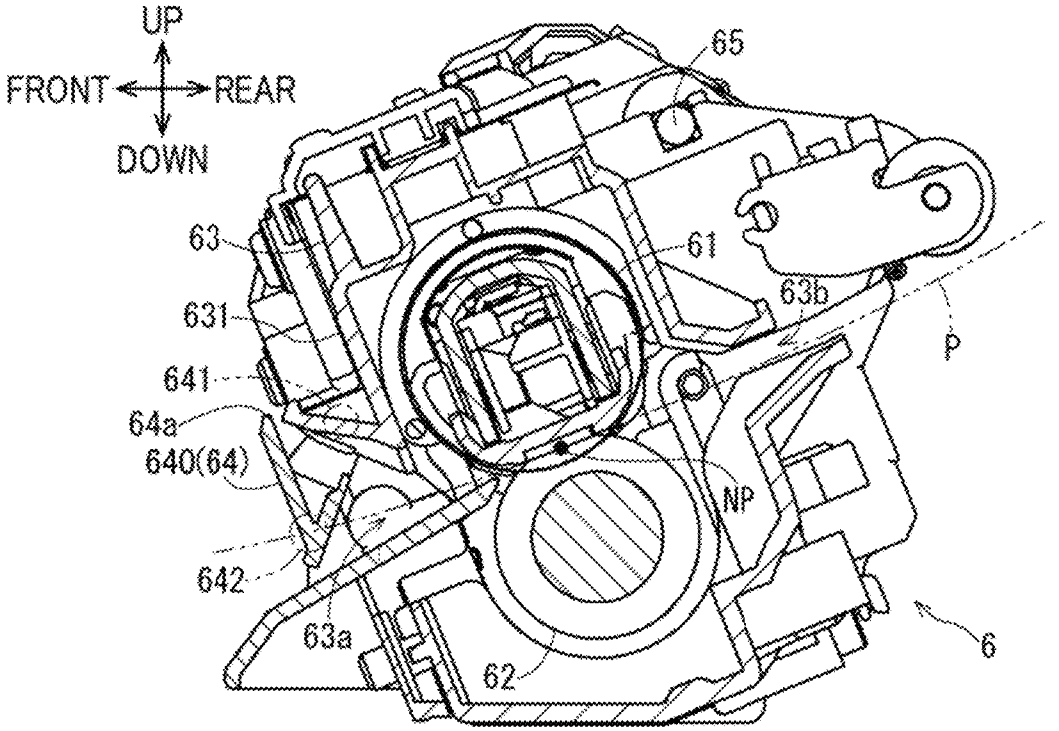
FIG. 7A is a cross-sectional side view of the fixing device in the state where the shutter is at the closing position.
Figure 7B:
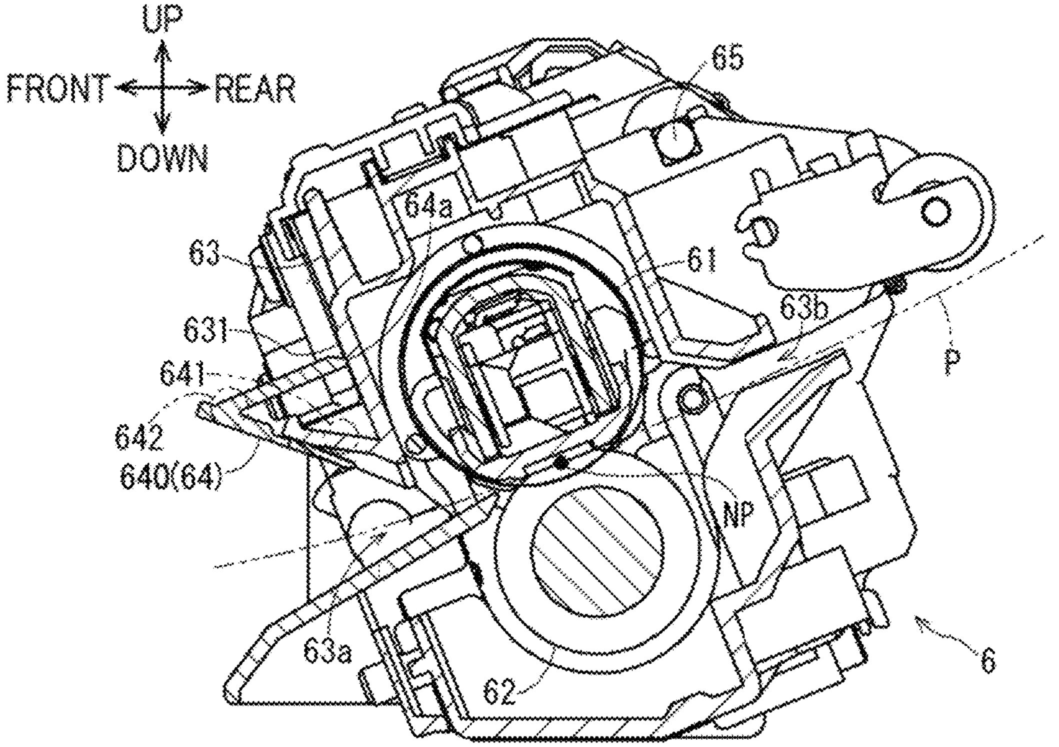
FIG. 7B is a cross-sectional side view of the fixing device in the state where the shutter is at the opening position.
Figure 8A:
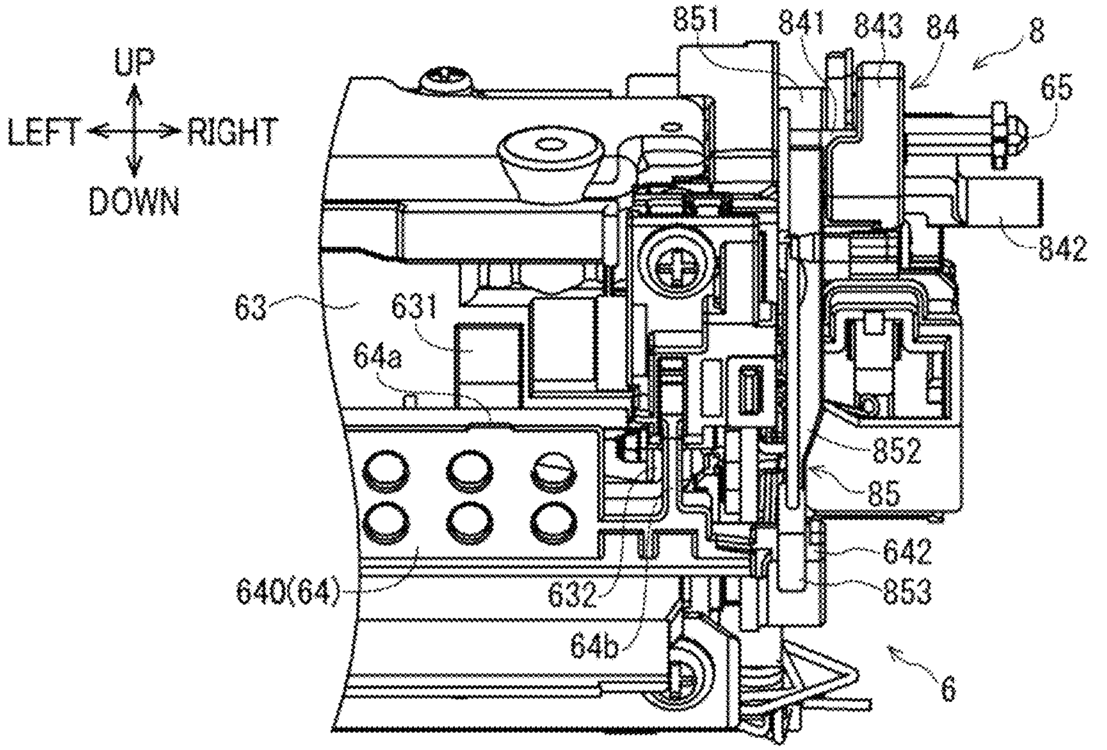
FIG. 8A is a front view of a right end portion of the fixing device in the state where the shutter is at the closing position.
Figure 8B:
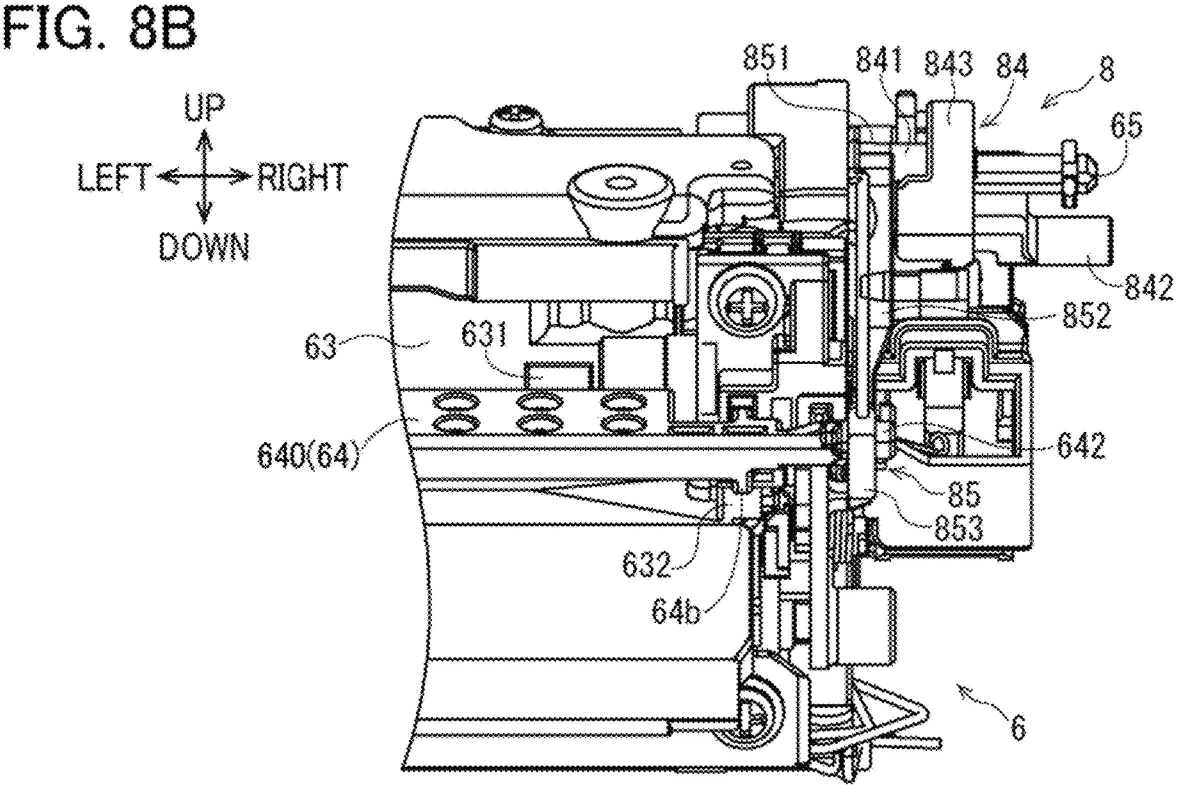
FIG. 8B is a front view of the right end portion of the fixing device in the state where the shutter is at the opening position.

The shutter link 85 is pivotally movable about a pivot axis of the base portion 851 such that the engagement portion 853 is movable in the up-down direction. As the shutter link 85 pivots to move the engagement portion 853 downward, the shutter 64 is moved to the closing position as illustrated in FIGS. 5A and 6A. As the shutter link 85 pivots to move the engagement portion 853 upward, the shutter 64 is moved to the opening position as illustrated in FIGS. 5B and 6B. That is, downward pivoting movement of the shutter link 85 moves the shutter 64 to the closing position, and upward pivoting movement of the shutter link 85 moves the shutter 64 to the opening position.

The engagement pin 854 is provided at a rear end portion of the arm portion 852 (adjacent to the base portion 851) and protrudes rightward therefrom. The engagement pin 854 is inserted in the engagement hole 844 of the third pivot link 84 from its left side.

The coil spring 86 is supported by the base portion 841 of the third pivot link 84. The coil spring 86 is resiliently deformable and movable in accordance with the movement of the third pivot link 84.

The coil spring 86 has a coil arm 861. The coil arm 861 extends through the engagement hole 844 to extend in a direction from the radially inner surface to the radially outer surface of the engagement hole 844.

The coil arm 861 is positioned above the engagement pin 854 in the engagement hole 844. The coil spring 86 is pivotable in accordance with the pivotal movement of the third pivot link 84. The engagement hole 844 has a lower end functioning as an engagement surface 844*a*. The engagement surface 844*a* is positioned below the engagement pin 854. The engagement hole 844 has an upper end 844*b* opposite the engagement surface 844*a* (lower end).

The upper end 844*b* is positioned above the coil arm 861. A gap is formed between the upper end 844*b* and the coil arm 861.

The engagement pin 854 is brought into abutment with the engagement surface 844*a* of the engagement hole 844 by the pivotal movement of the third pivot link 84 in a direction for moving the operation cam 843 upward, as illustrated in FIG. 6B. The engagement pin 854 is brought into abutment with the coil arm 861 of the coil spring 86 by the pivotal movement of the third pivot link 84 in a direction for moving the operation cam 843 downward, as illustrated in FIG. 6A.

The shutter link 85 is connected to the third pivot link 84 by the engagement of the engagement pin 854 with the coil arm 861 or with the engagement surface 844*a*. The shutter link 85 is movable in accordance with the pivotal movement of the third pivot link 84, thereby moving the shutter 64 between the closing position and the opening position.

Specifically, in accordance with the pivotal movement of the third pivot link 84 to move the operation cam 843 downward, the shutter link 85 is depressed downward by the coil spring 86 to move the shutter 64 to the closing position. The third pivot link 84 is at a first cam position when the shutter 64 is placed at the closing position (i.e., when the link 8 is in the first state) as a result of the pivotal movement of the third pivot link 84.

In accordance with the pivotal movement of the third pivot link 84 to move the operation cam 843 upward, the shutter link 85 is urged upward by the engagement surface 844*a* of the engagement hole 844 to move the shutter 64 to the opening position. The third pivot link 84 is at a second cam position when the shutter 64 is placed at the opening position (i.e., when the link 8 is in the second state) as a result of the pivotal movement of the third pivot link 84.

In the image-forming apparatus 1, the abutment piece 80 of the link 8 is brought into contact with the drum shaft 54*a* of the process cartridge 50 during the attachment/detachment of the process cartridge 50 relative to the housing 2, so that the abutment piece 80 is caused to move along the abutment piece rail 242. In this way, a driving force is transmitted from the drum shaft 54*a* to the shutter 64 through the link 8 to move the shutter 64 between the closing position and the opening position.

In the present embodiment, the link 8 includes the abutment piece 80, the first pivot link 81, the linear motion link 82, the second pivot link 83, the third pivot link 84, the shutter link 85, and the coil spring 86. As an alternative, the link 8 may be constituted by a single link connected to the shutter 64 and configured to open and close the shutter 64 in response to abutment with the process cartridge 50. Still alternatively, the link 8 may move differently from the pivotal/sliding movements as in the described embodiment, provided that the link 8 can function to open and close the shutter 64 in interlocking relation to the attachment and detachment of the process cartridge 50 to and from the housing 2.

<Urging Member 9>

Figure 13A:
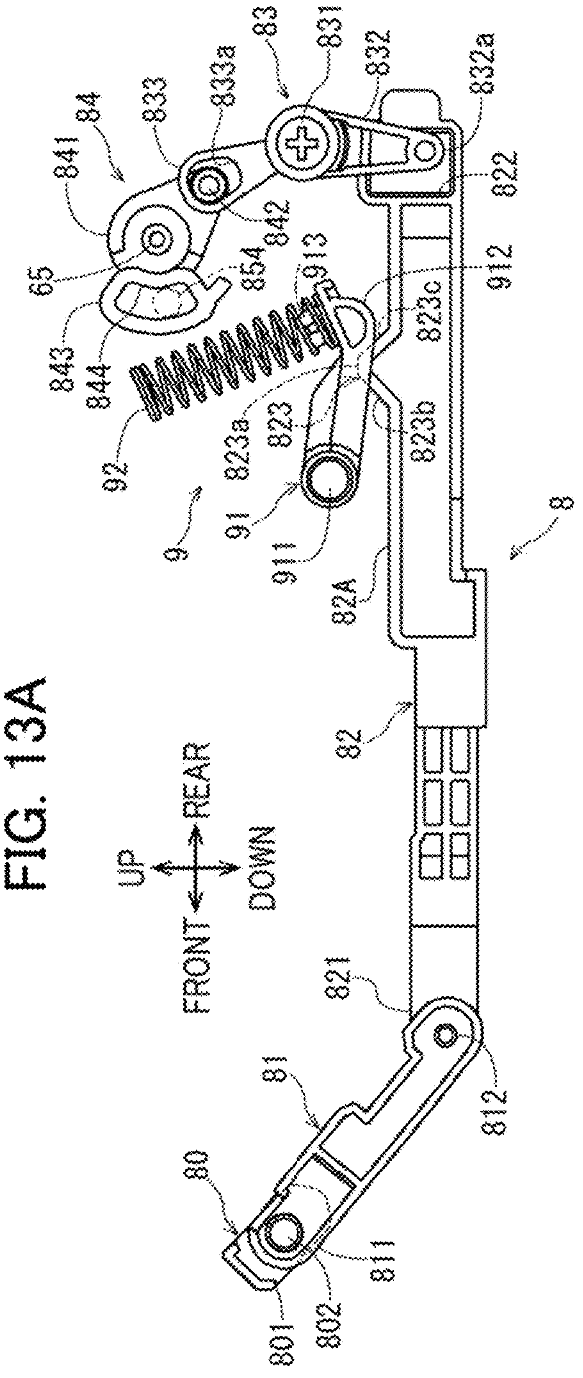
FIG. 13A is a right side view of a link in the image-forming apparatus, and particularly illustrating a state where a first boss of an abutment piece of the link is positioned in an intermediate portion of an abutment piece rail, and a second boss of the abutment piece is positioned in a front portion of the abutment piece rail.
Figure 13B:
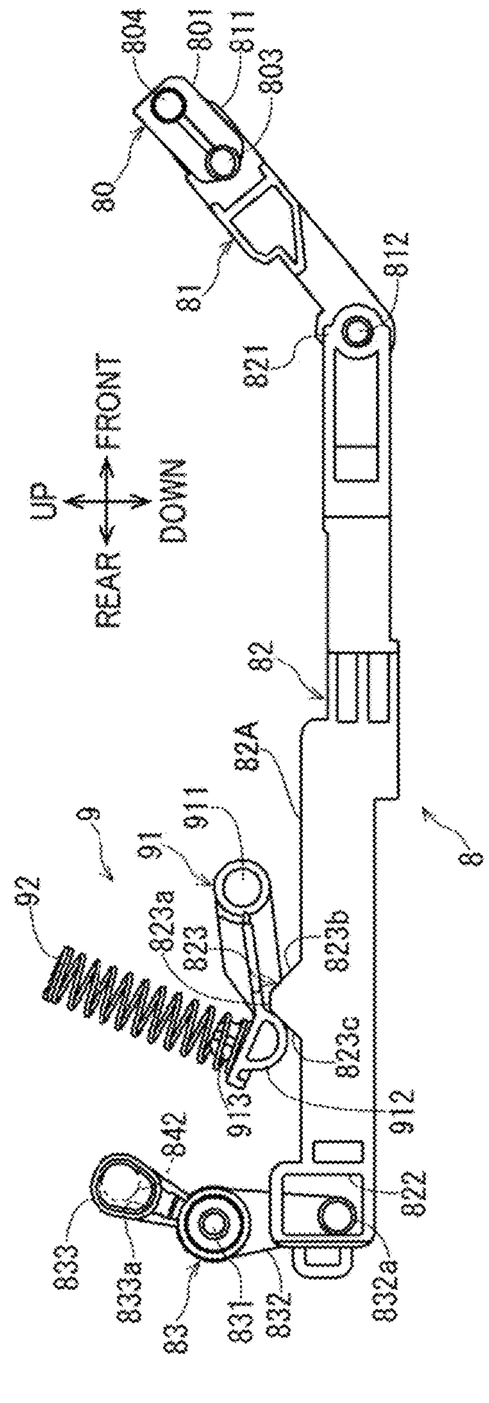
FIG. 13B is a left side view of the link in the state illustrated in FIG. 13A.

An urging member 9 is also provided in the housing 2, as illustrated in FIGS. 13A and 13B. The urging member 9 is configured to urge the link 8 in the direction for opening the shutter 64 (in the direction for moving the shutter 64 to the opening position) before the shutter 64 reaches the opening position in a process for the link 8 to move the shutter 64 from the closing position to the opening position. When the shutter 64 is at the opening position, the urging member 9 urges the linear motion link 82 rearward toward the second position.

Further, the urging member 9 is configured to urge the link 8 in the direction for closing the shutter 64 (in the direction for moving the shutter 64 to the closing position) before the shutter 64 reaches the closing position in a process for the link 8 to move the shutter 64 from the opening position to the closing position. When the shutter 64 is at the closing position, the urging member 9 urges the linear motion link 82 frontward toward the first position.

Further, the urging member 9 is configured to urge the link 8 so as to restrict further movement of the link 8, once the link 8 has moved the shutter 64 to the opening position or to the closing position. That is, when the shutter 64 is at the closing position, the urging member 9 urges the shutter 64 (through the link 8) such that the shutter 64 is retained at the closing position. When the shutter 64 is at the opening position, the urging member 9 urges the shutter 64 (through the link 8) such that the shutter 64 is retained at the opening position.

In this way, the urging member 9 is configured urge the link 8 to hold the shutter 64 at the closing position when the shutter 64 is at the closing position, and to hold the shutter 64 at the opening position when the shutter 64 is at the opening position. Hence, the urging member 9, a single member, can not only maintain the shutter 64 at its opening position to stably keep the shutter 64 opened, but also maintain the shutter 64 at its closing position to stably keep the shutter 64 closed.

The urging member 9 includes an urging spring 92 and a pressure arm 91. The pressure arm 91 is urged by the urging spring 92 and is configured to abut on the linear motion link 82 from above. The urging spring 92 urges a free end portion of the pressure arm 91 toward an upper surface 82A of the linear motion link 82. The urging member 9 can stably urge the linear motion link 82 through the pressure arm 91 that is connected to the urging spring 92. The urging member 9 is an example of "urging member" of the disclosure. The urging spring 92 is an example of "urging spring" of the disclosure. The pressure arm 91 is an example of "abutment part" of the disclosure.

The pressure arm 91 includes a base part 911, an abutment part 912, and a fitting part 913. The base part 911 is a base end portion of the pressure arm 91, and is pivotally movably supported by the first main frame 24. The abutment part 912 is the free end portion of the pressure arm 91, and is in abutment with a link protrusion 823 (described later) on the upper surface 82A of the linear motion link 82. The fitting part 913 is fitted in the locking spring 92. The pressure arm 91 extends in the front-rear direction. The base part 911 is at a front portion of the pressure arm 91, and the abutment part 912 is at a rear portion of the pressure arm 91. The fitting part 913 is positioned above the abutment part 912. The abutment part 912 is pivotally movable in the up-down direction about an axis of the base part 911.

The base part 911 is a pivot center of the pressure arm 91. Since the free end portion of the pressure arm 91 is provided with the abutment par 912, the linear motion link 82 can be smoothly urged by the pressure arm 91.

The urging spring 92 is supported by the first main frame 24. The urging spring 92 has a lower end portion fitted over the fitting part 913. The urging spring 92 urges the abutment part 912 of the pressure arm 91 downward toward the upper surface 82A of the linear motion link 82. The abutment part 912 is pressed against the link protrusion 823 on the upper surface 82A of the linear motion link 82 from above.

The linear motion link 82 has the link protrusion 823 on the upper surface 82A at a position between the fitting portion 821 and the connection hole 822. The link protrusion 823 protrudes upward from the upper surface 82A toward the urging member 9. In a side view, the link protrusion 823 has a mountain-like shape having a first depressed surface 823*a*, a second depressed surface 823*b*, and a third depressed surface 823*c*. The link protrusion 823 is an example of "protrusion" of the disclosure.

The second depressed surface 823*b* and third depressed surface 823*c* are sloped relative to the front-rear direction, which is coincident with directions in which the linear motion link 82 is movable. The third depressed surface 823*c* and the second depressed surface 823*b* are sloped to extend in different directions from each other.

The first depressed surface 823*a* constitutes an apex part of the mountain-like shape of the link protrusion 823. The first depressed surface 823*a* extends in a horizontal direction. The second depressed surface 823*b* is positioned frontward of the first depressed surface 823*a*, and is inclined diagonally upward toward the first depressed surface 823*a*. That is, the second depressed surface 823*b* is inclined diagonally upward toward the rear. In this way, the second depressed surface 823*b* is sloped diagonally upward as extending in a moving direction of the linear motion link 82 toward the second position from the first position. The second depressed surface 823*b* has a rear end connected to a front end of the first depressed surface 823*a*.

The third depressed surface 823*c* is positioned rearward of the first depressed surface 823*a*, and is inclined diagonally downward as extending away from the first depressed surface 823*a*. That is, the third depressed surface 823*c* is inclined diagonally downward toward the rear. In this way, the third depressed surface 823*c* is sloped diagonally upward as extending in a moving direction of the linear motion link 82 toward the first position from the second position. The third depressed surface 823*c* has a front end connected to a rear end of the first depressed surface 823*a*. The third depressed surface 823*c* is positioned opposite the second depressed surface 823*b* with respect to the first depressed surface 823*a* in the front-rear direction.

The linear motion link 82 is movable in the front-rear direction to move the abutment part 912 of the pressure arm 91 among three different positions relative to the link protrusion 823: the abutment part 912 is on the first depressed surface 823*a* to press the same; the abutment part 912 is on the second depressed surface 823*b* to press the same; and the abutment part 912 is on the third depressed surface 823*c* to press the same. The pressure arm 91 urged by the urging spring 92 can abut on the second depressed surface 823*b* and the third depressed surface 823*c*. Specifically, the pressure arm 91 abuts on the third depressed surface 823*c* when the linear motion link 82 is at the first position (for closing the shutter 64), and the pressure arm 91 abuts on the second depressed surface 823*b* when the linear motion link 82 is at the second position (for opening the shutter 64).

The first depressed surface 823*a* is a flat surface extending in the horizontal direction. As such, while the pressure arm 91 presses the first depressed surface 823*a* from above, the pressing force from the pressure arm 91 neither acts rearward (i.e., in the direction for moving the linear motion link 82 toward the second position) nor frontward (i.e., in the direction for moving the linear motion link 82 toward the first position).

The second depressed surface 823*b* is inclined diagonally upward toward the rear. As such, while the pressure arm 91 presses the second depressed surface 823*b* from above, the pressing force from the pressure arm 91 acts rearward, i.e., in the direction for moving the linear motion link 82 toward the second position. In a state where the pressure arm 91 abuts on the second depressed surface 823*b*, the second depressed surface 823*b* converts the downward urging force of the urging spring 92 into a force acting in the direction for moving the linear motion link 82 from the first position toward the second position. Further, in the state where the pressure arm 91 presses the second depressed surface 823*b* from above, the abutment part 912 of the pressure arm 91 is engaged with the second depressed surface 823*b*, thereby restricting the linear motion link 82 from moving frontward.

The third depressed surface 823*c* is inclined diagonally downward toward the rear. As such, while the pressure arm 91 presses the third depressed surface 823*c* from above, the pressing force from the pressure arm 91 acts frontward. i.e., in the direction for moving the linear motion link 82 toward the first position. In a state where the pressure arm 91 abuts on the third depressed surface 823*c*, the third depressed surface 823*c* converts the downward urging force of the urging spring 92 into a force acting in the direction for moving the linear motion link 82 from the second position toward the first position. Further, in the state where the pressure arm 91 presses the third depressed surface 823*c* from above, the abutment part 912 of the pressure arm 91 is engaged with the third depressed surface 823*c*, thereby restricting the linear motion link 82 from moving rearward.

In this way, since the linear motion link 82 includes the link protrusion 823 having the second depressed surface 823*b* and the third depressed surface 823*c*, the pressure arm 91 pressed by the urging spring 92 can urge the linear motion link 82 in the front-rear direction by abutting on either the second depressed surface 823*b* or the third depressed surface 823*c*. With this structure, by utilizing the urging force of the urging spring 92, the shutter 64 can be stably maintained at its closing position and at its opening position, respectively, so that the shutter 64 can be stably kept closed and opened.

<Operations of Link 8>

Hereinafter, operations of the link 8 will be described.

(Operations for Attachment of the Process Cartridge 5)

Firstly, operations of the link 8 at the time of attachment of the process cartridge 50 to the housing 2 will be described.

Figure 14:
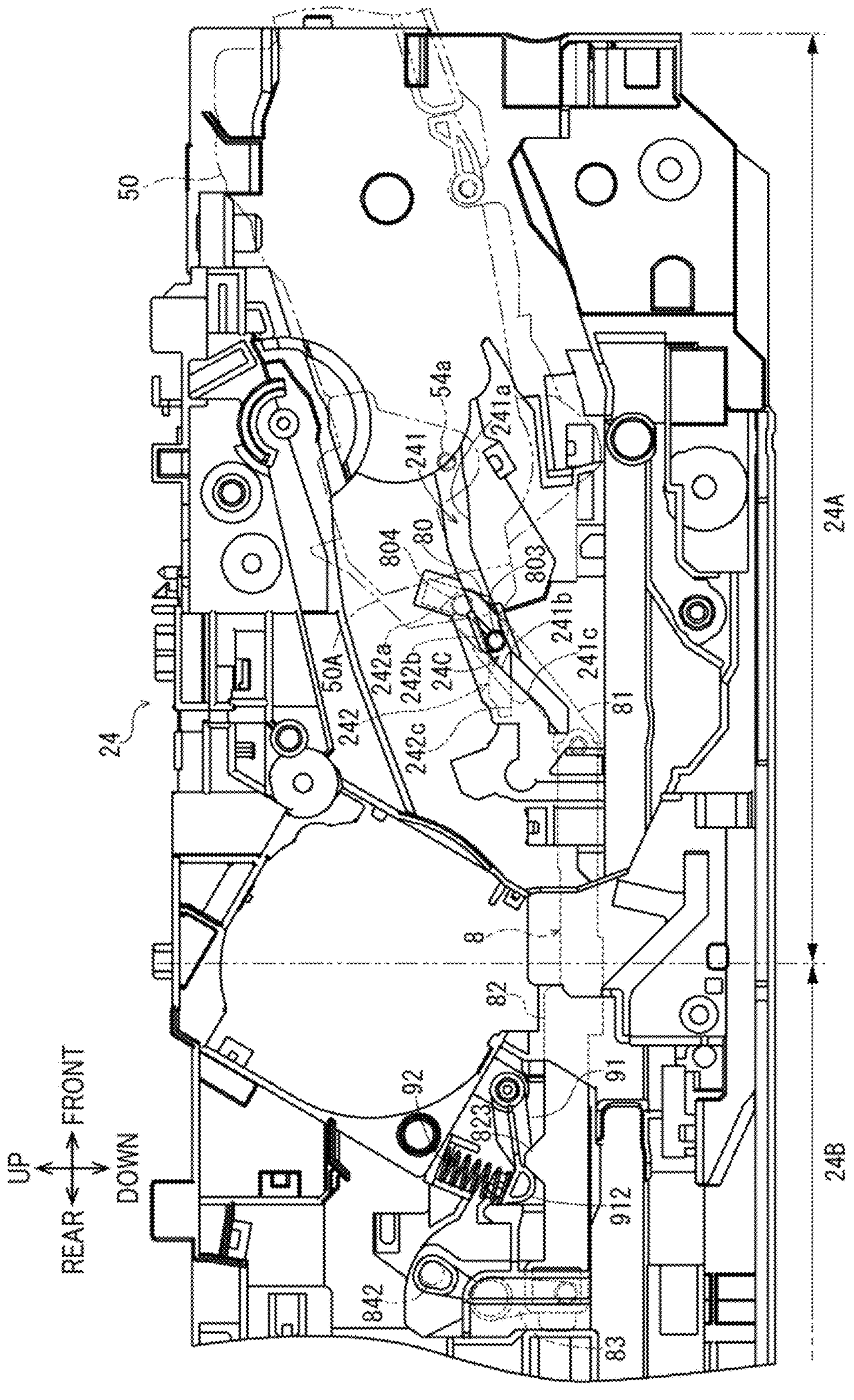
FIG. 14 is a side view of the first main frame, and particularly illustrating a state where the process cartridge is at its attachment starting position, the first boss is positioned in the intermediate portion of the abutment piece rail, and the second boss is positioned in the front portion of the abutment piece rail.

Referring to FIGS. 13A through 14, in a state prior to attachment of the process cartridge 50 to the housing 2 where the process cartridge 50 is detached from the housing 2, and in a state where the process cartridge 50 is at an attachment starting position thereof illustrated in FIG. 14 (in a state where a leading end 50A of the process cartridge 50 in an inserting direction thereof is inserted in the housing 2), the drum shaft 54*a* is positioned frontward of and away from the abutment piece 80, and the abutment piece 80 is positioned to extend over the front portion 242*a* and the intermediate portion 242*b* of the abutment piece rail 242.

Specifically, at this time, the abutment piece 80 is fitted in the abutment piece rail 242 such that the first boss 803 is positioned in the intermediate portion 242*b* (the through-hole 24C) of the abutment piece rail 242 and the second boss 804 is positioned in the front portion 242*a* of the abutment piece rail 242. Here, the inserting direction of the process cartridge 50 is coincident with the attachment direction of the process cartridge 50.

In the state where the abutment piece 80 is at the position illustrated in FIG. 14, the shutter 64 has been moved by the link 8 to the closing position (illustrated in FIG. 6A). With this structure, even if the user inadvertently inserts his hand into housing 2 through the opening 2A in the state where the process cartridge 50 is detached from the housing 2, the shutter 64 can block the user's hand from touching the heating unit 61 of the fixing device 6.

Further, in the state where the abutment piece 80 is at the position illustrated in FIG. 14, the abutment part 912 of the pressure arm 91 is in abutment with the third depressed surface 823*c* of the linear motion link 82 (illustrated in FIGS. 13A and 13B), thereby restricting the linear motion link 82 from moving rearward. That is, the linear motion link 82 is fixed in position by the urging member 9, with the shutter 64 having moved to the closing position by the link 8. With this structure, the shutter 64 is restricted from moving unexpectedly from the closing position to the opening position, and the shutter 64 can be securely maintained at the closing position.

Further, the abutment piece rail 242 formed in the front frame 24A for guiding the abutment piece 80 is positioned outward of the cartridge rail 241 in the left-right direction, and the first boss 803 and the second boss 804 of the abutment piece 80 are so positioned not to protrude further inward toward the process cartridge 50 relative to the front frame 24A in the left-right direction. This structure can restrain the user's hand from touching the abutment piece 80 in the state where the process cartridge 50 is detached from the housing 2, thereby suppressing accidental opening of the shutter 64 due to unexpected movement of the link 8.

Figure 16:
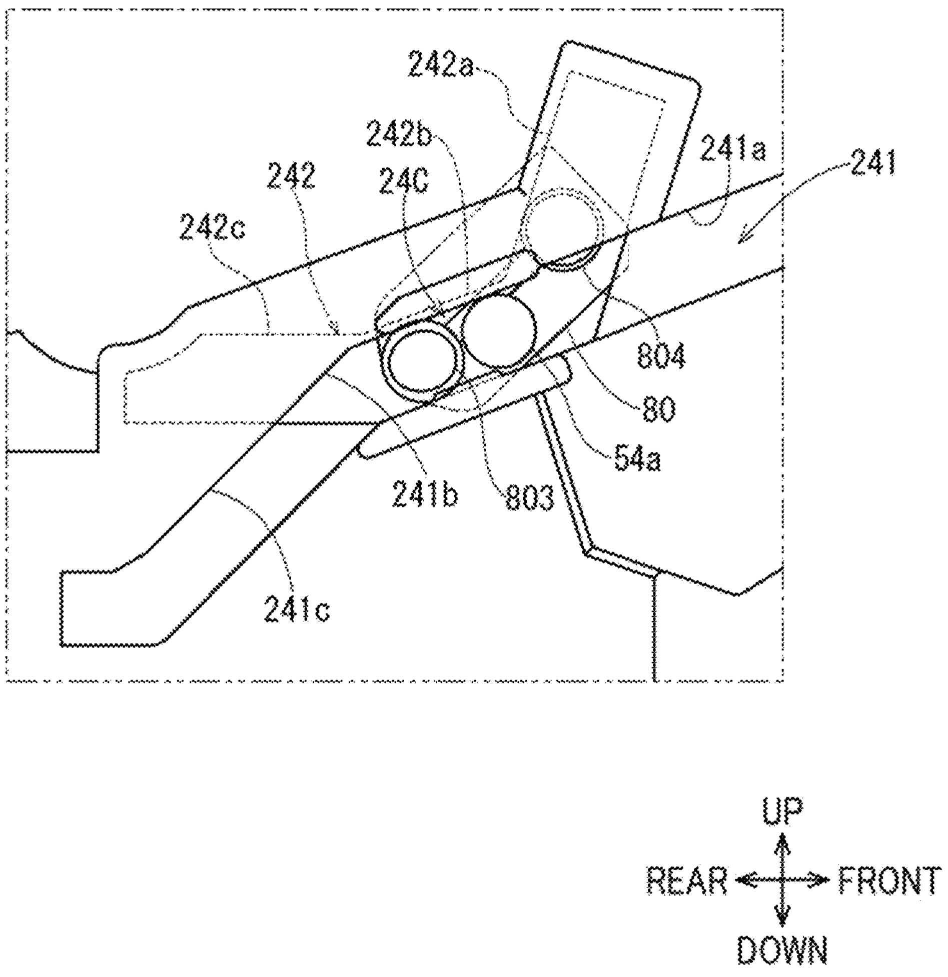
FIG. 16 is an enlarged side view of the first main frame, and particularly illustrating a state where a drum shaft of the process cartridge having reached an intermediate portion of a cartridge rail abuts on the first boss of the abutment piece.
Figures 17A, 17B:
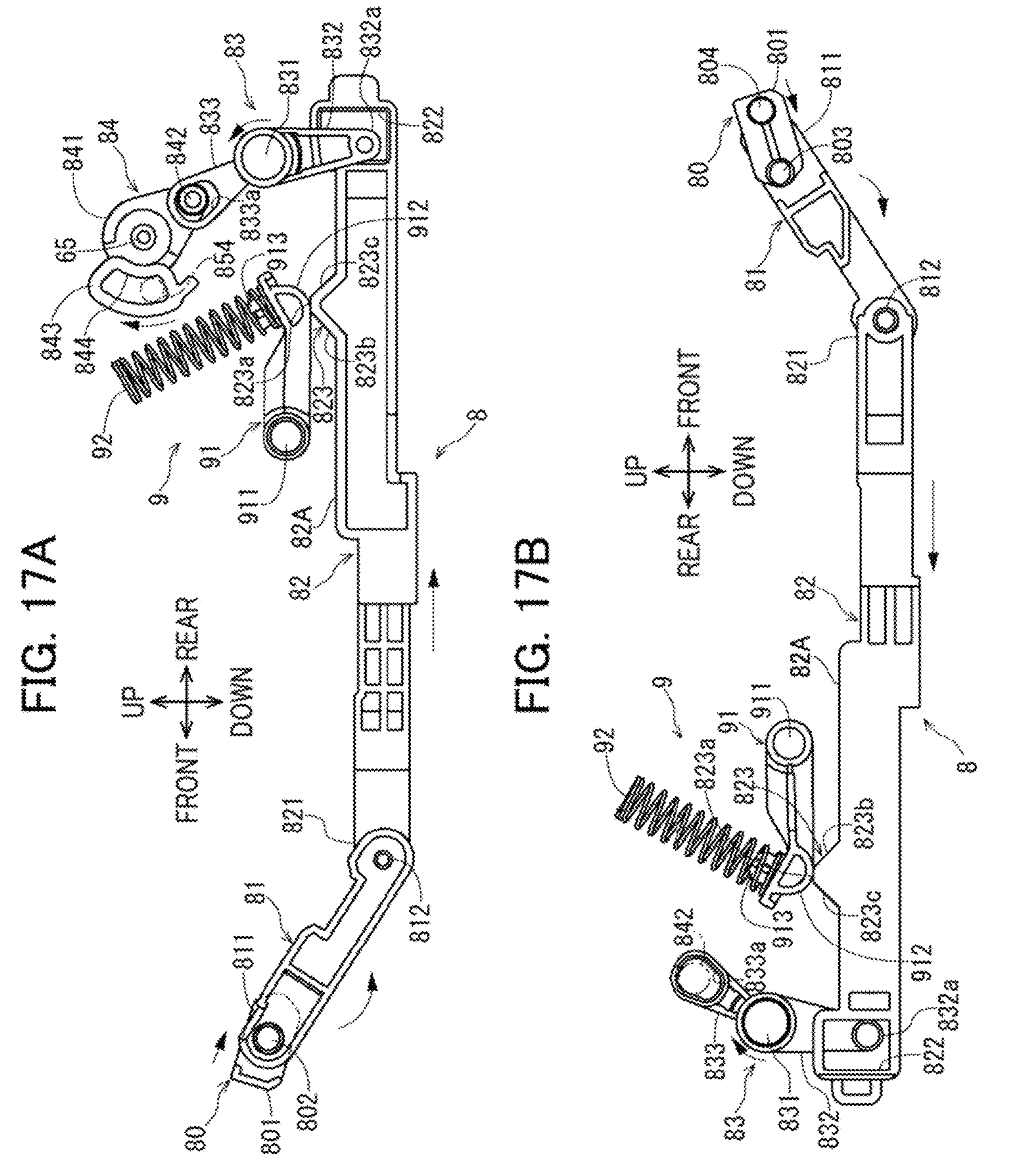
FIG. 17A is a right side view of the link, and particularly illustrating a state where the drum shaft abuts on the abutment piece, a rear part of the first boss of the abutment piece is positioned in a rear portion of the abutment piece rail, and the second boss is positioned in the intermediate portion of the abutment piece rail.
FIG. 17B is a left side view of the link in the state illustrated in FIG. 17A.

As the process cartridge 50 at the attachment starting position is further inserted in the attachment direction toward the attachment position, the drum shaft 54*a* enters the front portion 241*a* of the cartridge rail 241 and moves along the cartridge rail 241. As illustrated in FIG. 16, when the drum shaft 54*a* moving along the cartridge rail 241 enters the intermediate portion 241*b* (the through-hole 24C), the drum shaft 54*a* abuts on the first boss 803 of the abutment piece 80.

As illustrated in FIGS. 17A through 19, when being abutted by the drum shaft 54*a* that is moving in the intermediate portion 241*b* (the through-hole 24C) of the cartridge rail 241, the abutment piece 80 is depressed by the drum shaft 54*a* and is moved toward downstream in the attachment direction of the process cartridge 50, i.e., toward the rear.

While the abutment piece 80 is being moved by the drum shaft 54*a* that is moving in the intermediate portion 241*b* (through-hole 24C), the first boss 803 is positioned such that: a rear part of the first boss 803 is positioned in the rear portion 242*c* of the abutment piece rail 242; and a remaining part of the first boss 803 is positioned in the intermediate portion 242*b* (the through-hole 24C) of the abutment piece rail 242. Further, the second boss 804 is positioned in the intermediate portion 242*b* (through-hole 24C) of the abutment piece rail 242.

In accordance with the movement of the abutment piece 80, the first pivot link 81 connected to the abutment piece 80 is pivotally moved downward to reduce an inclination angle of the first pivot link 81 with respect to the horizontal direction (see FIGS. 17A and 17B), and is moved rearward. In response to the pivotal movement and rearward movement of the first pivot link 81, the linear motion link 82 connected to the first pivot link 81 is linearly moved rearward.

In response to the rearward movement of the linear motion link 82, the connection hole 822 of the linear motion link 82 is brought into engagement with the engagement pin 832*a* of the second pivot link 83, thereby pivotally moving the second pivot link 83 about the axis of the base support portion 831 such that the engagement pin 832*a* is moved rearward. In response to the pivotal movement of the second pivot link 83, the connection hole 833*a* of the second pivot link 83 is brought into engagement with the engagement pin 842 of the third pivot link 84, thereby pivotally moving the third pivot link 84 about the support shaft 65 such that the engagement pin 842 is moved frontward.

In accordance with the rearward movement of the linear motion link 82, the abutment part 912 of the pressure arm 91 of the urging member 9 climbs up the third depressed surface 823*c* of the link protrusion 823 against the urging force of the urging spring 92 and moves onto the first depressed surface 823*a* from the third depressed surface 823*c*. That is, the pressure arm 91 abuts on the first depressed surface 823*a* after abutting on the third depressed surface 823*c* in the process for attaching the process cartridge 50 to the housing 2. In a state where the pressure arm 91 is in abutment with the first depressed surface 823*a* which is a horizontal plane, the urging member 9 does not restrict the shutter 64 from moving from the closing position to the opening position.

With this structure, in the process for attaching the process cartridge 50 to the housing 2, the linear motion link 82 moves rearward against the pressing force of the pressure arm 91. As a result of the rearward movement of the linear motion link 82, the shutter 64, which has been held at the closing position, is now ready to shift into the opening position from the closing position. That is, the shutter 64 is now switchable in state from the closing state to the opening state.

Figure 18:
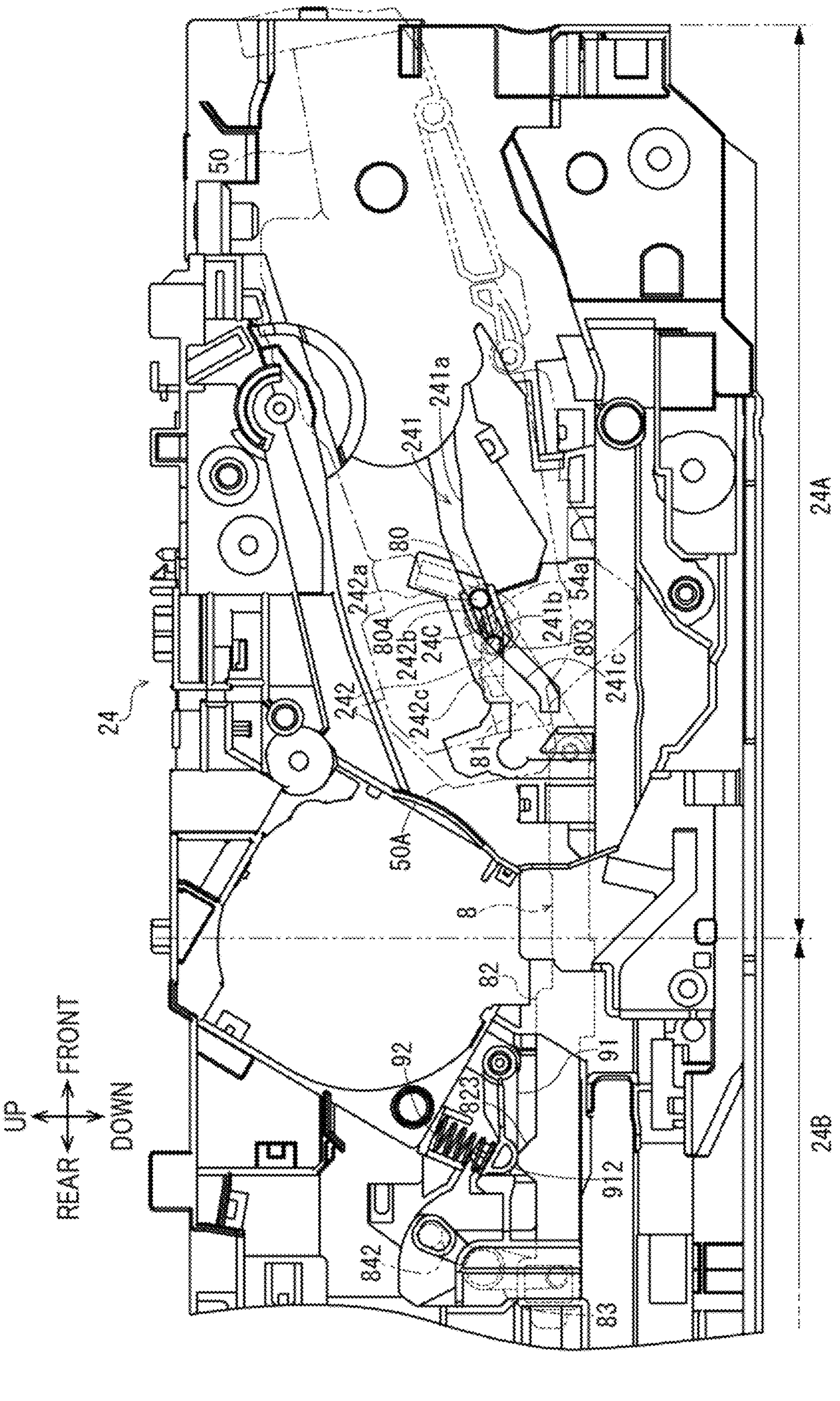
FIG. 18 is a side view of the first main frame, and particularly illustrating the state where the drum shaft abuts on the abutment piece, the rear part of the first boss is positioned in the rear portion of the abutment piece rail, and the second boss is positioned in the intermediate portion of the abutment piece rail.
Figure 19:
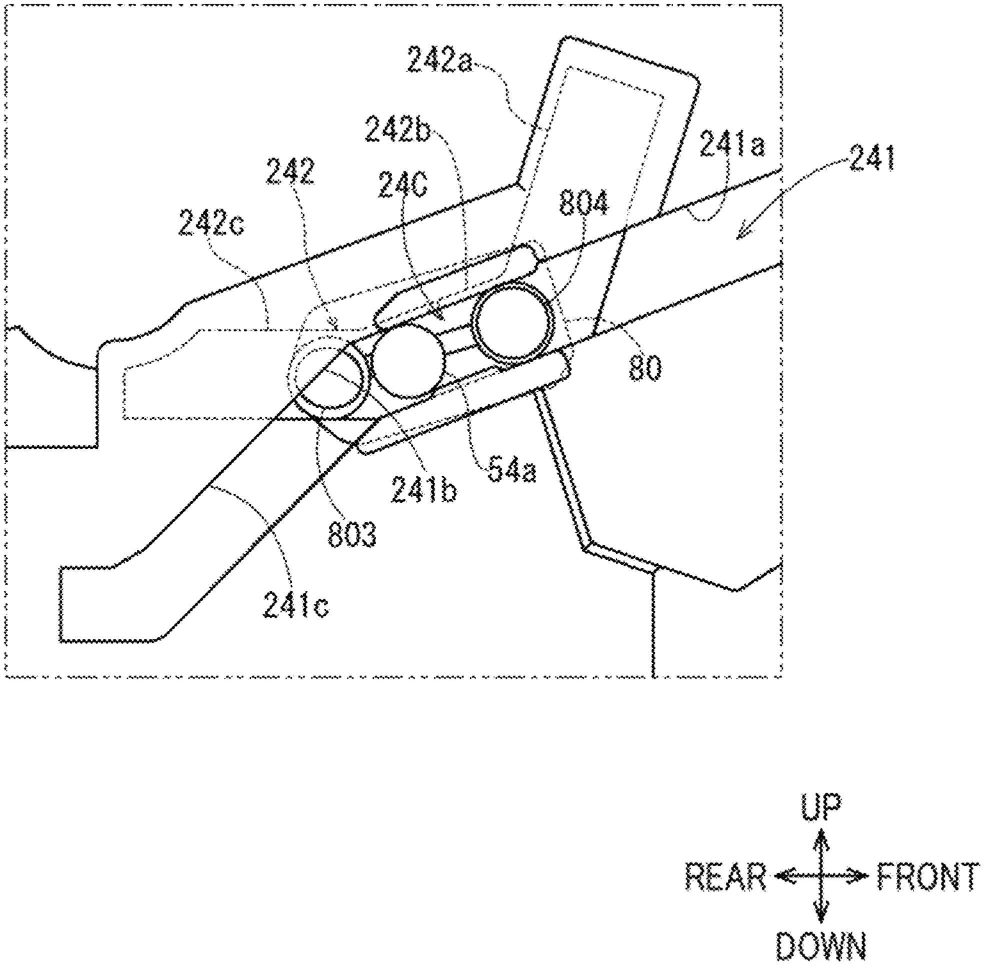
FIG. 19 is an enlarged side view of the first main frame, and particularly illustrating the state where the drum shaft abuts on the abutment piece, the rear part of the first boss is positioned in the rear portion of the abutment piece rail, and the second boss is positioned in the intermediate portion of the abutment piece rail.
Figure 21:
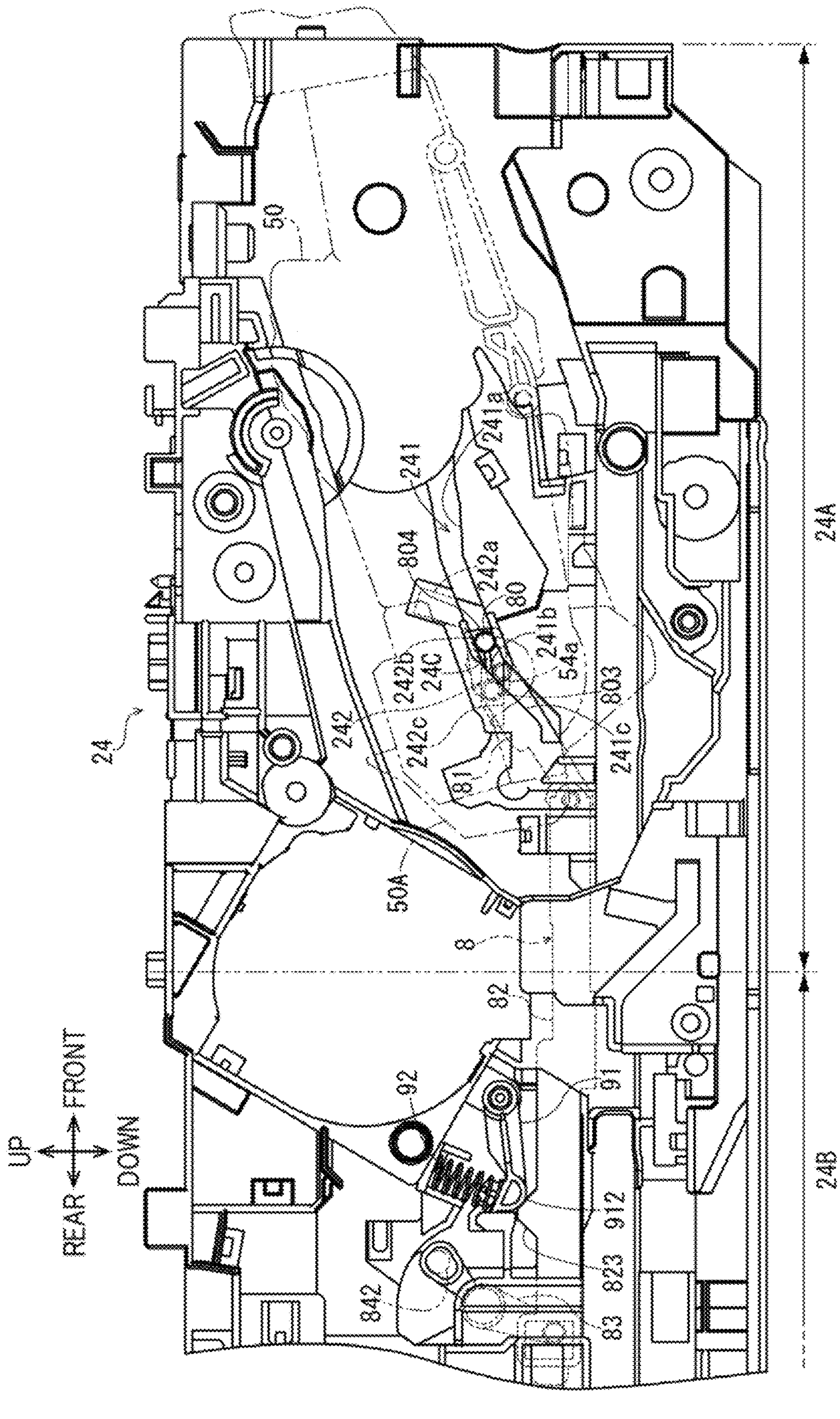
FIG. 21 is a side view of the first main frame, and particularly illustrating the state where the drum shaft abuts on the abutment piece, the first boss is positioned in the rear portion of the abutment piece rail, and the second boss is positioned in the intermediate portion of the abutment piece rail.

As the process cartridge 50 is further inserted toward the attachment position from the position illustrated in FIG. 18, the abutment piece 80 is further moved toward downstream in the attachment direction by the drum shaft 54*a* that is moving along the intermediate portion 241*b* (the through-hole 24C) of the cartridge rail 241, as illustrated in FIG. 21. At this time, as illustrated in FIG. 21, the first boss 803 of the abutment piece 80 is positioned in the rear portion 242*c* of the abutment piece rail 242, and the second boss 804 of the abutment piece 80 is positioned in the intermediate portion 242*b* (the through-hole 24C) of the abutment piece rail 242.

Figure 22:
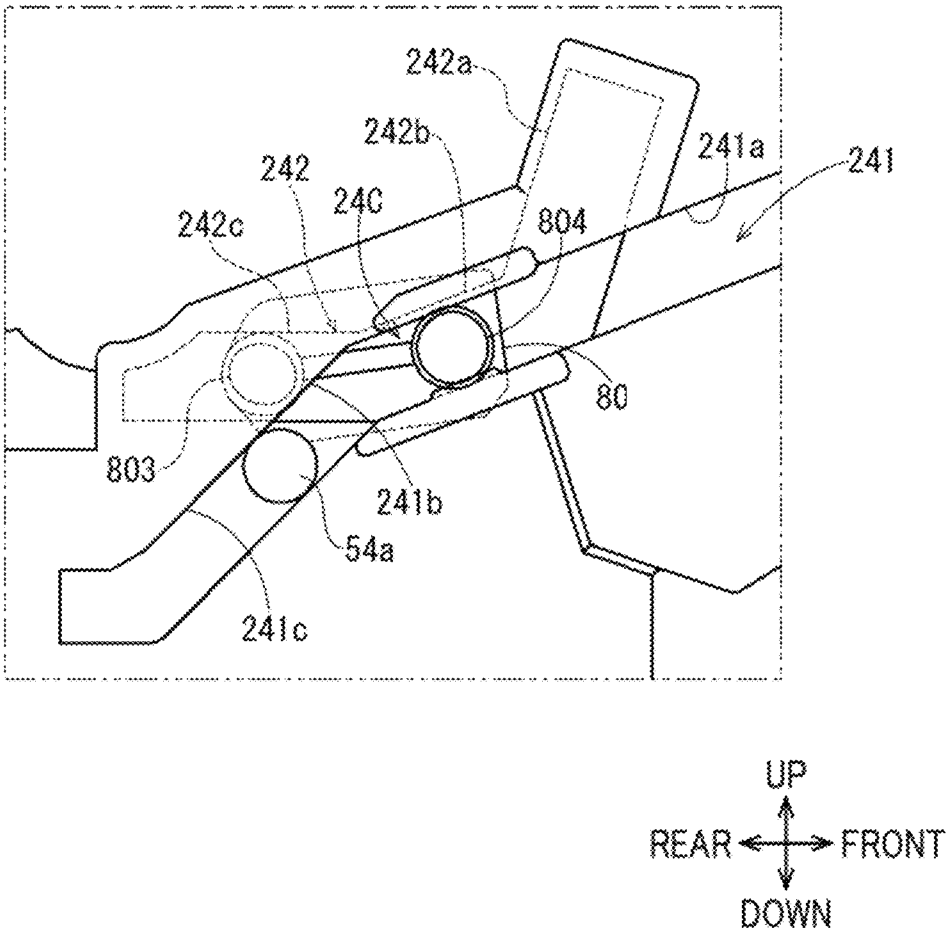
FIG. 22 is an enlarged side view of the first main frame, and particularly illustrating a state where the drum shaft has moved from the intermediate portion to a rear portion of the cartridge rail and is separated away from the abutment piece.

As illustrated in FIG. 22, the drum shaft 54*a* has moved into the rear portion 241*c* from the intermediate portion 241*b* in the cartridge rail 241, after pushing and moving the first boss 803 into the rear portion 242*c* of the abutment piece rail 242. Hence, the drum shaft 54*a* is now separated from the abutment piece 80.

Figures 20A, 20B:
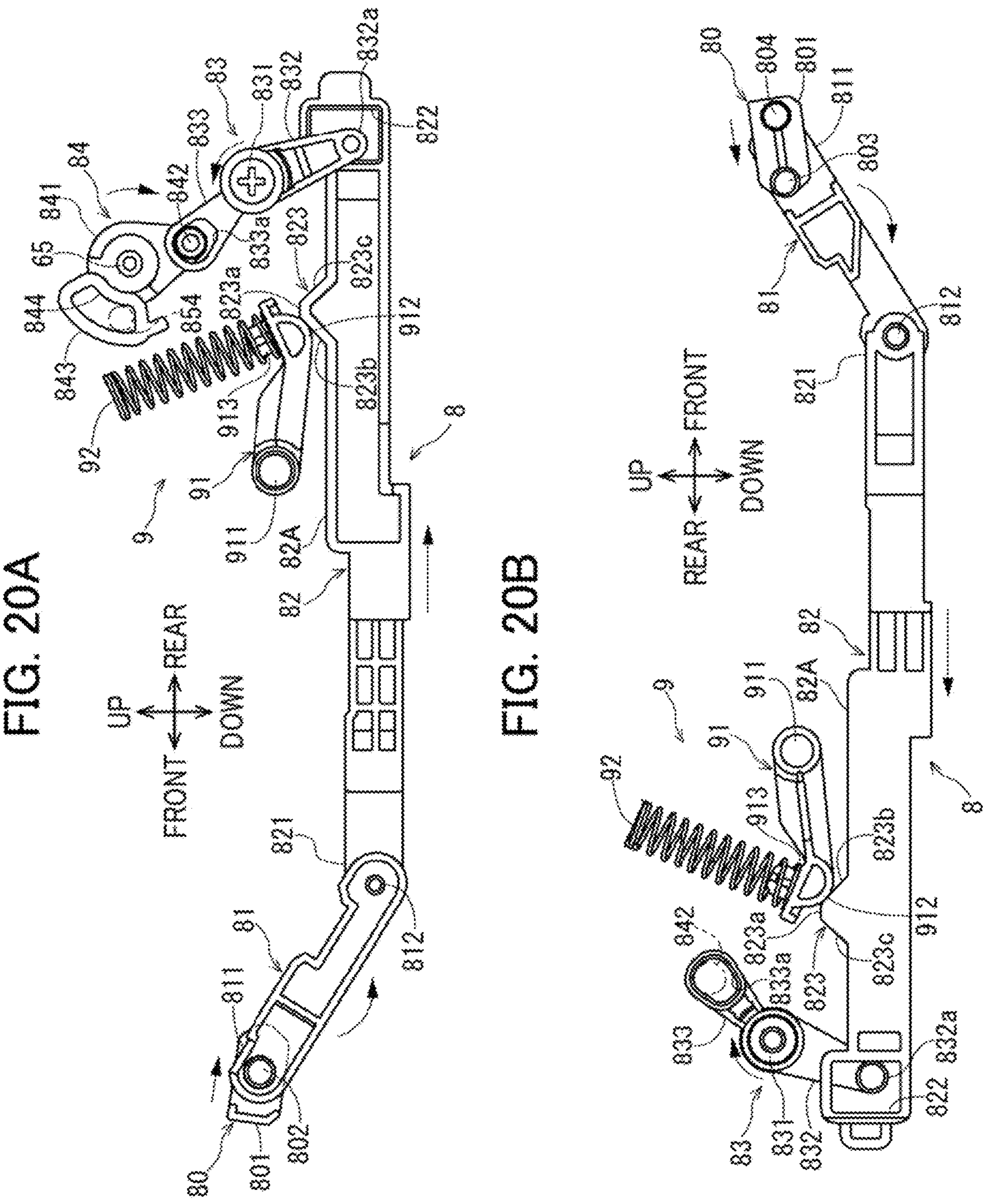
FIG. 20A is a right side view of the link, and particularly illustrating a state where the drum shaft abuts on the abutment piece, the first boss is positioned in the rear portion of the abutment piece rail, and the second boss is positioned in the intermediate portion of the abutment piece rail.
FIG. 20B is a left side view of the link in the state illustrated in FIG. 20A.

In accordance with the movement of the abutment piece 80, the first pivot link 81 is pivotally moved downward to further reduce the inclination angle of the first pivot link 81 with respect to the horizontal direction, and at the same time the first pivot link 81 is moved further rearward, as illustrated in FIGS. 20A and 20B. In response to the pivotal movement and rearward movement of the first pivot link 81, the linear motion link 82 is further linearly moved rearward. In response to the rearward movement of the linear motion link 82, the second pivot link 83 is further pivotally moved such that the engagement pin 832*a* is moved rearward. In response to the pivotal movement of the second pivot link 83, the third pivot link 84 is further pivotally moved such that the engagement pin 842 is moved frontward.

In response to the pivotal movement of the third pivot link 84, the engagement surface 844*a* of the engagement hole 844 in the operation cam 843 is brought into engagement with the engagement pin 854 of the shutter link 85 from below. Due to the engagement of the engagement surface 844*a* with the engagement pin 854, the shutter link 85 is pivotally moved in such a direction that the engagement portion 853 is moved upward, thereby moving the shutter 64 from the closing position toward the opening position.

In this case, since the movement of the drum shaft 54*a* abutting on the abutment piece 80 is transmitted to the shutter 64 through the link 8, the driving force can be efficiently transmitted to the shutter 64 even if the process cartridge 50 at the attachment position in the housing 2 is apart from the shutter 64.

When the drum shaft 54*a* moves the abutment piece 80 until the first boss 803 reaches the rear portion 242*c* of the abutment piece rail 242, as illustrated in FIG. 22, the linear motion link 82 moves further rearward, which then causes the abutment part 912 of the pressure arm 91 of the urging member 9 to move from the first depressed surface 823*a* to the second depressed surface 823*b* of the linear motion link 82 due to the urging force of the urging spring 92 (see FIGS. 20A and 20B).

Here, in a state where the abutment piece 80 has moved until the first boss 803 is in the rear portion 242*c* of the abutment piece rail 242, the position of the abutment part 912 of the pressure arm 91 on the second depressed surface 823*b* (at which position the abutment part 912 abuts on the second depressed surface 823*b*) is subject to a dimensional tolerance of each component constituting the link 8 and a tolerance in connecting position between the components.

In this connection, a positional relationship between the pressure arm 91 and the link 8 is so designed that the abutment part 912 of the pressure arm 91 abuts on the second depressed surface 823*b* without fail in the state where the abutment piece 80 has moved to such a position that the first boss 803 is located in the rear portion 242*c* of the abutment piece rail 242. Further, within the dimensional tolerance of each component constituting the link 8, the pressure arm 91 and the link 8 are so designed that the abutment part 912 does not contact a flat part of the upper surface 82A of the linear motion link 82 even in a case where the abutment part 912 abuts on the second depressed surface 823*b* at a lowermost end thereof, the flat part being positioned frontward of the second depressed surface 823*b*.

After the abutment part 912 abuts on the second depressed surface 823*b* (after the abutment piece 80 has moved until the first boss 803 reaches the rear portion 242*c* of the abutment piece rail 242), the drum shaft 54*a* no longer moves the abutment piece 80 since the drum shaft 54*a* is separated away from the first boss 803 of the abutment piece 80. However, since the abutment part 912 is in abutment with the second depressed surface 823*b* as illustrated in FIGS. 23A and 23B, the pressing force from the pressure arm 91 is applied to the linear motion link 82 in a direction for urging the linear motion link 82 toward the second position, thereby causing the linear motion link 82 to move rearward.

As illustrated in FIG. 6B, in accordance with the rearward movement of the linear motion link 82 due to the pressing force applied from the pressure arm 91, the shutter link 85 is pivotally moved in such a direction that the engagement portion 853 is moved upward, thereby moving the shutter 64 to the opening position.

Figure 23A:
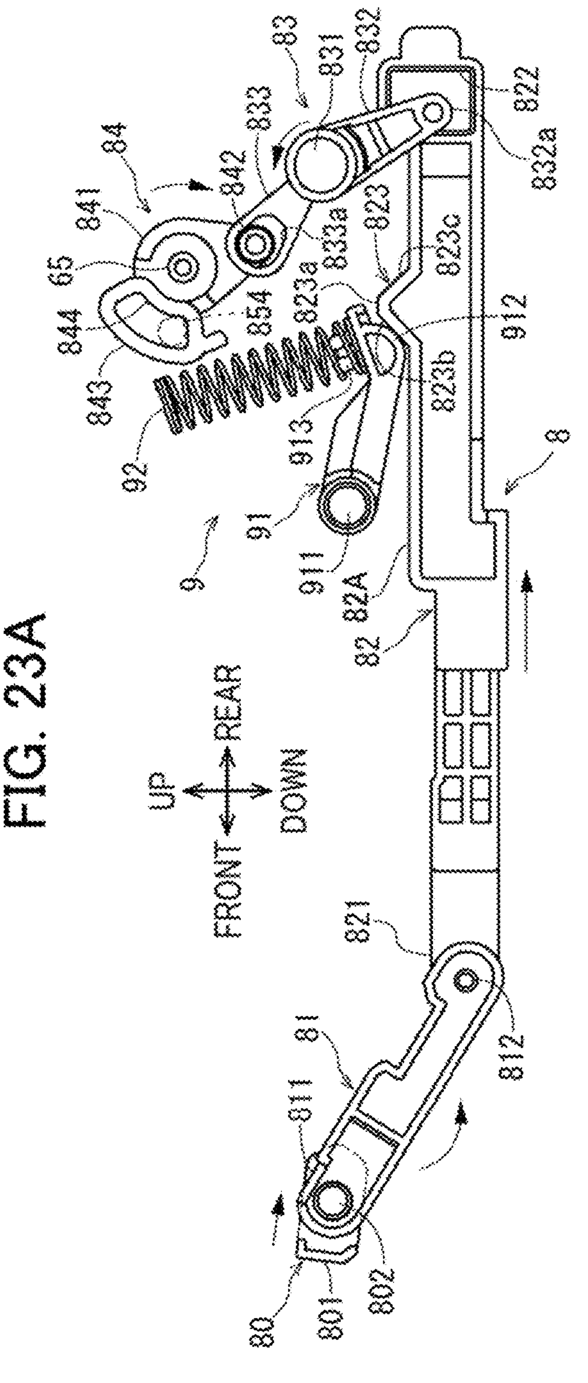
FIG. 23A is a right side view of the link, and particularly illustrating a state where a linear motion link is moved rearward by a pressing force of a pressure arm from the position illustrated in FIG. 19.
Figure 23B:
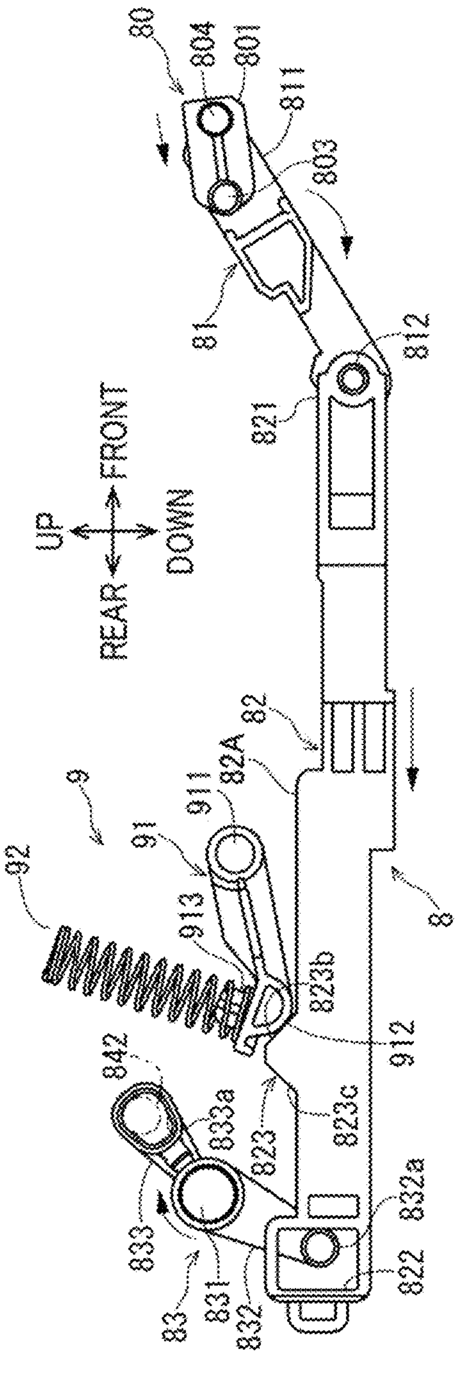
FIG. 23B is a left side view of the link in state illustrated in FIG. 23A.

Here, the pressure arm 91 and the link 8 are so designed that the abutment part 912 of the pressure arm 91 does not contact the flat part of the upper surface 82A positioned frontward of the second depressed surface 823*b* even in a case where the linear motion link 82 has been moved rearward by the pressing force of the pressure arm 91 until the shutter 64 is moved to the opening position (see FIGS. 23A and 23B). With this structure, the shutter 64 can be maintained at its opening position by the pressing force from the pressure arm 91.

Figure 24:
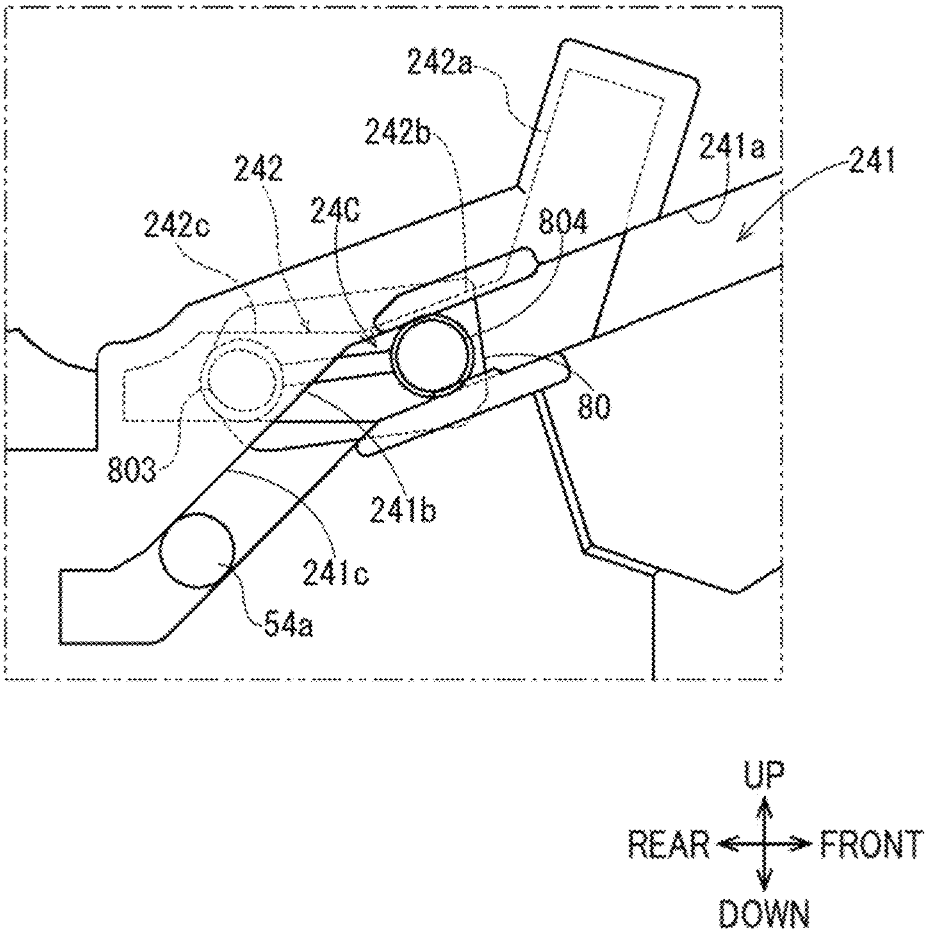
FIG. 24 is an enlarged side view of the first main frame, and particularly illustrating a state where the first boss of the abutment piece has moved rearward from the position illustrated in FIG. 21.

Further, as the linear motion link 82 moves rearward by the pressing force applied from the pressure arm 91, the abutment piece 80 is pulled by the first pivot link 81 to be moved rearward, so that the first boss 803 of the abutment piece 80 moves from the position illustrated in FIG. 22 to the position illustrated in FIG. 24 along the rear portion 242*c* of the abutment piece rail 242.

When the shutter 64 has moved to the opening position, the abutment end part 64*a* of the shutter 64 abuts on the abutment surface 631 of the fixing frame 63, thereby restricting further pivoting of the shutter 64 and terminating further movement of the link 8. Since the further movement of the shutter 64 is restricted due to the abutment with the abutment surface 631, the shutter 64 can be maintained at the opening position. Further, since the movement of the link 8 is also terminated, a movable range of the link 8 can be set smaller.

Further, in the state where the pressure arm 91 is in abutment with the second depressed surface 823*b*, the abutment part 912 of the pressure arm 91 is engaged with the second depressed surface 823*b* to restrict the linear motion link 82 from moving frontward. The linear motion link 82 is thus fixed in position by the urging member 9 in a state where the shutter 64 is at the opening position, thereby restraining the shutter 64 from unexpectedly moving from the opening position toward the closing position.

In this way, the image-forming apparatus 1 is so configured that: the abutment piece 80 is contacted by the drum shaft 54*a* of the process cartridge 50 that is being attached to the housing 2, and is moved by the drum shaft 54*a* to move the shutter 64 from the closing position toward the opening position; the abutment piece 80 is then separated from the drum shaft 54*a* before the shutter 64 arrives at the opening position; and the abutment piece 80 separated from the drum shaft 54*a* then moves further to move the shutter 64 to the opening position.

With this structure, when the shutter 64 has arrived at the opening position, the link 8 including the abutment piece 80 and the process cartridge 50 including the drum shaft 54*a* are separated from each other. Therefore, a user's operation to the process cartridge 50 does not affect opening/closing states of the shutter 64. Further, since there is no need to move the link 8 after the shutter 64 has moved to the opening position, the movable range of the link 8 can be set smaller.

Further, in the process for attachment of the process cartridge 50 to the housing 2, once the link 8 and the process cartridge 50 are separated from each other after the process cartridge 50 abuts on the link 8, the linear motion link 82 is configured to be urged to move toward the second position by the pressure arm 91 of the urging member 9.

With this structure, since the link 8 is configured to be urged toward the second state by the urging member 9 even after the link 8 is separated from the process cartridge 50, the shutter 64 can be moved to the opening position by the link 8 that is urged by the urging member 9.

In particular, the link 8 can shift to the second state by the pressing of the pressure arm 91 against the second depressed surface 823*b* of the linear motion link 82, thereby moving the shutter 64 to the opening position.

Further, the pressure arm 91 is configured to abut on the first depressed surface 823*a* of the link 8 when the abutment piece 80 of the link 8 is abutted by the process cartridge 50 that is being attached to the housing 2, and the link 8 is configured to shift toward the second state such that the pressure arm 91 abuts on the second depressed surface 823*b* of the link 8 before the link 8 and the process cartridge 50 are separated from each other.

With this structure, since the pressure arm 91 is in abutment with the second depressed surface **823*b* when the link 8 and the process cartridge 50 are separated from each other, the link 8 can reliably move the shutter 64 to the opening position even after the link 8 is separated from the process cartridge 50**.

As the process cartridge 50 is further inserted toward the attachment position from the position illustrated in FIG. 21, the drum shaft **54*a* moves from the intermediate portion 241*b* to the rear portion 241*c* of the cartridge rail 241, and then moves in the attachment direction toward the attachment position within the rear portion 241*c*. Thereafter, the process cartridge 50 reaches the attachment position illustrated in FIG. 25, where attachment of the process cartridge 50 to the housing 2** is complete.

(Operations for Detachment of the Process Cartridge 50)

Next, operations of the link 8 at the time of detachment of the process cartridge 50 at the attachment position from the housing 2 will be described. For detachment of the process cartridge 50, the operations performed for attaching the process cartridge 50 to the housing 2 are performed in reverse.

Figure 25:
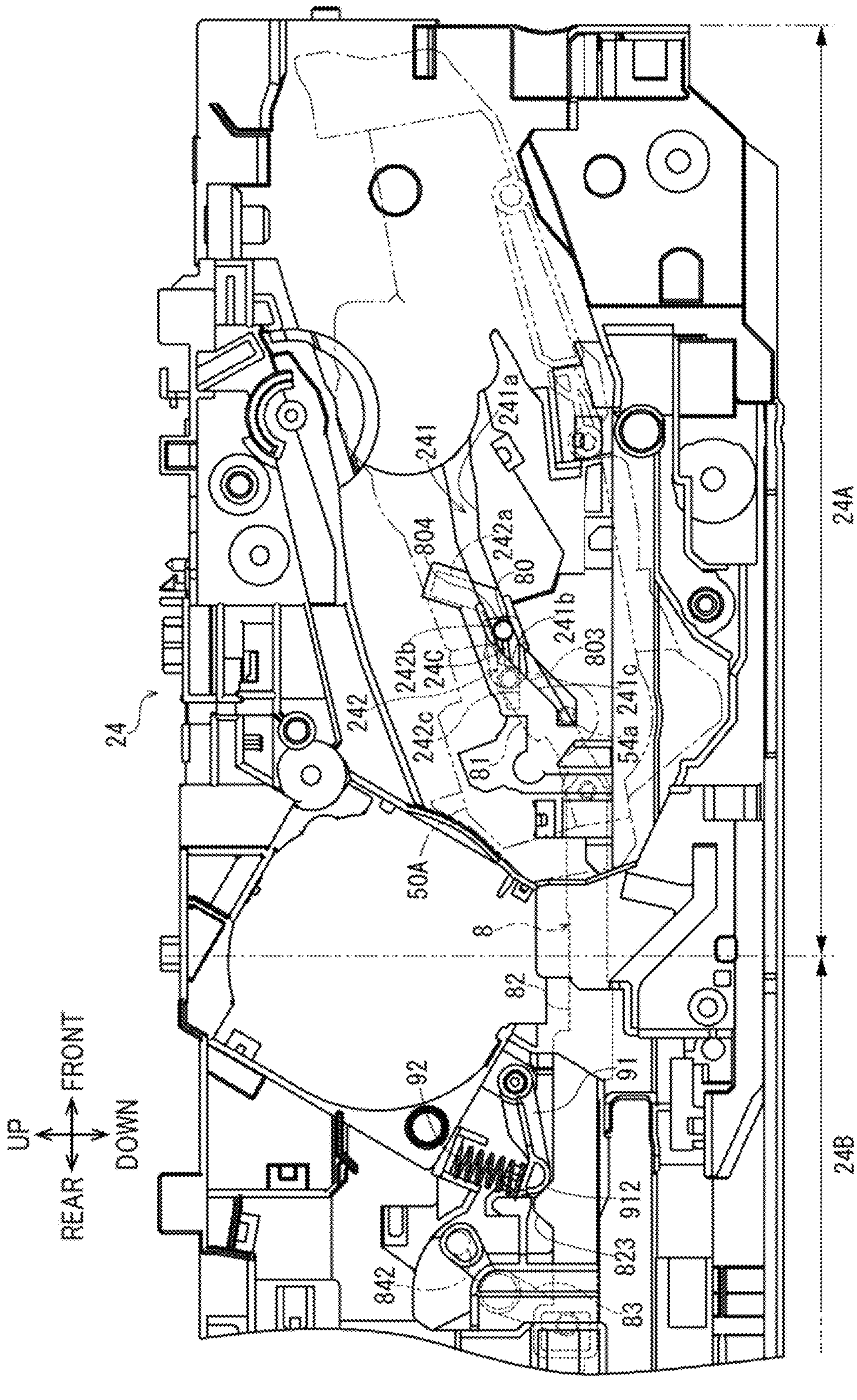
FIG. 25 is a side view of the first main frame, and particularly illustrating a state where the process cartridge reaches its attachment position after the drum shaft is separated from the abutment piece.

When the process cartridge 50 at the attachment position illustrated in FIG. 25 is moved frontward relative to the housing 2 for detachment of the process cartridge 50, the drum shaft **54*a* moves toward downstream in a detachment direction thereof along the rear portion 241*c* of the cartridge rail 241. Here, the detachment direction represents a direction in which the process cartridge 50 is moved toward the outside of the housing 2 for withdrawal of the process cartridge 50 from the housing 2. As illustrated in FIG. 21, when the drum shaft 54*a* moving along the cartridge rail 241 reaches the intermediate portion 241*b* (the through-hole 24C), the drum shaft 54*a* comes into contact with the second boss 804 of the abutment piece 80**.

As illustrated in FIG. 18, the abutment piece 80 is pushed by the drum shaft **54*a* when contacted by the drum shaft 54*a*, and is moved by the drum shaft 54*a* toward further downstream in the detachment direction of the process cartridge 50. That is, the first boss 803 of the abutment piece 80 moves from the rear portion 242*c* to the intermediate portion 242*b* (through-hole 24C) of the abutment piece rail 242**.

In accordance with the movement of the abutment piece 80, the first pivot link 81 is pivotally moved frontward to increase the inclination angle of the first pivot link 81 with respect to the horizontal direction. In response to the pivotal movement and frontward movement of the first pivot link 81, the linear motion link 82 is linearly moved frontward. As the linear motion link 82 moves further frontward, the connection hole 822 of the linear motion link 82 is brought into engagement with the engagement pin **832*a* of the second pivot link 83, thereby pivotally moving the second pivot link 83 in such a direction that the engagement pin 832*a* moves frontward. In accordance with the pivotal movement of the second pivot link 83, the connection hole 833*a* of the second pivot link 83 is brought into engagement with the engagement pin 842 of the third pivot link 84, thereby pivotally moving the third pivot link 84 in such a direction that the engagement pin 842** moves rearward.

As the process cartridge 50 is further moved from the housing 2 in the detachment direction, the abutment piece 80 is further moved downstream in the detachment direction by the drum shaft **54*a* that is moving along the intermediate portion 241*b* (through-hole 24C) of the cartridge rail 241**.

In accordance with the movement of the abutment piece 80, the third pivot link 84 is further pivotally moved in such a direction that the engagement pin 842 moves rearward. In accordance with the pivotal movement of the third pivot link 84, the coil spring 86 is pivotally moved, so that the coil arm 861 of the coil spring 86 comes into engagement with the engagement pin 854 of the shutter link 85 from above, as illustrated in FIG. 6A. Due to this engagement between the coil arm 861 and the engagement pin 854, the shutter link 85 is pivotally moved to move the engagement portion 853 downward. The shutter 64 is thus moved from the opening position toward the closing position.

In this way, during the detachment of the process cartridge 50 at its attachment position from the housing 2, the drum shaft **54*a* of the process cartridge 50 abuts on the abutment piece 80 of the link 8, which in turn moves the link 8 such that the shutter 64 at the opening position is moved toward the closing position. Hence, the shutter 64 can move to the closing position in association with the detaching operation to the process cartridge 50 from the housing 2**.

As described above, in the image-forming apparatus 1 according to the embodiment, the drum shaft **54*a* abuts on the first boss 803 of the abutment piece 80, thereby causing the link 8 to operate such that the shutter 64 can move from the closing position to the opening position during the attachment of the process cartridge 50 to the housing 2, whereas the drum shaft 54*a* abuts on the second boss 804 of the abutment piece 80, thereby causing the link 8 to operate such that the shutter 64 can move from the opening position to the closing position during the detachment of the process cartridge 50 from the housing 2. With this configuration, both the detachment and attachment operations to the process cartridge 50 can move the link 8** through a simple structure.

<Positional Relationship Among the Fan 71, Power-Supply Circuit Board 72, Circuit Board Cover 73, and Link 8>

Figure 26:
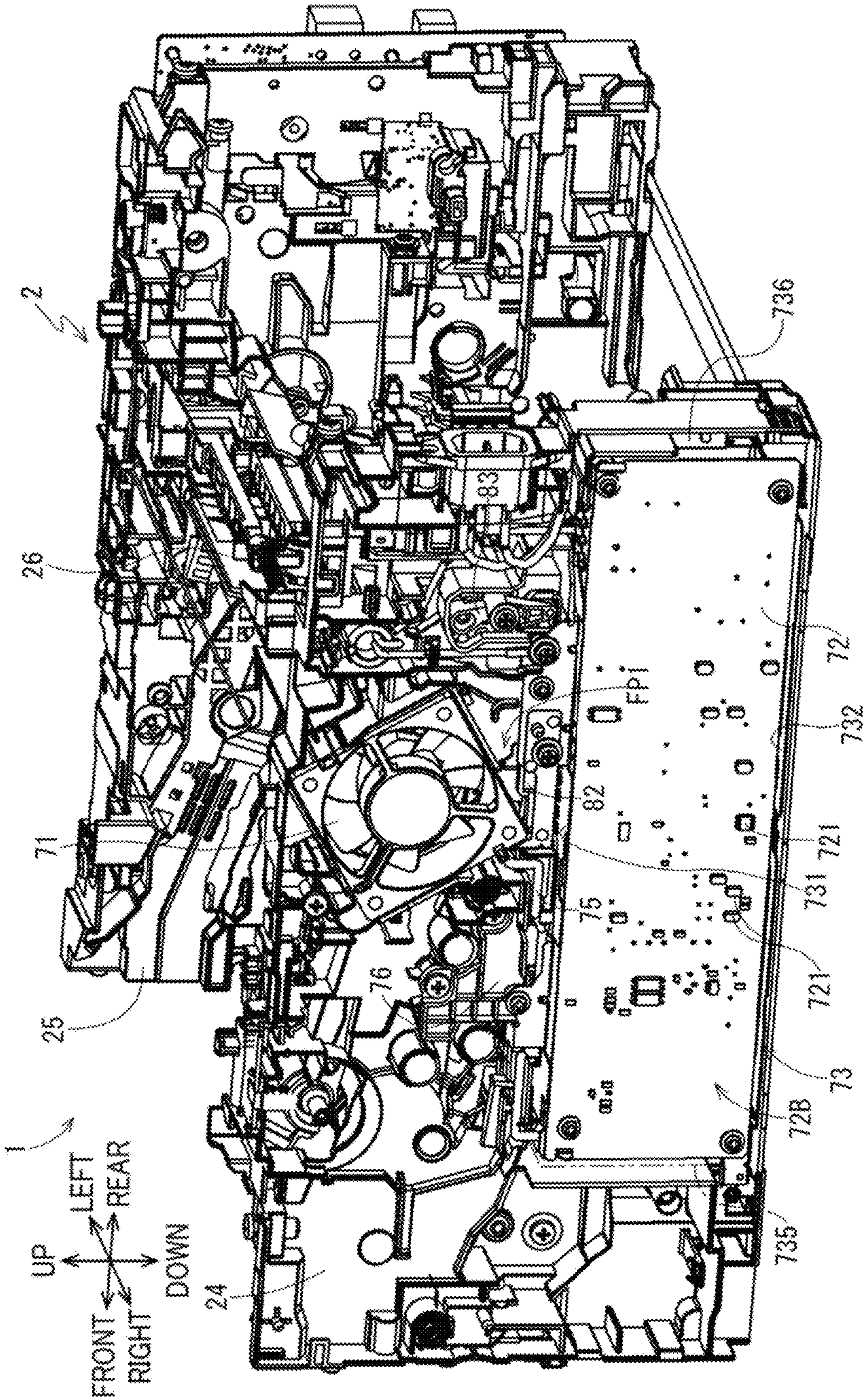
FIG. 26 is a perspective view of the first main frame, a second main frame, and an air duct as viewed from a right-rear side thereof.
Figure 27:
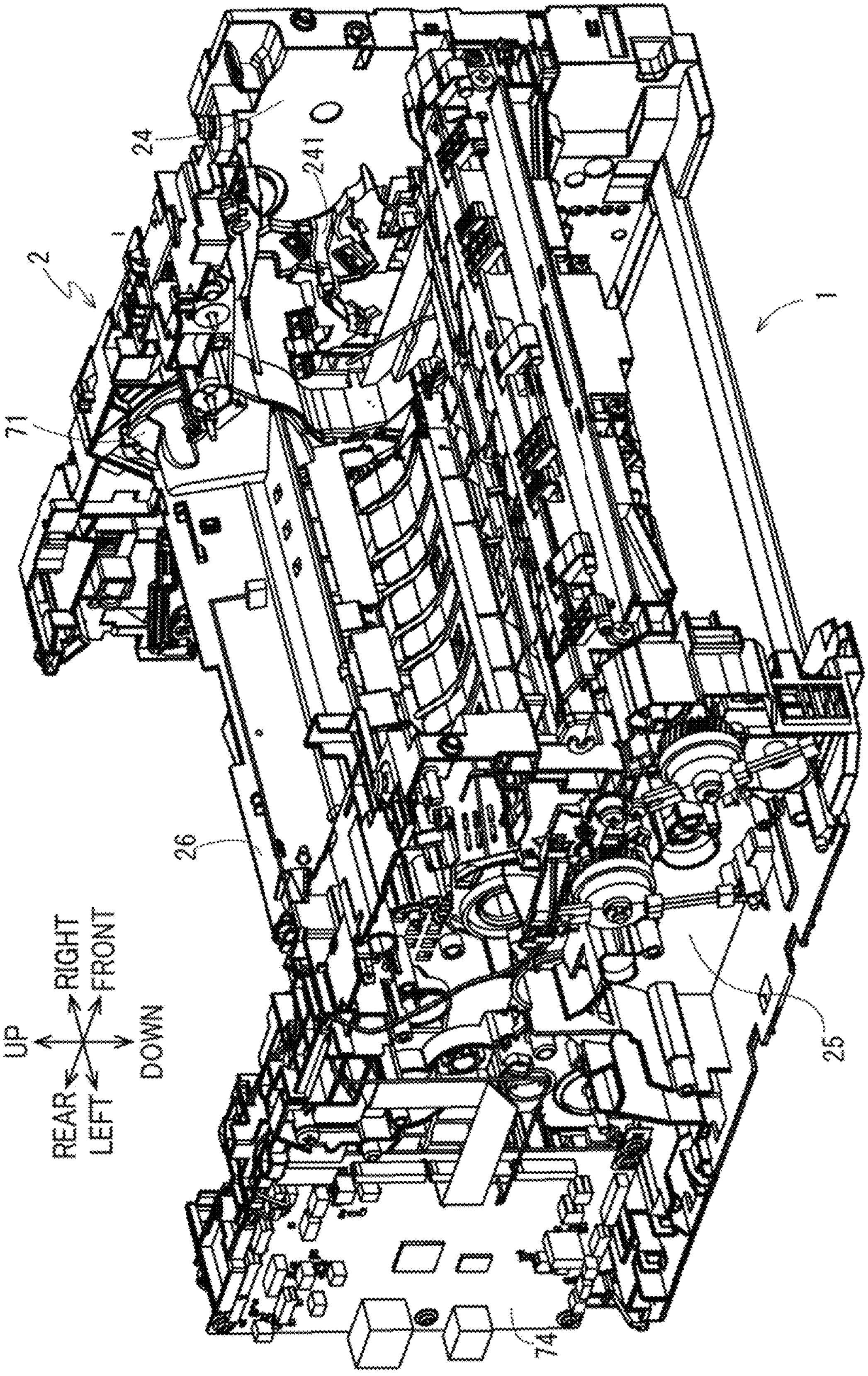
FIG. 27 is a perspective view particularly illustrating the first main frame, the second main frame, and the air duct as viewed from a left-front side thereof.
Figure 28:
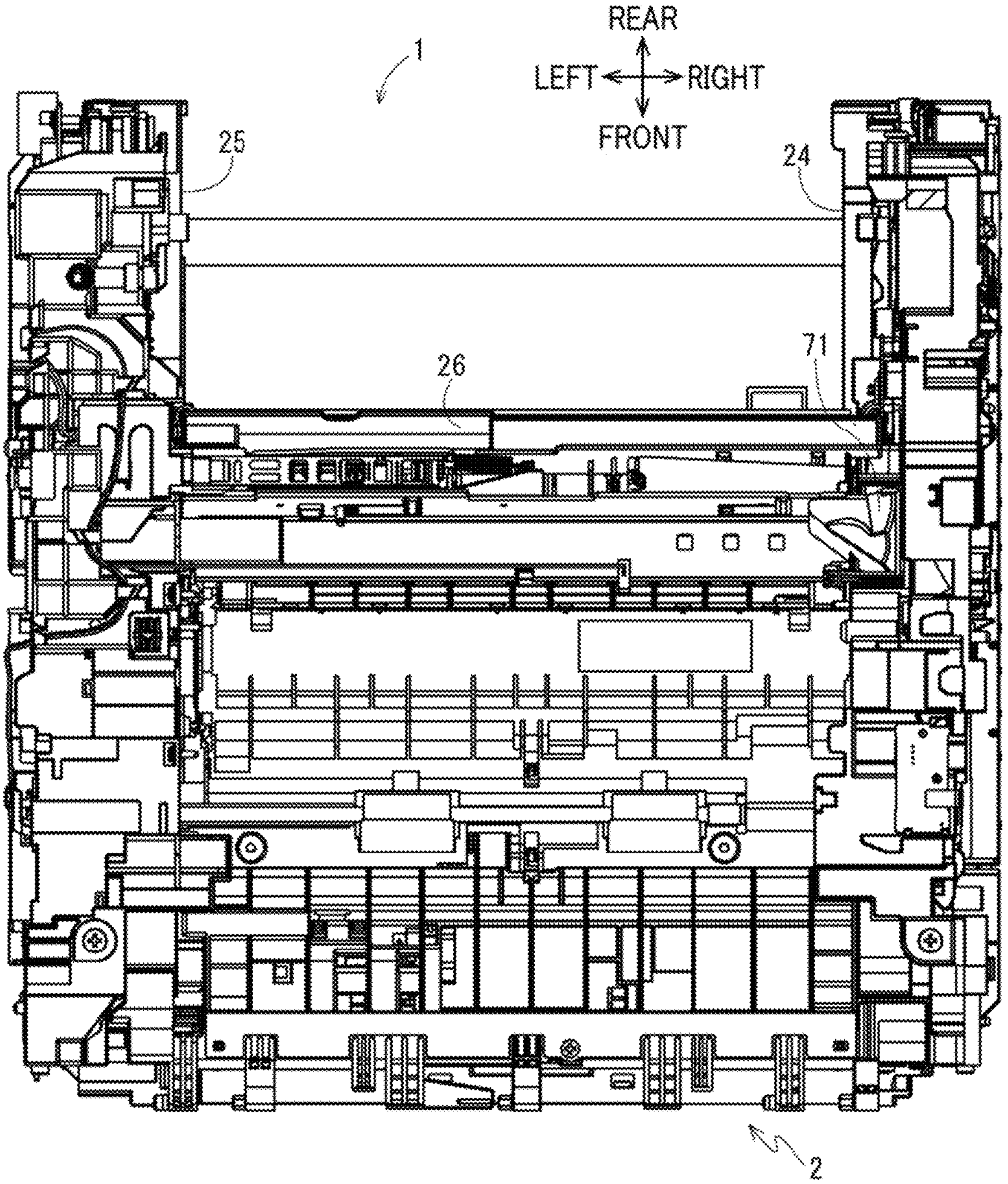
FIG. 28 is a plan view of the first main frame, the second main frame, and the air duct.

As illustrated in FIGS. 26 through 28, the image-forming apparatus 1 further includes a fan 71, a power-supply circuit board 72, a circuit board cover 73, a control circuit board 74, and an air duct 26.

The fan 71 is supported by the first main frame 24 and is configured to discharge air in the housing 2 to the outside of the housing 2. The fan 71 is an example of "fan" of the disclosure.

Electronic components 721 are mounted on the power-supply circuit board 72. The circuit board cover 73 is supported by the first main frame 24 and covers the power-supply circuit board 72. The power-supply circuit board 72 is supported by the circuit board cover 73. That is, the power-supply circuit board 72 is supported by the first main frame 24 through the circuit board cover 73. The power-supply circuit board 72 is an example of "circuit board" of the disclosure. The board cover 73 is an example of "circuit board cover" of the disclosure.

The control circuit board 74 is supported by the second main frame 25. A cable 75 extends from the power-supply circuit board 72, and the power-supply circuit board 72 and the control circuit board 74 are electrically connected to each other through the cable 75. The cable 75 is an example of "cable" of the disclosure.

The air duct 26 extends in the left-right direction to span between the first main frame 24 and the second main frame 25. The air duct 26 allows circulation of air therein. The air duct 26 is configured to allow the air inside the housing 2 to flow toward the fan 71.

Figure 29:
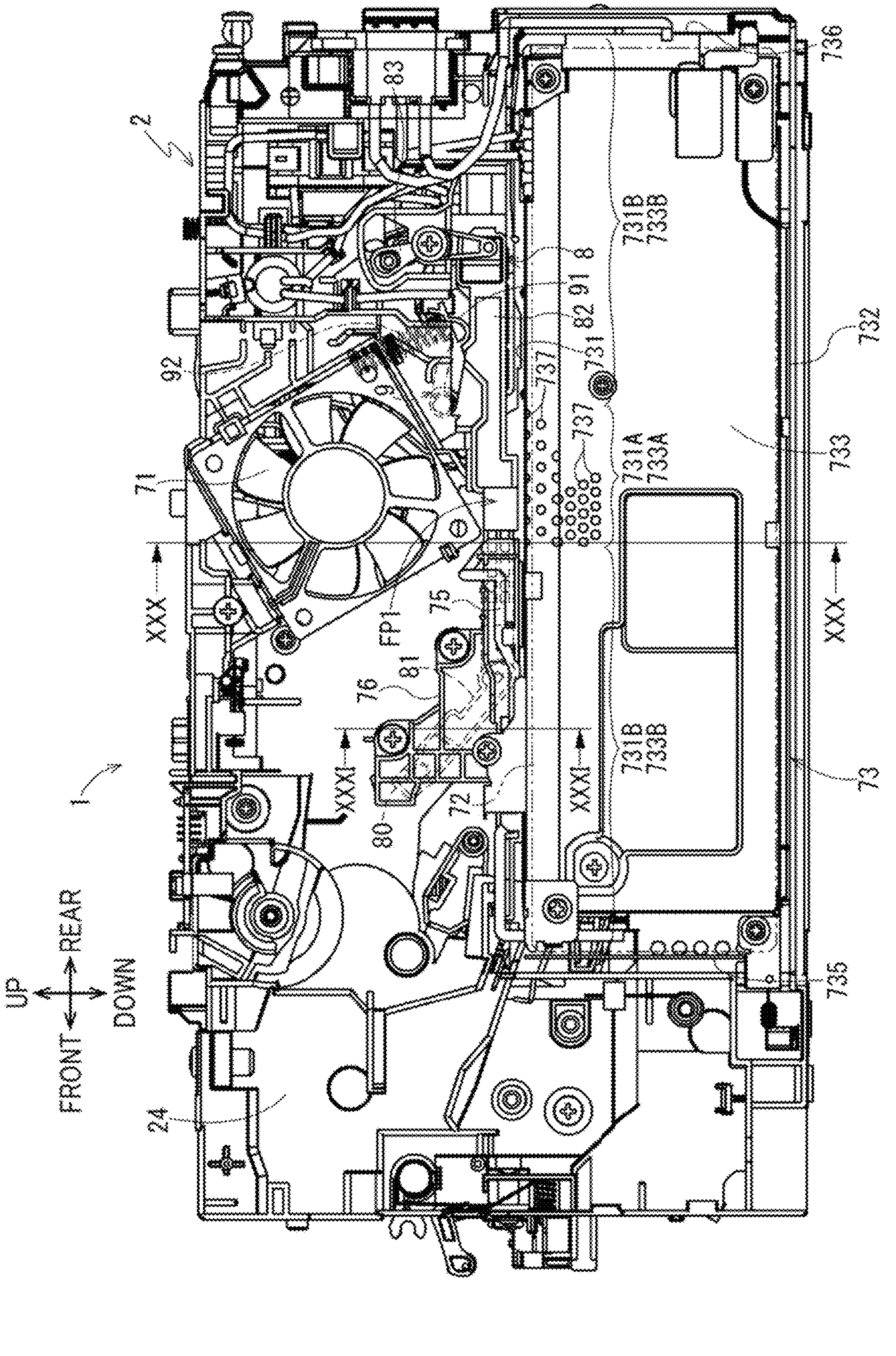
FIG. 29 is a right side view of the first main frame supporting a fan and a board cover.
Figure 30:
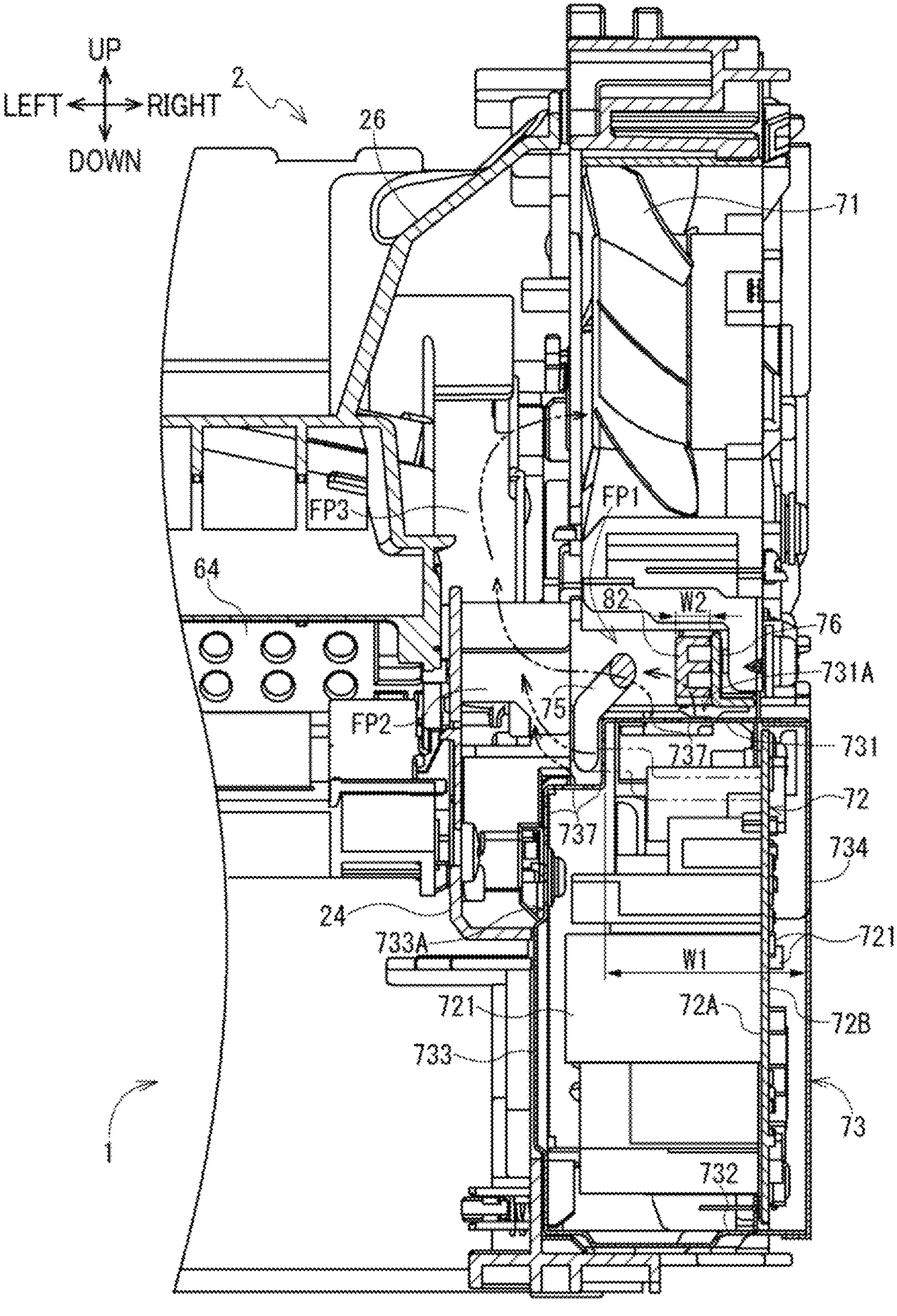
FIG. 30 is a cross-sectional view of the first main frame taken along a line XXX-XXX in FIG. 29.

As illustrated in FIGS. 26, 29, and 30, the power-supply circuit board 72 is positioned at a lower portion of the first main frame 24. The power-supply circuit board 72 extends in the up-down direction and the front-rear direction. The power-supply circuit board 72 has a first surface 72A facing leftward, and a second surface 72B opposite the first surface 72A and facing rightward. The electronic components 721 are surface-mounted on each of the first surface 72A and the second surface 72B. The first surface 72A and the second surface 72B are examples of "board surface" of the disclosure.

The circuit board cover 73 includes an upper plate 731, a lower plate 732, a left plate 733, a right plate 734, a front plate 735 and a rear plate 736. The upper plate 731 covers the power-supply circuit board 72 from above. The lower plate 732 covers the power-supply circuit board 72 from below. The left plate 733 covers the power-supply circuit board 72 from its left side, and the right plate 734 covers the power-supply circuit board 72 from its right side. The front plate 735 covers the power-supply circuit board 72 from its front side, and the rear plate 736 covers the power-supply circuit board 72 from its rear side.

In each of the upper plate 731 and the left plate 733, ventilation holes 737 are formed. Specifically, the ventilation holes 737 are formed in a region generally center in the front-rear direction of each of the upper plate 731 and the left plate 733 to provide communication between an interior and an exterior of the circuit board cover 73. Since some of the electronic components 721 mounted on the power-supply circuit board 72 are configured to generate heat while being activated, the heat generated by the electronic components 721 is designed to be discharged from the inside to the outside of the circuit board cover 73 through the ventilation holes 737 (see FIG. 30).

Referring to FIG. 29, the upper plate 731 has a first part 731A in which the ventilation holes 737 are formed, and a pair of second parts 731B without the ventilation holes 737 with respect to the front-rear direction. The first part 731A is positioned at a generally center in the front-rear direction of the upper plate 731. One of the second parts 731B is positioned frontward of the first part 731A, and the other second part 731B is positioned rearward of the first part 731A. The first part 731A is an example of "first part" of the disclosure, and the second part 731B is an example of "second part" of the disclosure.

The left plate 733 has a first part 733A formed with the ventilation holes 737, and a pair of second parts 733B without the ventilation holes 737 with respect to the front-rear direction. The first part 733A is positioned at a generally center in the front-rear direction of the left plate 733. One of the second parts 733B is positioned frontward of the first part 733A, and the other second part 733B is positioned rearward of the first part 733A.

The fan 71 is positioned above the power-supply circuit board 72. The fan 71 is positioned upward of and apart from the power-supply circuit board 72. Between the fan 71 and the power-supply circuit board 72 in the up-down direction, a first airflow path FP1 is defined, so that the air discharged from the interior to the exterior of the circuit board cover 73 can flow through the first airflow path FP1. That is, the fan 71 and the power-supply circuit board 72 are spaced away from each other in the up-down direction so as to define the first airflow path FP1 therebetween. The first airflow path FP1 is an example of "airflow path" of the disclosure.

The power-supply circuit board 72 extends in the front-rear direction such that the power-supply circuit board 72 has a rear end positioned further rearward than the fan 71 and a front end positioned further frontward than the fan 71. With respect to the position in the front-rear direction, the fan 71 overlaps with the power-supply board 72. That is, the position of the fan 71 in the front-rear direction overlaps the position of the power-supply board 72 in the front-rear direction. Specifically, in the embodiment, the power-supply circuit board 72 has a portion that is at the same position as the fan 71 in the front-rear direction.

The upper plate 731 of the circuit board cover 73 is a plate-like member extending in the front-rear direction and the left-right direction. The upper plate 731 is positioned between the power-supply circuit board 72 and the fan 71 in the up-down direction. With respect to the position in the front-rear direction, the ventilation holes 737 formed in each of the upper plate 731 and left plate 733 overlap with the fan 71. In the present embodiment, the fan 71 is positioned higher than the ventilation holes 737.

In other words, with respect to the position in the front-rear direction, the first part 731A of the upper plate 731 and the first part 733A of the left plate 733 overlap with the fan 71. That is, each of the first part 731A and first part 733A overlaps with the fan 71 when viewed in the up-down direction.

Further, as illustrated in FIG. 30, a second airflow path FP2 (defined by the first main frame 24) is positioned leftward of the first airflow path FP1, and a third airflow path FP3 (defined by the air duct 26) is positioned above the second airflow path FP2. The first airflow path FP1 and the second airflow path FP2 are in fluid communication with each other, and the second airflow path FP2 and the third airflow path FP3 are in fluid communication with each other. Further, the third airflow path FP3 is in fluidly communication with a fan housing of the fan 71.

Hence, the air discharged from the interior to the exterior of the circuit board cover 73 can be discharged to the outside of the housing 2 by the fan 71 after flowing through the first airflow path FP1, the second airflow path FP2 and the third airflow path FP3. Along with this air flow, the heat released from the electronic components 721 can also be discharged from the interior to the exterior of the circuit board cover 73, and then to the outside of the housing 2.

The linear motion link 82 of the link 8 is positioned in between the power-supply circuit board 72 and the fan 71 in the up-down direction. That is, the linear motion link 82 is positioned in the first airflow path FP1 defined between the power-supply circuit board 72 and the fan 71. By arranging the linear motion link 82 between the power-supply circuit board 72 and the fan 71 in this way, efficient layout of the linear motion link 82 can be realized utilizing the first airflow path FP1 defined between the power-supply circuit board 72 and the fan 71 in the up-down direction.

Further, since the linear motion link 82 is movable in the front-rear direction, this layout hardly causes mechanical interference between the linear motion link 82 and the power-supply circuit board 72 and/or the fan 71 during the movement of the linear motion link 82.

Further, the first main frame 24 supports the linear motion link 82, the circuit board cover 73 covering the power-supply circuit board 72, and the fan 71. Hence, the linear motion link 82 can be arranged efficiently together with the circuit board cover 73 and the fan 71.

The linear motion link 82 is positioned above the upper plate 731 of the circuit board cover 73. That is, the upper plate 731 is positioned between the linear motion link 82 and the power-supply circuit board 72 in the up-down direction. With this configuration, since the upper plate 731 is positioned between the linear motion link 82 and the power-supply circuit board 72, the upper plate 731 can restrain the linear motion link 82 from mechanically interfering with the power-supply circuit board 72 while the linear motion link 82 is moving in the front-rear direction.

Further, the first part 731A of the upper plate 731 is positioned in between the linear motion link 82 and the power-supply circuit board 72. As such, the heat generated by the electronic components 721 mounted on the power-supply circuit board 72 can be released from the interior of the circuit board cover 73 toward the fan 71 through the ventilation holes 737 in the first part 731A.

As illustrated in FIG. 30, the first part 731A of the upper plate 731 has a length W1 in the left-right direction, whereas a portion of the linear motion link 82 positioned directly above the first part 731A has a length W2 in the left-right direction that is shorter than the length W1. With this structure, the portion of the linear motion link 82 positioned directly above the ventilation holes 737 in the first part 731A can have a smaller dimension in the left-right direction, which in turn can restrain the linear motion link 82 from covering the ventilation holes 737.

<Positional Relationship Among the Link 8, Cable 75, and Link Cover 76>

As illustrated in FIGS. 29 and 30, the cable 75 is positioned leftward of the linear motion link 82 in the first airflow path FP1 where the first part 731A is positioned. The cable 75 has a portion positioned leftward of the linear motion link 82 and extending in the front-rear direction. That is, the cable 75 and the linear motion link 82 are positioned side by side in the left-right direction. With this structure, efficient layout of the cable 75 can be attained by making use of the first airflow path FP1 that is defined by the power-supply circuit board 72 and the fan 71, in addition to the effective layout of the linear motion link 82.

Figure 31:
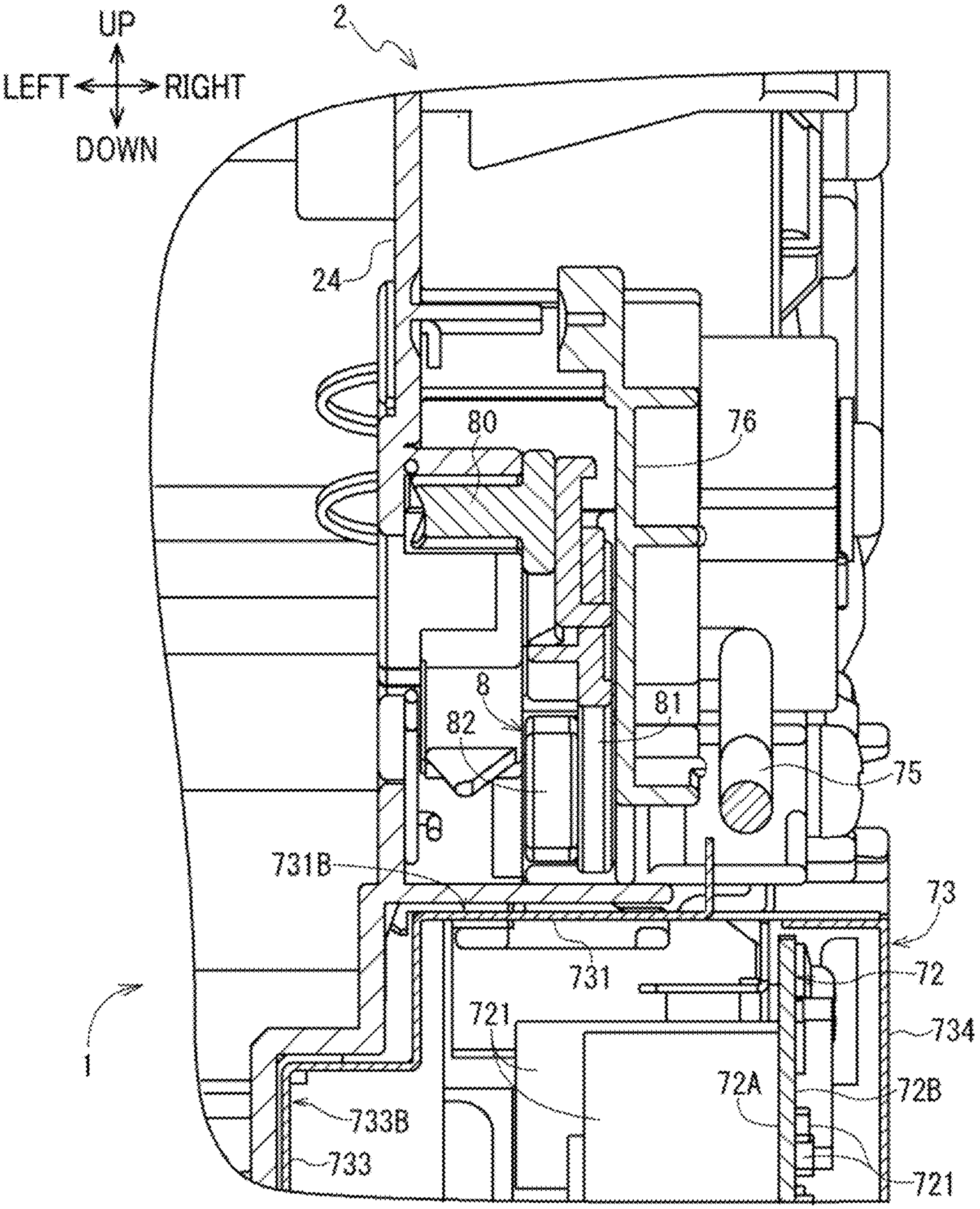
FIG. 31 is a cross-sectional view of the first main frame taken along a line XXXI-XXXI in FIG. 29.

As illustrated in FIGS. 29 and 31, the image-forming apparatus 1 further includes a link cover 76 covering the link 8 on the right side of the link 8. The link cover 76 is positioned frontward of the first parts 731A and 733A of the circuit board cover 73. In other words, the link cover 76 is positioned above the second parts 731B and 733B on the front side of the circuit board cover 73. The link cover 76 is fixed to the first main frame 24, and covers the abutment piece 80, the first pivot link 81, and a front portion of the linear motion link 82. The link cover 76 is an example of "link cover" of the disclosure.

Figure 32A:
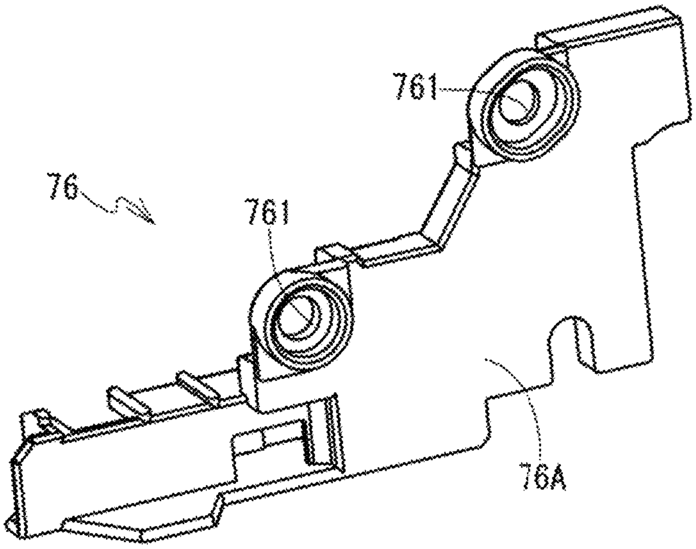
FIG. 32A is a perspective view of a link cover.
Figure 32B:
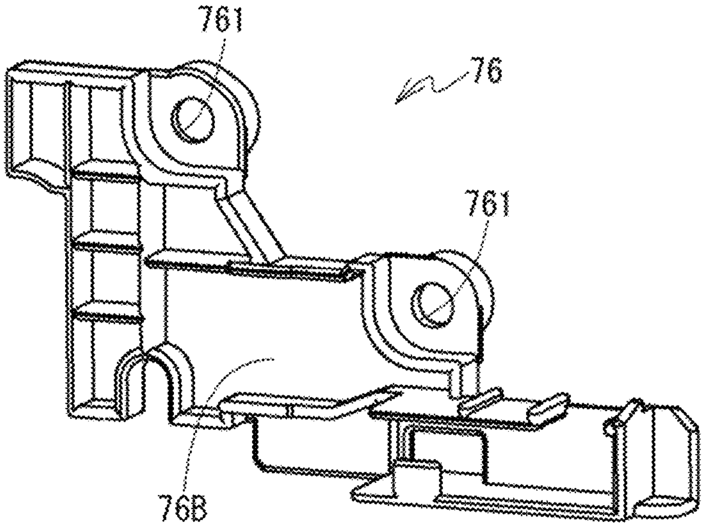
FIG. 32B is another perspective view of the link cover.

As illustrated in FIGS. 32A and 32B, the link cover 76 has a first surface 76A facing leftward, and a second surface 76B opposite the first surface 76A and facing rightward. The link 8 can abut on the first surface 76A. The link cover 76 also has a plurality of fixing holes 761 through which screws extend to fix the link cover 76 to the first main frame 24. By abutment of the link 8 on the first surface 76A of the link cover 76, the link 8 is restrained from moving further rightward. That is, the link cover 76 functions to restrict displacement of the link 8 in the left-right direction.

The cable 75 has a portion that is positioned rightward of the second parts 731B and 733B on the front side of the first parts 731A and 733A. That is, this portion of the cable 75 is positioned side by side with the linear motion link 82 in the left-right direction with the link cover 76 interposed between the linear motion link 82 and the cable 75. With this structure, since the link cover 76 is positioned between the linear motion link 82 and the cable 75, mechanical interference between the linear motion link 82 and the cable 75 can be restrained by the link cover 76.

<Positional Relationship Among the Fan 71, Power-Supply Circuit Board 72, Circuit Board Cover 73, and Urging Member 9>

The linear motion link 82 is disposed over the upper plate 731 in the front-rear direction to extend from the second part 731B on the front side of the first part 731A to the second part 731B on the rear side of the first part 731A via the first part 731A. That is, the linear motion link 82 is positioned between the fan 71 and the first part 731A of the upper plate 731, and between the fan 71 and each second part 731B of the upper plate 731 in the up-down direction.

As illustrated in FIG. 29, in the front-rear direction, the urging member 9 is located at a position overlapping with the position of each of the second parts 731B and 733B on the rear side of the first parts 731A and 733A. That is, the urging spring 92 and the pressure arm 91 of the urging member 9 are positioned between the power-supply circuit board 72 and the fan 71 in the up-down direction.

Positioning the urging spring 92 and the pressure arm 91 in between the power-supply circuit board 72 and the fan 71 can lead to efficient layout of the urging spring 92 and the pressure arm 93 in the first airflow path FP1 that is defined between the power-supply circuit board 72 and the fan 71.

Further, the urging spring 92 and the pressure arm 91 are positioned in between the fan 71 and each of the second parts 731B and 733B of the circuit board cover 73 in the up-down direction.

In the image-forming apparatus 1, heat released from the electronic components 721 mounted on the power-supply circuit board 72 is transmitted toward the fan 71 through the ventilation holes 737 formed in the first parts 731A, 733A of the circuit board cover 73. Here, thermal influence on the urging spring 92 can be reduced, since the urging spring 92 is positioned between the fan 71 and each second part 731B, 733B where no ventilation holes 737 are formed. Hence, variation in urging force of the urging spring 92 is less likely to occur. Accordingly, the pressure arm 91 of the urging member 9 can impart a stabilized pressure on the linear motion link 82.

<Positional Relationship Among the Air Duct 26, Fan 71, Fixing Device 6, and Process Cartridge 50>

As illustrated in FIGS. 26 through 28 and 33, the air duct 26 is connected to each of the first main frame 24 and second main frame 25 such that the air duct 26 extends in the left-right direction from a generally front-rear center region on an upper portion of the first main frame 24 to a generally front-rear center region on an upper portion of the second main frame 25.

The air duct 26 is positioned to overlap with the fan 71 when viewed in the left-right direction, which is coincident with the direction in which the first main frame 24 and the second main frame 25 oppose each other. That is, with respect to the position in the front-rear direction as well as in the up-down direction, the air duct 26 and the fan 71 overlap with each other. The air duct 26 has a right end in communication with the fan housing of the fan 71. Hence, the air duct 26 can efficiently guide air in the housing 2 to the fan 71, and the fan 71 can discharge the air to the outside of the housing 2.

Figure 33:
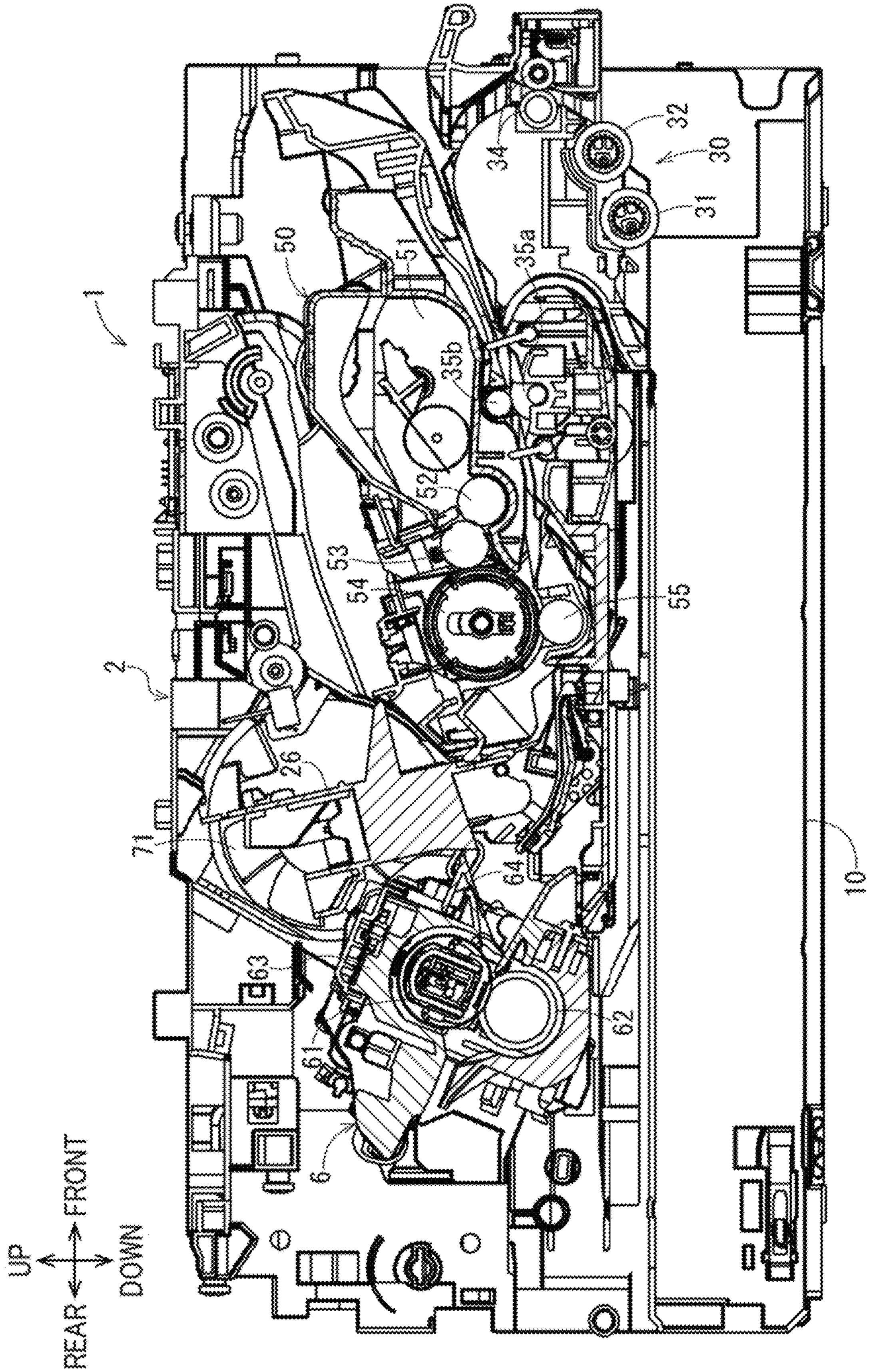
FIG. 33 is a vertical cross-sectional view of the image-forming apparatus taken along a plane passing through a center of the image-forming apparatus.

Further, as illustrated in FIG. 33, the air duct 26 is positioned between the process cartridge 50 and the fixing device 6 in the front-rear direction which is perpendicular to the direction in which the first main frame 24 and the second main frame 25 oppose each other (left-right direction). With this structure, even if the fan 71 is arranged at a position adjacent to a front-rear center portion of the link 8 that extends from a position near the drum shaft 54$a$ of the attached process cartridge 50 to a position adjacent to the fixing device 6 in the front-rear direction, the link 8 can be disposed without mechanical interference with the fan 71.

Variations and Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the described embodiment, the link 8 is configured of the abutment piece 80, the first pivot link 81, the linear motion link 82, the second pivot link 83, the third pivot link 84, the shutter link 85, and the coil spring 86. As an alternative, a single link member connected to the shutter 64 may be provided so that the single member can abut on the process cartridge 50. Further, each link need not move pivotally or linearly, but may move differently rather than pivotally or linearly.

Further, in the described embodiment, the drum shaft 54*a* of the process cartridge 50 is configured to abut on the abutment piece 80 of the link 8 to open and close the shutter 64. However, a component of the process cartridge 50 other than the drum shaft 54*a* may be configured to abut on the link 8.

In the above-described embodiment, the fan 71 is configured as an exhaust fan configured to discharge air inside the housing 2 to the outside of the housing. Instead of the exhaust fan, the fan 71 may be configured as an intake fan configured to introduce external air into the housing 2. That is, the fan of the disclosure may be of any type, provided that the fan can move the air inside the housing 2.

In the above-described embodiment, the link 8 is positioned between the power-supply circuit board 72 and the fan 71. However, the circuit board of the disclosure may be a circuit board other than the power-supply circuit board 72 as along as the circuit board has an electronic component mounted thereon. For example, a main circuit board and a high-voltage circuit board may be employed as the circuit board of the disclosure.

What is claimed is:

1. An image-forming apparatus comprising:
a housing to which a cartridge is detachably attachable;
a fixing device configured to thermally fix a toner image to a sheet conveyed in a sheet conveying direction, the fixing device comprising a heating unit including a heater, the heating unit having an upstream end in the sheet conveying direction;
a shutter movable relative to the fixing device between a closing position where the shutter covers the upstream end of the heating unit and an opening position where the shutter uncovers the upstream end of the heating unit;
a link connected to the shutter, the link being configured to abut on the cartridge to move the shutter between the closing position and the opening position;
a circuit board on which an electronic component is mounted; and
a fan configured to move air in the housing,
wherein
the circuit board and the fan are spaced apart from each other to provide an airflow path through which the air flows, and
the link is positioned between the circuit board and the fan.

2. The image-forming apparatus according to claim 1,
wherein the circuit board has a board surface on which the electronic component is mounted, the board surface extending in both a first direction and a second direction perpendicular to the first direction,
wherein the fan is positioned apart from the circuit board in the first direction,
wherein a position of the circuit board in the second direction overlaps with a position of the fan in the second direction, and
wherein the link is positioned between the circuit board and the fan in the first direction.

3. The image-forming apparatus according to claim 2,
wherein the link comprises a linear motion link movable in the second direction.

4. The image-forming apparatus according to claim 3, further comprising an urging member configured to urge the linear motion link, the urging member comprising:
an urging spring; and
an abutment part urged by the urging spring and in abutment with the linear motion link, the urging spring and the abutment part being positioned between the circuit board and the fan in the first direction.

5. The image-forming apparatus according to claim 4,
wherein the linear motion link comprises a protrusion protruding toward the urging member, the protrusion having a sloped surface that is sloped relative to the second direction, the abutment part being configured to abut on the sloped surface.

6. The image-forming apparatus according to claim 4, further comprising a circuit board cover covering the circuit board and positioned between the linear motion link and the circuit board in the first direction, the circuit board cover having:
a first part where a ventilation hole is formed; and
a second part where no ventilation hole is formed,
wherein the linear motion link is positioned between the fan and each of the first part and the second part in the first direction, and
wherein the urging spring is positioned between the fan and the second part.

7. The image-forming apparatus according to claim 4,
wherein the urging spring and the abutment part are positioned in the airflow path between the circuit board and the fan in the first direction.

8. The image-forming apparatus according to claim 2, further comprising a cable extending from the circuit board, the cable being positioned side by side with the link in a third direction perpendicular to both the first direction and the second direction.

9. The image-forming apparatus according to claim 8, further comprising a link cover positioned between the link and the cable in the third direction to restrict displacement of the link in the third direction.

10. The image-forming apparatus according to claim 1, further comprising a circuit board cover covering the circuit board and positioned between the link and the circuit board.

11. The image-forming apparatus according to claim 10,
wherein the circuit board has a board surface, and
wherein the circuit board cover has a first part positioned between the link and the circuit board and extending in a direction perpendicular to the board surface, the first part having a ventilation hole formed therein.

12. The image-forming apparatus according to claim 11, wherein the link has a length that is smaller than a length of the first part in the direction perpendicular to the board surface.

13. The image-forming apparatus according to claim 1, further comprising a circuit board cover covering the circuit board, wherein the housing includes:

a first frame supporting the link, the circuit board cover, and the fan; and a second frame opposing the first frame in an opposing direction, the cartridge attached to the housing being positioned between the first frame and the second frame.

14. The image-forming apparatus according to claim 13, wherein the cartridge comprises a photosensitive drum having a drum shaft defining a drum axis about which the photosensitive drum is rotatable, and wherein the link is configured to abut on the drum shaft during attachment and detachment of the cartridge relative to the housing.

15. The image-forming apparatus according to claim 14, further comprising an air duct extending in the opposing direction to connect the first frame to the second frame, wherein the air duct and the fan are overlapped with each other when viewed in the opposing direction, and the air duct is positioned between the fixing device and the cartridge attached to the housing in a direction perpendicular to the opposing direction.

16. The image-forming apparatus according to claim 1, wherein the link is positioned in the airflow path between the circuit board and the fan.

* * * * *